United States Patent
Chang et al.

(10) Patent No.: US 11,719,914 B2
(45) Date of Patent: Aug. 8, 2023

(54) OPTICAL IMAGE CAPTURING SYSTEM

(71) Applicant: Ability Opto-Electronics Technology Co., Ltd., Taichung (TW)

(72) Inventors: Yeong-Ming Chang, Taichung (TW); Chien-Hsun Lai, Taichung (TW); Yao-Wei Liu, Taichung (TW)

(73) Assignee: Ability Opto-Electronics Technology Co., Ltd., Taichung (TW)

( * ) Notice: Subject to any disclaimer, the term of this patent is extended or adjusted under 35 U.S.C. 154(b) by 470 days.

(21) Appl. No.: 17/009,273

(22) Filed: Sep. 1, 2020

(65) Prior Publication Data

US 2021/0364749 A1 Nov. 25, 2021

(30) Foreign Application Priority Data

May 20, 2020 (TW) ................................. 109116757

(51) Int. Cl.
*G02B 13/00* (2006.01)
*G02B 27/00* (2006.01)
*G02B 9/62* (2006.01)

(52) U.S. Cl.
CPC ........... *G02B 13/0045* (2013.01); *G02B 9/62* (2013.01); *G02B 27/0025* (2013.01)

(58) Field of Classification Search
CPC ....................... G02B 27/0012; G02B 15/1465; G02B 13/18; G02B 13/0045; G02B 9/62; G02B 9/64; H04N 5/222; H04N 5/2254
USPC ......... 359/656–658, 708, 713, 749, 756–762
See application file for complete search history.

(56) References Cited

U.S. PATENT DOCUMENTS

2015/0268446 A1* 9/2015 Chen .................. G02B 13/0045
348/148
2016/0178871 A1* 6/2016 You .................... G02B 13/0045
359/713

FOREIGN PATENT DOCUMENTS

TW 201942629 A 11/2019

OTHER PUBLICATIONS

Office Action of corresponding TW application, published on Jun. 2, 2022.

* cited by examiner

*Primary Examiner* — Travis S Fissel
(74) *Attorney, Agent, or Firm* — Wang Law Firm, Inc.

(57) ABSTRACT

A six-piece optical image capturing system is disclosed. In order from an object side to an image side, the optical lenses along the optical axis include a first lens with refractive power; a second lens with refractive power; a third lens with refractive power; a fourth lens with refractive power; a fifth lens with refractive power, and a sixth lens with negative refractive power. At least one lens among the first lens to the fifth lens has positive refractive power. The image-side surface and object-side surface of the sixth lens are aspheric, and at least one of the image-side surface and the object-side surface of the sixth lens has an inflection point. The optical lens of the optical image capturing system can increase aperture value and improve the imagining quality for use in compact cameras.

23 Claims, 9 Drawing Sheets

OPTICAL IMAGE CAPTURING SYSTEM

CROSS-REFERENCE TO RELATED APPLICATION

This application claims priority from Taiwan Patent Application No. 109116757 filed on May 20, 2020, in the Taiwan Intellectual Property Office, the content of which is hereby incorporated by reference in its entirety for all purposes.

BACKGROUND OF THE INVENTION

1. Field of the Invention

The present invention relates to an optical image capturing system, and more particularly to a compact optical image capturing system which can be applied to electronic products.

2. Description of the Related Art

In recent years, with the rise of portable electronic devices having camera functionalities, the demand for an optical image capturing system has gradually been raised. The image sensing device of the ordinary photographing camera is commonly selected from a charge coupled device (CCD) or a complementary metal-oxide semiconductor sensor (CMOS Sensor). Also, as advanced semiconductor manufacturing technology enables the minimization of the pixel size of the image sensing device, the development of the optical image capturing system has gravitated towards the field of high pixels. Therefore, the requirement for high image quality has been rapidly increasing.

The traditional optical image capturing system of a portable electronic device comes with different designs, including a four-lens or a five-lens design. However, the requirement for the higher pixels and the requirement for a large aperture of an end user, like functionalities of micro filming and night view, or the requirement of wide angle of view of the portable electronic device have been raised, thus the optical image capturing system in prior arts cannot meet the requirement of the higher order camera lens module.

Therefore, how to effectively increase quantity of incoming light of the optical lenses, and further improve image quality for the image formation, has become an important issue.

SUMMARY OF THE INVENTION

The aspect of embodiment of the present invention directs to an optical image capturing system and an optical image capturing lens which use combination of refractive power, convex and concave surfaces of six-piece optical lenses (the convex or concave surface in the present invention denotes the change of geometrical shape of an object side or an image side of each lens with different height from an optical axis) to increase the quantity of incoming light of the optical image capturing system, and to improve image quality for image formation, so as to be applied to compact electronic products.

The term and the definition to the lens parameter in the embodiment of the present invention are shown as below for further reference.

The Lens Parameters Related to the Length or the Height

The maximum height for image formation of the optical image capturing system is denoted by HOI. The height of the optical image capturing system is denoted by HOS. The distance from the object side of the first lens to the image side of the sixth lens is denoted by InTL. The distance from an aperture stop (aperture) to an image plane is denoted by InS. The distance from the first lens to the second lens is denoted by In12 (instance). The central thickness of the first lens of the optical image capturing system on the optical axis is denoted by TP1 (instance).

The Lens Parameters Related to the Material

The coefficient of dispersion of the first lens in the optical image capturing system is denoted by NA1 (instance). The refractive index of the first lens is denoted by Nd1 (instance).

The Lens Parameters Related to the Angle of View

The angle of view is denoted by AF. Half of the angle of view is denoted by HAF. The major light angle is denoted by MRA.

The Lens Parameters Related to the Exit/Entrance Pupil

An entrance pupil diameter of the optical image capturing system is denoted by HEP. A maximum effective half diameter position of any surface of single lens means the vertical height between the effective half diameter (EHD) and the optical axis where the incident light of the maximum view angle of the system passes through the farthest edge of the entrance pupil on the EHD of the surface of the lens. For example, the maximum effective half diameter position of the object-side surface of the first lens is denoted as EHD11. The maximum effective half diameter position of the image-side of the first lens is denoted as EHD12. The maximum effective half diameter position of the object-side surface of the second lens is denoted as EHD21. The maximum half effective half diameter position of the image-side surface of the second lens is denoted as EHD22. The maximum effective half diameter position of any surfaces of the remaining lens of the optical image capturing system can be referred as mentioned above.

The Lens Parameters Related to the ARC Length of the Lens Shape and the Outline of Surface The length of the maximum effective half diameter outline curve at any surface of a single lens refers to an arc length of a curve, which starts from a starting point which is an intersection point on the surface of the lens crossing the optical axis of the optical image capturing system, travels along the outline of the surface and ends at the ending point which is the maximum effective half diameter position of the surface, and this arc length may be expressed as ARS. For example, the length of the maximum effective half diameter outline curve of the object side of the first lens may be expressed as ARS11. The length of the maximum effective half diameter outline curve of the image side of the first lens may be expressed as ARS12. The length of the maximum effective half diameter outline curve of the object side of the second lens may be expressed as ARS21. The length of the maximum effective half diameter outline curve of the image side of the second lens may be expressed as ARS22. The lengths of the maximum effective half diameter outline curve of any surface of other lens in the optical image capturing system are expressed in the similar way.

The length of ½ entrance pupil diameter (HEP) outline curve of any surface of a single lens refers to an arc length of curve, which starts from a starting point which is an intersection point on the surface of the lens crossing the optical axis of the optical image capturing system, travels along the outline of the surface of the lens and ends at a coordinate point on the surface where the vertical height from the optical axis to the surface is equivalent to ½ entrance pupil diameter; and the arc length may be expressed as ARE. For example, the length of the ½ entrance pupil diameter (HEP) outline curve of the object side of the first lens may be expressed as ARE11. The length of the ½ entrance pupil diameter (HEP) outline curve of the image side of the first lens is expressed as ARE12. The length of the ½ entrance pupil diameter (HEP) outline curve of the object side of the second lens may be expressed as ARE21. The length of the ½ entrance pupil diameter (HEP) outline curve of the image side of the second lens may be expressed as ARE22. The lengths of the ½ entrance pupil diameter (HEP) outline curve of any surfaces of the other lens in the optical image capturing system are expressed in the similar way.

The Lens Parameters Related to the Depth

The horizontal distance parallel to an optical axis from a maximum effective half diameter position of the object side of the sixth lens to an intersection point where the object side of the sixth lens crosses the optical axis is denoted by InRS61 (a depth of the maximum effective half diameter). The horizontal distance parallel to an optical axis from a maximum effective half diameter position the image side of the sixth lens to an intersection point where the object side of the sixth lens crosses the optical axis on the image side of the sixth lens is denoted by InRS62 (the depth of the maximum effective half diameter). The depths of the maximum effective half diameters (sinkage values) of object side and image side of other lenses are denoted in a similar way.

The Lens Parameter Related to the Shape of the Lens

The critical point C is a tangent point on a surface of a specific lens. The tangent point is tangent to a plane perpendicular to the optical axis except that an intersection point which crosses the optical axis on the specific surface of the lens. In accordance, the distance perpendicular to the optical axis between a critical point C51 on the object side of the fifth lens and the optical axis is HVT51 (instance). The distance perpendicular to the optical axis between a critical point C52 on the image side of the fifth lens and the optical axis is HVT52 (instance). The distance perpendicular to the optical axis between a critical point C61 on the object side of the sixth lens and the optical axis is HVT61 (instance). The distance perpendicular to the optical axis between a critical point C62 on the image side of the sixth lens and the optical axis is HVT62 (instance). The distances perpendicular to the optical axis between critical points on the object side or the image side of other lenses and the optical axis are denoted in a similar way as described above.

The object side of the sixth lens has one inflection point IF611 which is the first nearest to the optical axis. The sinkage value of the inflection point IF611 is denoted by SGI611. SGI611 is a horizontal distance parallel to the optical axis, which is from an intersection point where the object side of the sixth lens crosses the optical axis to the inflection point on the object side of the sixth lens that is the first nearest to the optical axis. The distance perpendicular to the optical axis between the inflection point IF611 and the optical axis is HIF611 (instance). The image side of the sixth lens has one inflection point IF621 which is the first nearest to the optical axis and the sinkage value of the inflection point IF621 is denoted by SGI621 (instance). SGI621 is a horizontal distance parallel to the optical axis, which is from the intersection point where the image side of the sixth lens crosses the optical axis to the inflection point on the image side of the sixth lens that is the first nearest to the optical axis. The distance perpendicular to the optical axis between the inflection point IF621 and the optical axis is HIF621 (instance).

The object side of the sixth lens has one inflection point IF612 which is the second nearest to the optical axis and the sinkage value of the inflection point IF612 is denoted by SGI612 (instance). SGI612 is a horizontal distance parallel to the optical axis, which is from an intersection point where the object side of the sixth lens crosses the optical axis to the inflection point on the object side of the sixth lens that is the second nearest to the optical axis. The distance perpendicular to the optical axis between the inflection point IF612 and the optical axis is HIF612 (instance). The image side of the sixth lens has one inflection point IF622 which is the second nearest to the optical axis and the sinkage value of the inflection point IF622 is denoted by SGI622 (instance). SGI622 is a horizontal distance parallel to the optical axis, which is from an intersection point where the image side of the sixth lens crosses the optical axis to the inflection point on the image side of the sixth lens that is the second nearest to the optical axis. The distance perpendicular to the optical axis between the inflection point IF622 and the optical axis is HIF622 (instance).

The object side of the sixth lens has one inflection point IF613 which is the third nearest to the optical axis and the sinkage value of the inflection point IF613 is denoted by SGI613 (instance). SGI613 is a horizontal distance parallel to the optical axis, which is from an intersection point where the object side of the sixth lens crosses the optical axis to the inflection point on the object side of the sixth lens that is the third nearest to the optical axis. A distance perpendicular to the optical axis between the inflection point IF613 and the optical axis is HIF613 (instance). The image side of the sixth lens has one inflection point IF623 which is the third nearest to the optical axis and the sinkage value of the inflection point IF623 is denoted by SGI623 (instance). SGI623 is a horizontal distance parallel to the optical axis, which is from an intersection point where the image side of the sixth lens crosses the optical axis to the inflection point on the image side of the sixth lens that is the third nearest to the optical axis. The distance perpendicular to the optical axis between the inflection point IF623 and the optical axis is HIF623 (instance).

The object side of the sixth lens has one inflection point IF614 which is the fourth nearest to the optical axis and the sinkage value of the inflection point IF614 is denoted by SGI614 (instance). SGI614 is a horizontal distance parallel to the optical axis, which is from an intersection point where the object side of the sixth lens crosses the optical axis to the inflection point on the object side of the sixth lens that is the fourth nearest to the optical axis. The distance perpendicular to the optical axis between the inflection point IF614 and the optical axis is HIF614 (instance). The image side of the sixth lens has one inflection point IF624 which is the fourth nearest to the optical axis and the sinkage value of the inflection point IF624 is denoted by SGI624 (instance). SGI624 is a horizontal distance parallel to the optical axis, which is from an intersection point where the image side of the sixth lens crosses the optical axis to the inflection point on the image side of the sixth lens that is the fourth nearest to the optical axis. The distance perpendicular to the optical axis between the inflection point IF624 and the optical axis is HIF624 (instance).

The inflection points on the object sides or the image side of the other lenses and the distances perpendicular to the optical axis thereof or the sinkage values thereof are denoted in a similar way described above.

The Lens Parameters Related to the Aberration

Optical distortion for image formation in the optical image capturing system is denoted by ODT. TV distortion for image formation in the optical image capturing system is denoted by TDT. Further, the degree of aberration offset within a range of 50% to 100% of the field of view of the image can be further limited. An offset of the spherical aberration is denoted by DFS. An offset of the coma aberration is denoted by DFC.

The transverse aberration of the margin of the aperture may be expressed as STA and evaluates the performance of the specific optical image capturing system. The transverse aberration at any field of view may be calculated by utilizing the tangential fan and the sagittal fan. Specifically, the transverse aberration at the longest operation wavelength (for instance, the wavelength is 650 nm) and the shortest operation wavelength (for instance, the wavelength is 470 nm) respectively passing through the margin of the aperture is calculated to act as the standard of the performance. The aforementioned coordinate direction of the tangential fan can be further divided into the positive direction (the upper ray) and the negative direction (the lower ray). The transverse aberration at the longest operation wavelength passing through the margin of the aperture defines the difference between the image position at the specific field of view where the longest operation wavelength passes through the margin of the aperture and strikes on the first image plane and the image position at the specific field of view where the chief ray of the reference wavelength (for instance, the wavelength is 555 nm) strikes on the first image plane. The transverse aberration at the shortest operation wavelength passing through the margin of the aperture defines the difference between the image position at the specific field of view where the shortest operation wavelength passes through the margin of the aperture and strikes on the first image plane and the image position at the specific field of view where the chief ray of the reference wavelength strikes on the first image plane. To evaluates the performance of the specific optical image capturing system, we can utilize that the transverse aberration at the 0.7 field of view (i.e., the 0.7 height of an image HOI) where the longest operation wavelength passes through the margin of the aperture and strikes on the first image plane and the transverse aberration at the 0.7 field of view (i.e., the 0.7 height of an image HOI) where the shortest operation wavelength passes through the margin of the aperture and strikes on the first image plane (i.e., the 0.7 height of an image HOI) both are less than 100 μm as a way of the examination. Even further, the way of the examination can be that the transverse aberration at the 0.7 field of view where the longest operation wavelength passes through the margin of the aperture and strikes on the first image plane and the transverse aberration at the 0.7 field of view where the shortest operation wavelength passes through the margin of the aperture and strikes on the first image plane are both less than 80 μm.

There is a maximum image height HOI of the optical image capturing system on the first image plane which is perpendicular to the optical axis. A lateral aberration of the longest operation wavelength of visible light of a positive tangential fan of the optical image capturing system passing through the margin of the entrance pupil and incident on the first image plane by 0.7 HOI may be denoted as PLTA, and a lateral aberration of the shortest operation wavelength of visible light of the positive tangential fan of the optical image capturing system passing through the margin of the entrance pupil and incident on the first image plane by 0.7 HOI may be denoted as PSTA. A lateral aberration of the longest operation wavelength of visible light of a negative tangential fan of the optical image capturing system passing through the margin of the entrance pupil and incident on the first image plane by 0.7 HOI may be denoted as NLTA, and a lateral aberration of the shortest operation wavelength of visible light of a negative tangential fan of the optical image capturing system passing through the margin of the entrance pupil and incident on the first image plane by 0.7 HOI may be denoted as NSTA. A lateral aberration of the longest operation wavelength of visible light of a sagittal fan of the optical image capturing system passing through the margin of the entrance pupil and incident on the first image plane by 0.7 HOI may be denoted as SLTA, and a lateral aberration of the shortest operation wavelength of visible light of the sagittal fan of the optical image capturing system passing through the margin of the entrance pupil and incident on the first image plane by 0.7 HOI is denoted as SSTA.

The present invention provides an optical image capturing system, an object side or an image side of the sixth lens may have an inflection point, such that the angle of incidence from each field of view to the sixth lens can be adjusted effectively and the optical distortion and the TV distortion can be corrected as well. Furthermore, the surfaces of the sixth lens may have a better optical path adjusting ability to acquire better image quality.

The present invention provides an optical image capturing system, from an object side to an image side, comprising a first lens, a second lens, a third lens, a fourth lens, a fifth lens, a sixth lens, and an image plane. The first lens has refractive power. An object-side surface and an image-side surface of the sixth lens are aspheric. Focal lengths of the first lens through the sixth lens are f1, f2, f3, f4, f5 and f6, respectively, and a focal length of the optical image capturing system is f, the entrance pupil diameter of the optical image capturing system is denoted by HEP, a distance on an optical axis from an object side of the first lens to the image plane is denoted by HOS, a distance on an optical axis from the object side of the first lens to the image side of the sixth lens is denoted by InTL, with a point on any surface of any one of the six lenses which crosses the optical axis defined as a starting point, a length of an outline curve from the starting point to a coordinate point of vertical height with a distance from the optical axis to ½ HEP on the surface along an outline of the surface is denoted by ARE, and the following conditions are satisfied:

$$1.2 \leq f/HEP \leq 10.0;\ 0 < InTL/HOS < 0.9;\ \text{and}\ 0.9 \leq 2(ARE/HEP) \leq 2.0.$$

The present invention provides an optical image capturing system, from an object side to an image side, comprising a first lens with negative refractive power, a second lens with refractive power, a third lens with refractive power, a fourth lens with refractive power, a fifth lens with refractive power, a sixth lens with refractive power, and an image plane. An object-side surface of the first lens on the optical axis is a convex surface, and an object-side surface and an image-side surface of the sixth lens are aspheric, a maximum height for image formation on the image plane perpendicular to an optical axis in the optical image capturing system is denoted by HOI, at least one lens among the second lens to the sixth lens has positive refractive power, a focal lengths of the first lens through the sixth lens are f1, f2, f3, f4, f5 and f6, respectively, and a focal length of the optical image capturing system is f, the entrance pupil diameter of the optical image capturing system is denoted by HEP, a distance on the optical axis from an object side of the first lens to the image plane is denoted by HOS, a distance on the optical axis from the object side of the first lens to the image side of the sixth lens is denoted by InTL, with a point on any surface of any one of the six lenses which crosses the optical axis defined as a starting point, a length of an outline curve from the starting point to a coordinate point of vertical height with a distance from the optical axis to ½ HEP on the surface along an outline of the surface is denoted by ARE, and the following conditions are satisfied:

1.2≤$f$/HEP≤10.0; 0<InTL/HOS<0.9; and 0.9≤2(ARE/HEP)≤1.5.

The present invention provides an optical image capturing system, from an object side to an image side, comprising a first lens with negative refractive power, a second lens with refractive power, a third lens with refractive power, a fourth lens with refractive power, a fifth lens with positive refractive power, a sixth lens with refractive power, and an image plane. A maximum height for image formation on the image plane perpendicular to an optical axis in the optical image capturing system is denoted by HOI, an object-side surface and an image-side surface of at least one of the first lens to the sixth lens are aspheric, at least one surface of at least one of the first lens to the sixth lens has at least one inflection point, focal lengths of the first lens through the sixth lens are f1, f2, f3, f4, f5 and f6, respectively, and a focal length of the optical image capturing system is f, the entrance pupil diameter of the optical image capturing system is denoted by HEP, a distance on an optical axis from an object side of the first lens to the image plane is denoted by HOS, a distance on an optical axis from the object side of the first lens to the image side of the sixth lens is denoted by InTL, with a point on any surface of any one of the six lenses which crosses the optical axis defined as a starting point, a length of an outline curve from the starting point to a coordinate point of vertical height with a distance from the optical axis to ½ HEP on the surface along an outline of the surface is denoted by ARE, and the following conditions are satisfied:

1.2≤$f$/HEP≤3.5; 0<InTL/HOS<0.9; and 0.9≤2(ARE/HEP)≤1.5.

The arc length of any surface of a single lens within the maximum effective half diameter affects the surface's ability to correct the aberration and the optical path differences between each of the fields of view. The longer the arc length is, the better the ability to correct the aberration will be. However, difficulties may be found in the manufacturing process. Therefore, it is necessary to control the arc length of any surface of a single lens within the maximum effective half diameter, especially the ratio (ARS/TP) between the arc length (ARS) of the surface within the maximum effective half diameter and the thickness (TP) of the lens to which the surface belongs on the optical axis. For instance, ARS11 denotes the arc length of the maximum effective half diameter of the object side surface of the first lens. TP1 denotes the thickness of the first lens on the optical axis. The ratio between the two is ARS11/TP1. ARS12 denotes the arc length of the maximum effective half diameter of the image side surface of the first lens. The ratio between ARS12 and TP1 is ARS12/TP1. ARS21 denotes the arc length of the maximum effective half diameter of the object side surface of the second lens. TP2 denotes the thickness of the second lens on the optical axis. The ratio between the two is ARS21/TP2. ARS22 denotes the arc length of the maximum effective half diameter of the image side surface of the second lens. The ratio between ARS22 and TP2 is ARS22/TP2. The ratio between the arc length of the maximum effective half diameter of any surface of the rest lenses in the optical image capturing module and the thickness (TP) of the lens to which the surface belongs on the optical axis may be deducted on this basis.

The arc length of any surface of a single lens within the height of half the entrance pupil diameter (HEP) particularly affects the surface's ability to correct the aberration and the optical path differences between each of the fields of view at the shared area. The longer the arc length is, the better the ability to correct the aberration will be. However, difficulties may be found in the manufacturing process. Therefore, it is necessary to control the arc length of any surface of a single lens within the height of half the entrance pupil diameter (HEP), especially the ratio (ARE/TP) between the arc length (ARE) of the surface within the height of the half the entrance pupil diameter (HEP) and the thickness (TP) of the lens to which the surface belongs on the optical axis. For instance, ARE11 denotes the arc length of the height of the half the entrance pupil diameter (HEP) of the object side surface of the first lens. TP1 denotes the thickness of the first lens on the optical axis. The ratio between the two is ARE11/TP1. ARE12 denotes the arc length of the height of the half the entrance pupil diameter (HEP) of the image side surface of the first lens. The ratio between ARE12 and TP1 is ARE12/TP1. ARE21 denotes the arc length of the height of the half the entrance pupil diameter (HEP) of the object side surface of the second lens. TP2 denotes the thickness of the second lens on the optical axis. The ratio between the two is ARE21/TP2. ARE22 denotes the arc length of the height of the half the entrance pupil diameter (HEP) of the image side surface of the second lens. The ratio between ARE22 and TP2 is ARE22/TP2. The ratio between the arc length of the height of the half the entrance pupil diameter (HEP) of any surface of the rest lenses in the optical image capturing module and the thickness (TP) of the lens to which the surface belongs on the optical axis may be deducted on this basis.

The height of optical system (HOS) may be reduced to achieve the minimization of the optical image capturing system when the absolute value of f1 is larger than f6 (|f1|>|f6|).

When |f2|+|f3|+|f4|+|f5| and |f1|+|f6| meet the aforementioned conditions, at least one lens among the second lens to the fifth lens may have a weak positive refractive power or a weak negative refractive power. The weak refractive power indicates that an absolute value of the focal length of a specific lens is greater than 10. When at least one lens among the second lens to the fifth lens has the weak positive refractive power, the positive refractive power of the first lens can be shared by this configuration, such that the unnecessary aberration will not appear too early. On the contrary, when at least one lens among the second lens to the fifth lens has the weak negative refractive power, the aberration of the optical image capturing system can be slightly corrected.

Besides, the sixth lens may have negative refractive power, and the image side thereof may be a concave surface. Hereby, this configuration is beneficial to shorten the back focal length of the optical image capturing system so as to keep the optical image capturing system minimized. Moreover, at least one surface of the sixth lens may possess at least one inflection point, which is capable of effectively reducing the incident angle of the off-axis rays, thereby further correcting the off-axis aberration.

BRIEF DESCRIPTION OF THE DRAWINGS

The detailed structure, operating principle and effects of the present invention will now be described in more details hereinafter with reference to the accompanying drawings that show various embodiments of the present invention as follows.

FIG. 5A is a schematic view of the optical image capturing system according to the fifth embodiment of the present invention.

DESCRIPTION OF THE PREFERRED EMBODIMENTS

Figure 1A:
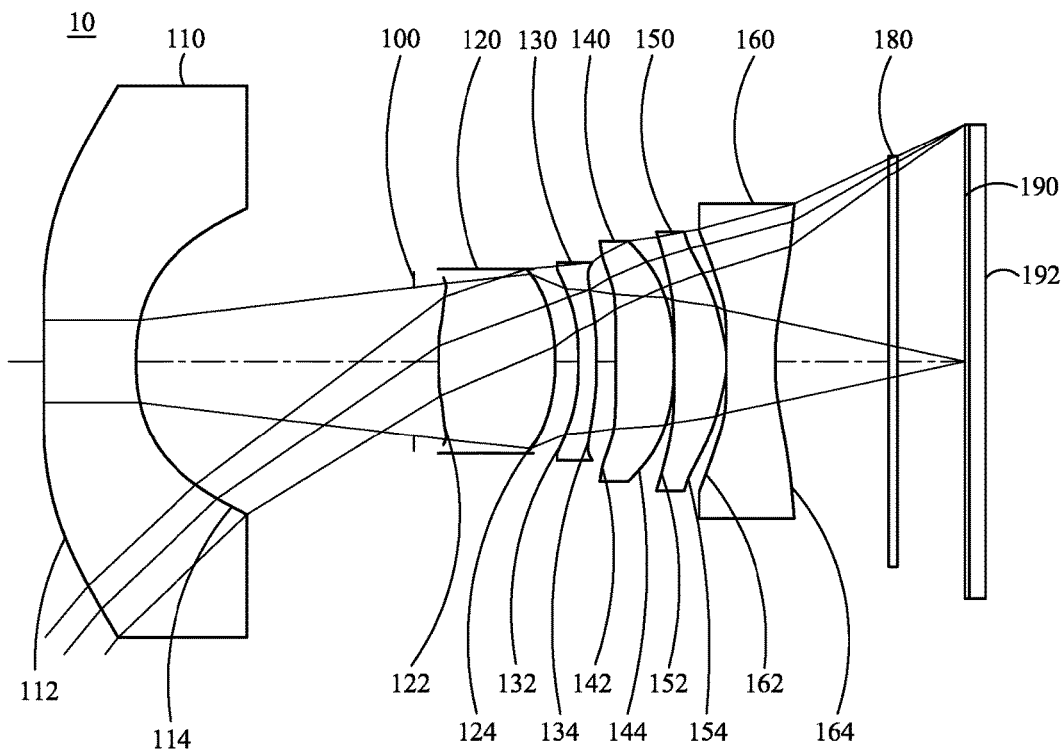
FIG. 1A is a schematic view of the optical image capturing system according to the first embodiment of the present invention.

The advantages, features, and technical methods of the present invention are to be explained in detail with reference to the exemplary embodiments and the figures for the purpose of being more easily to be understood. Moreover, the present invention may be realized in different forms, and should not be construed as being limited to the embodiments set forth herein. Conversely, for a person skilled in the art, the embodiments provided shall make the present invention convey the scope more thoroughly, comprehensively, and completely. In addition, the present invention shall be defined only by the appended claims.

An optical image capturing system is provided, which includes, in the order from the object side to the image side, a first lens, a second lens, a third lens, a fourth lens, a fifth lens, a sixth lens, and an image plane. The optical image capturing system may further include an image sensing device, which is disposed on the image plane.

The optical image capturing system may use three sets of visible light wavelengths which are respectively 486.1 nm, 587.5 nm and 656.2 nm, wherein 587.5 nm is served as the primary reference wavelength and a reference wavelength for retrieving technical features. The optical image capturing system may also use five sets of wavelengths which are respectively 470 nm, 510 nm, 555 nm, 610 nm and 650 nm, wherein 555 nm is served as the primary reference wavelength and a reference wavelength for retrieving technical features.

The ratio of the focal length f of the optical image capturing system to a focal length fp of each of lenses with positive refractive power is denoted by PPR. The ratio of the focal length f of the optical image capturing system to a focal length fn of each of lenses with negative refractive power is denoted by NPR. The sum of the PPR of all lenses with positive refractive power is ΣPPR. The sum of the NPR of all lenses with negative refractive power is ΣNPR. The control of the total refractive power and the total length of the optical image capturing system is favorable when following condition is satisfied: $0.5 \leq \Sigma PPR/|\Sigma NPR| \leq 15$. Preferably, the following condition is satisfied: $1 \leq \Sigma PPR/|\Sigma NPR| \leq 3.0$.

The optical image capturing system may further include an image sensing device which is disposed on an image plane. A half of a diagonal of an effective detection field of the image sensing device (imaging height or the maximum image height of the optical image capturing system) is HOI. The distance on the optical axis from the object side of the first lens to the image plane is HOS. The following conditions are satisfied: $HOS/HOI \leq 50$ and $0.5 \leq HOS/f \leq 150$. Preferably, the following conditions are satisfied: 1≤HOS/HOI≤40 and 1≤HOS/f≤140. Hereby, the miniaturization of the optical image capturing system can be maintained effectively, so as to be carried by lightweight portable electronic devices.

In addition, in the optical image capturing system of the present invention, according to different requirements, at least one aperture may be arranged for reducing stray light and improving the image quality.

Specifically, the disposition of the aperture may be a front aperture or a middle aperture in the optical image capturing module in the present invention. The front aperture is the aperture disposed between the shot object and the first lens. The middle aperture is the aperture disposed between the first lens and the image plane. If the aperture is the front aperture, a longer distance may be created between the exit pupil and the image plane in the optical image capturing module, so that more optical elements may be accommodated and the efficiency of image sensor elements receiving images may be increased. If the aperture is the middle aperture, the field of view of the system may be expended in such a way that the optical image capturing module has the advantages of a wide-angle lens. InS is defined as the distance from the aforementioned aperture to the image plane, which satisfies the following condition: 0.1≤InS/HOS≤1.1. Therefore, the features of the optical image capturing module maintained in miniaturization and having wide-angle may be attended simultaneously.

In the optical image capturing system of the present invention, the distance from the object side of the first lens to the image side of the sixth lens is InTL. A total central thickness of all lenses with refractive power on the optical axis is ΣTP. The following condition is satisfied: 0.1≤ΣTP/InTL≤0.9. Hereby, the contrast ratio for the image formation in the optical image capturing system and yield rate for manufacturing the lens can be given consideration simultaneously, and a proper back focal length is provided to dispose other optical components in the optical image capturing system.

The curvature radius of the object side of the first lens is R1. The curvature radius of the image side of the first lens is R2. The following condition is satisfied: 0.001≤|R1/R2|≤25. Hereby, the first lens may have proper strength of the positive refractive power, so as to avoid the longitudinal spherical aberration from increasing too fast. Preferably, the following condition may be satisfied: 0.01≤|R1/R2|<12.

The curvature radius of the object side of the sixth lens is R11. The curvature radius of the image side of the sixth lens is R12. The following condition is satisfied: −7<(R11−R12)/(R11+R12)<50. Hereby, the astigmatism generated by the optical image capturing system can be corrected beneficially.

The distance between the first lens and the second lens on the optical axis is IN12. The following condition is satisfied: IN12/f≤60. Hereby, the chromatic aberration of the lenses can be improved, such that the performance can be increased.

The distance between the fifth lens and the sixth lens on the optical axis is IN56. The following condition is satisfied: IN56/f≤3.0. Hereby, the chromatic aberration of the lenses can be improved, such that the performance can be increased.

Central thicknesses of the first lens and the second lens on the optical axis are respectively denoted by TP1 and TP2. The following condition is satisfied: 0.1≤(TP1+IN12)/TP2≤10. Hereby, the sensitivity produced by the optical image capturing system can be controlled, and the performance can be increased.

Central thicknesses of the fifth lens and the sixth lens on the optical axis are respectively denoted by TP5 and TP6, and a distance between the aforementioned two lenses on the optical axis is IN56. The following condition is satisfied: 0.1≤(TP6+IN56)/TP5≤15. Hereby, the sensitivity produced by the optical image capturing system can be controlled and the total height of the optical image capturing system can be reduced.

Central thicknesses of the second lens, the third lens and the fourth lens on the optical axis are respectively denoted by TP2, TP3 and TP4. The distance between the second lens and the third lens on the optical axis is IN23. A distance between the third lens and the forth lens on the optical axis is IN34. A distance between the fourth lens and the fifth lens on the optical axis is IN45. The distance between an object side of the first lens and an image side of the sixth lens is InTL. The following condition is satisfied: 0.1≤TP4/(IN34+TP4+IN45)<1. Hereby, this configuration is helpful to slightly correct the aberration of the propagating process of the incident light layer by layer, and decrease the total height of the optical image capturing system.

In the optical image capturing system of the first embodiment, a distance perpendicular to the optical axis between a critical point C61 on an object side of the sixth lens and the optical axis is HVT61. The distance perpendicular to the optical axis between a critical point C62 on an image side of the sixth lens and the optical axis is HVT62. The horizontal distance parallel to the optical axis from an intersection point where the object side of the sixth lens crosses the optical axis to the critical point C61 may be expressed as SGC61. The horizontal distance parallel to the optical axis from an intersection point where the image side of the sixth lens crosses the optical axis to the critical point C62 may be expressed as SGC62. The following conditions may be satisfied: 0 mm≤HVT61≤3 mm, 0 mm<HVT62≤6 mm, 0≤HVT61/HVT62, 0 mm≤|SGC61|≤0.5 mm; 0 mm<|SGC62|≤2 mm and 0<|SGC62|/(|SGC62|+TP6)≤0.9. Hereby, the aberration of the off-axis field of view can be corrected effectively.

The following condition is satisfied for the optical image capturing system of the present invention: 0.2≤HVT62/HOI≤0.9. Preferably, the following condition may be satisfied: 0.3≤HVT62/HOI≤0.8. Hereby, the aberration at surrounding field of view for the optical image capturing system can be corrected beneficially.

The following condition is satisfied for the optical image capturing system of the present invention: 0≤HVT62/HOS≤0.5. Preferably, the following condition may be satisfied: 0.2≤HVT62/HOS≤0.45. Hereby, the aberration at surrounding field of view for the optical image capturing system can be corrected beneficially.

In the optical image capturing system of the present invention, the horizontal distance parallel to an optical axis from an inflection point on the object side of the sixth lens which is the first nearest to the optical axis to an intersection point where the object side of the sixth lens crosses the optical axis is denoted by SGI611. The horizontal distance parallel to an optical axis from an inflection point on the image side of the sixth lens which is the first nearest to the optical axis to an intersection point where the image side of the sixth lens crosses the optical axis is denoted by SGI621. The following conditions may be satisfied: 0<SGI611/(SGI611+TP6)≤0.9 and 0<SGI621/(SGI621+TP6)≤0.9.

Preferably, the following conditions may be satisfied: 0.1≤SGI611/(SGI611+TP6)≤0.6 and 0.1≤SGI621/(SGI621+TP6)≤0.6.

The horizontal distance parallel to the optical axis from the inflection point on the object side of the sixth lens which is the second nearest to the optical axis to an intersection point where the object side of the sixth lens crosses the optical axis is denoted by SGI612. The horizontal distance parallel to an optical axis from an inflection point on the image side of the sixth lens which is the second nearest to the optical axis to an intersection point where the image side of the sixth lens crosses the optical axis is denoted by SGI622. The following conditions may be satisfied: 0<SGI612/(SGI612+TP6)≤0.9 and 0<SGI622/(SGI622+TP6)≤0.9. Preferably, the following conditions may be satisfied: 0.1≤SGI612/(SGI612+TP6)≤0.6 and 0.1≤SGI622/(SGI622+TP6)≤0.6.

The distance perpendicular to the optical axis between the inflection point on the object side of the sixth lens which is the first nearest to the optical axis and the optical axis is denoted by HIF611. The distance perpendicular to the optical axis between an intersection point where the image side of the sixth lens crosses the optical axis and an inflection point on the image side of the sixth lens which is the first nearest to the optical axis is denoted by HIF621. The following conditions may be satisfied: 0.001 mm≤|HIF611|≤5 mm and 0.001 mm≤|HIF621|≤5 mm. Preferably, the following conditions may be satisfied: 0.1 mm≤|HIF611|≤3.5 mm and 1.5 mm≤|HIF621|≤3.5 mm.

The distance perpendicular to the optical axis between the inflection point on the object side of the sixth lens which is the second nearest to the optical axis and the optical axis is denoted by HIF612. The distance perpendicular to the optical axis between an intersection point where the image side of the sixth lens crosses the optical axis and an inflection point on the image side of the sixth lens which is the second nearest to the optical axis is denoted by HIF622. The following conditions may be satisfied: 0.001 mm≤|HIF612|≤5 mm and 0.001 mm≤|HIF622|≤5 mm. Preferably, the following conditions may be satisfied: 0.1 mm≤|HIF622|≤3.5 mm and 0.1 mm≤|HIF612|≤3.5 mm.

The distance perpendicular to the optical axis between the inflection point on the object side of the sixth lens which is the third nearest to the optical axis and the optical axis is denoted by HIF613. The distance perpendicular to the optical axis between an intersection point where the image side of the sixth lens crosses the optical axis and an inflection point on the image side of the sixth lens which is the third nearest to the optical axis is denoted by HIF623. The following conditions may be satisfied: 0.001 mm≤|HIF613|≤5 mm and 0.001 mm≤|HIF623|≤5 mm. Preferably, the following conditions may be satisfied: 0.1 mm≤|HIF623|≤3.5 mm and 0.1 mm≤|HIF613|≤3.5 mm.

The distance perpendicular to the optical axis between the inflection point on the object side of the sixth lens which is the fourth nearest to the optical axis and the optical axis is denoted by HIF614. The distance perpendicular to the optical axis between an intersection point where the image side of the sixth lens crosses the optical axis and an inflection point on the image side of the sixth lens which is the fourth nearest to the optical axis is denoted by HIF624. The following conditions are satisfied: 0.001 mm≤|HIF614|≤5 mm and 0.001 mm≤|HIF624|≤5 mm. Preferably, the following conditions may be satisfied: 0.1 mm≤|HIF624|≤3.5 mm and 0.1 mm≤|HIF614|≤3.5 mm.

In one embodiment of the optical image capturing system of the present invention, the chromatic aberration of the optical image capturing system can be corrected by alternatively arranging the lenses with large coefficient of dispersion and small coefficient of dispersion.

The equation for the aspheric surface as mentioned above is:

$$z=ch^2/[1+[1(k+1)c^2h^2]^{0.5}]+A4h^4+A6h^6+A8h+A10h^{10}+A12h^{12}+A14h^{14}+A16h^{16}+A18h^{18}+A20h^{20}+\ldots \quad (1)$$

wherein, z is the position value of the position along the optical axis at the height h where the surface apex is regarded as a reference; k is the conic coefficient; c is the reciprocal of curvature radius; and A4, A6, A8, A10, A12, A14, A16, A18, and A20 are high order aspheric coefficients.

In the optical image capturing module provided by the present disclosure, the material of the lens may be made of glass or plastic. Using plastic as the material for producing the lens may effectively reduce the cost of manufacturing. In addition, using glass as the material for producing the lens may control the heat effect and increase the designed space configured by the refractive power of the optical image capturing module. Moreover, the object side surface and the image side surface from the first lens to the sixth lens may be aspheric, which may obtain more control variables. Apart from eliminating the aberration, the number of lenses used may be reduced compared with that of traditional lenses used made by glass. Thus, the total height of the optical image capturing module may be reduced effectively.

Furthermore, in the optical image capturing system provided by the present invention, when the surface of the lens is a convex surface, the surface of the lens adjacent to the optical axis is convex in principle, and when the surface of the lens is a concave surface, the surface of the lens adjacent to the optical axis is concave in principle.

The optical image capturing system of the present invention can be applied to the optical image capturing system with automatic focus based on the demand and has the characteristics of good aberration correction and good image quality. Thereby, the optical image capturing system expands the application aspect.

The optical image capturing system of the present invention can further include a driving module based on the demand. The driving module may be coupled with the lens and enable the movement of the lens. The foregoing driving module may be the voice coil motor (VCM) which is applied to move the lens to focus, or may be the optical image stabilization (OIS) which is applied to reduce the frequency which lead to the out focus due to the vibration of the camera lens in the shooting process.

At least one of the first lens, the second lens, the third lens, the fourth lens, the fifth lens and the sixth lens of the optical image capturing system of the present invention may further be designed as a light filtering element with a wavelength of less than 500 nm based on the demand. The light filtering element may be made by coating film on at least one surface of that lens with certain filtering function, or forming that lens with material that can filter light with short wavelength.

The image plane of the optical image capturing system of the present invention may be a plane or a curved surface based on the design requirements. When the image plane is a curved surface (e.g. a spherical surface with curvature radius), the decrease of the required incident angle to focus rays on the image plane is helpful. In addition to the aid of the miniaturization of the length of the optical image capturing system (TTL), this configuration is helpful to elevate the relative illumination at the same time.

According to the above embodiments, the specific embodiments with figures are presented in detail as below.

First Embodiment

Figure 1B:
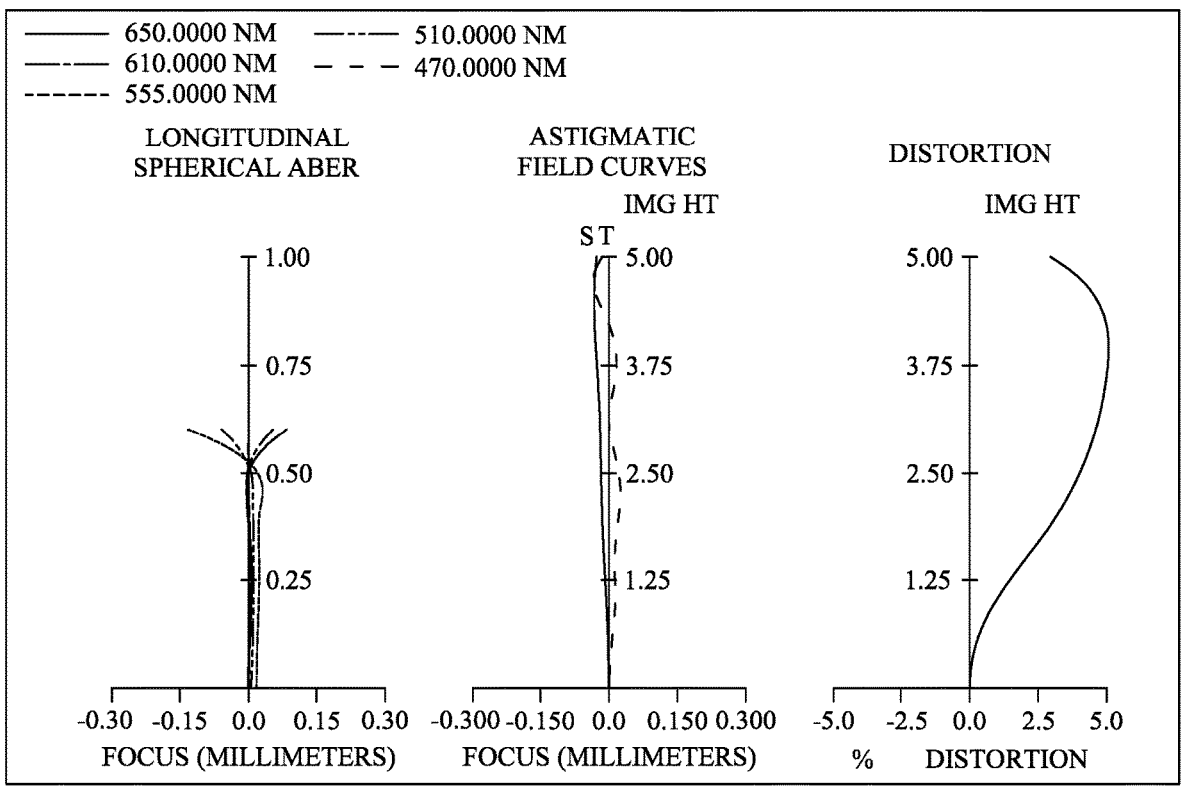
FIG. 1B is a curve diagram illustrating the spherical aberration, astigmatism and optical distortion of the optical image capturing system in order from left to right according to the first embodiment of the present invention.
Figure 1C:
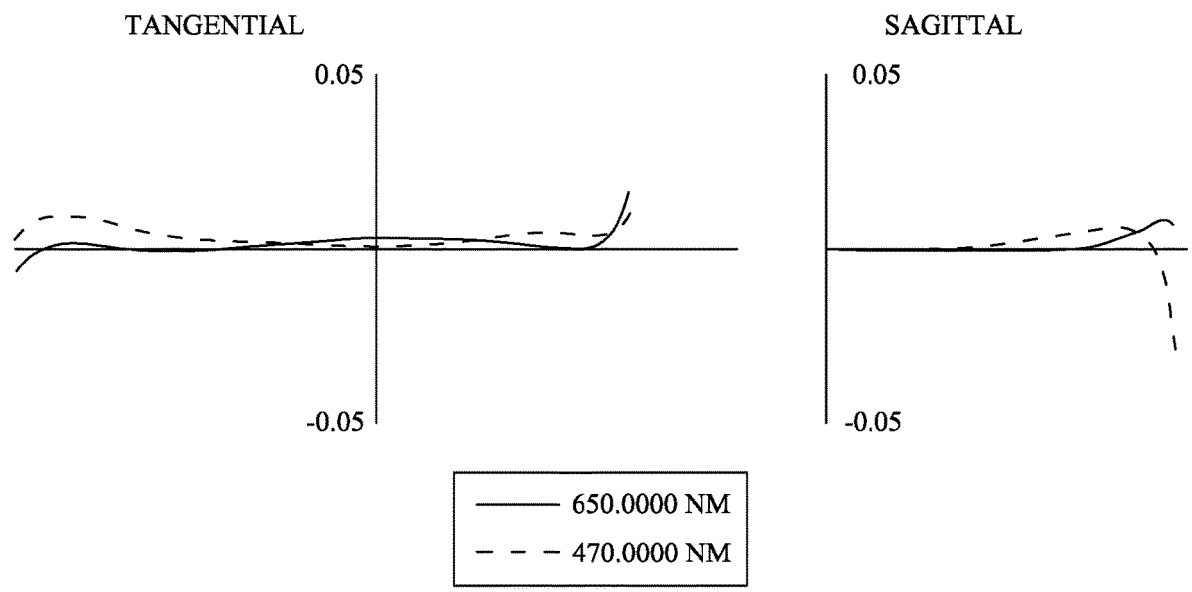
FIG. 1C shows the sagittal fan and the tangential fan of the optical image capturing system and the lateral aberration diagram of the longest operation wavelength and the shortest operation wavelength passing thorough the margin of the aperture at 0.7 field of view according to the first embodiment of the present invention.

Please refer to FIGS. 1A to 1C. FIG. 1A is a schematic view of the optical image capturing system according to the first embodiment of the present invention. FIG. 1B is a curve diagram illustrating the spherical aberration, astigmatism and optical distortion of the optical image capturing system in order from left to right according to the first embodiment of the present invention. FIG. 1C shows the sagittal fan and the tangential fan of the optical image capturing system and the lateral aberration diagram of the longest operation wavelength and the shortest operation wavelength passing thorough the margin of the aperture at 0.7 field of view according to the first embodiment of the present invention. As shown in FIG. 1A, an optical image capturing system includes, in the order from the object side to the image side, a first lens 110, an aperture 100, a second lens 120, a third lens 130, a fourth lens 140, a fifth lens 150, a sixth lens 160, an IR-cut filter 180, an image plane 190, and an image sensor element 192.

The first lens 110 has negative refractive power and is made of plastic. The object side 112 of the first lens 110 is a concave surface and the image side 114 of the first lens 110 is a concave surface, and the object side 112 and the image side 114 of are aspheric. The object side 112 has two inflection points. ARS11 denotes the arc length of the maximum effective half diameter of the object side surface of the first lens. ARS12 denotes the arc length of the maximum effective half diameter of the image side surface of the first lens. ARE11 denotes the arc length of half the entrance pupil diameter (HEP) of the object side surface of the first lens. ARE12 denotes the arc length of half the entrance pupil diameter (HEP) of the image side surface of the first lens. TP1 is the thickness of the first lens on the optical axis.

SGI111 denotes a distance parallel to the optical axis from the inflection point on the object side surface of the first lens which is the nearest to the optical axis to an axial point on the object side surface of the first lens. SGI121 denotes a distance parallel to an optical axis from an inflection point on the image side surface of the first lens which is the nearest to the optical axis to an axial point on the image side surface of the first lens. The following conditions are satisfied: SGI111=−0.0031 mm; |SGI111|/(|SGI111|+TP1)=0.0016.

SGI112 denotes the distance parallel to the optical axis from the inflection point on the object side surface of the first lens which is the second nearest to the optical axis to an axial point on the object side surface of the first lens. SGI122 denotes the distance parallel to an optical axis from an inflection point on the image side surface of the first lens which is the second nearest to the optical axis to an axial point on the image side surface of the first lens. The following conditions are satisfied: SGI112=1.3178 mm; |SGI112|/(|SGI112|+TP1)=0.4052.

HIF111 denotes the distance perpendicular to the optical axis between the inflection point on the object side surface of the first lens which is the nearest to the optical axis and the optical axis. HIF121 denotes the distance perpendicular to the optical axis between an axial point on the image side surface of the first lens and an inflection point on the image side surface of the first lens which is the nearest to the optical axis. The following conditions are satisfied: HIF111=0.5557 mm; HIF111/HOI=0.1111.

HIF112 denotes the distance perpendicular to the optical axis between the inflection point on the object side surface of the first lens which is the second nearest to the optical axis and the optical axis. HIF122 denotes the distance perpendicular to the optical axis between an axial point on the image side surface of the first lens and an inflection point on the image side surface of the first lens which is the second nearest to the optical axis. The following conditions are satisfied: HIF112=5.3732 mm; HIF112/HOI=1.0746.

The second lens 120 has positive refractive power and is made of plastic. The object side 122 of the second lens 120 is a convex surface and the image side 124 of the second lens 120 is a convex surface, and the object side 122 and the image side 124 are aspheric. The object side 122 has one inflection point. ARS21 denotes the arc length of the maximum effective half diameter of the object side surface of the second lens. ARS22 denotes the arc length of the maximum effective half diameter of the image side surface of the second lens. ARE21 denotes an arc length of half the entrance pupil diameter (HEP) of the object side surface of the second lens. ARE22 denotes the arc length of half the entrance pupil diameter (HEP) of the image side surface of the second lens. TP2 is the thickness of the second lens on the optical axis.

The horizontal distance parallel to the optical axis from an inflection point on the object side of the second lens that is the first nearest to the optical axis to the intersection point where the object side of the second lens crosses the optical axis is denoted by SGI211. The horizontal distance parallel to the optical axis from an inflection point on the image side of the second lens that is the first nearest to the optical axis to the intersection point where the image side of the second lens crosses the optical axis is denoted by SGI221. The following conditions are satisfied: SGI211=0.1069 mm, |SGI211|/(|SGI211|+TP2)=0.0412, SGI221=0 mm, and |SGI221|/(|SGI221|+TP2)=0.

The perpendicular distance from the inflection point on the object side of the second lens that is the first nearest to the optical axis to the optical axis is denoted by HIF211. The distance perpendicular to the optical axis from the inflection point on the image side of the second lens that is the first nearest to the optical axis to the intersection point where the image side of the second lens crosses the optical axis is denoted by HIF221. The following conditions are satisfied: HIF211=1.1264 mm, HIF211/HOI=0.2253, HIF221=0 mm and HIF221/HOI=0.

The third lens 130 has negative refractive power and is made of plastic. An object side 132 of the third lens 130 is a concave surface and an image side 134 of the third lens 130 is a convex surface, and the object side 132 and the image side 134 are both aspheric. The object side 132 has one inflection point, and the image side 134 has one inflection point. The length of the maximum effective half diameter outline curve of the object side of the third lens is denoted by ARS31. The length of the maximum effective half diameter outline curve of the image side of the third lens is denoted by ARS32. The length of the ½ entrance pupil diameter (HEP) outline curve of the object side of the third lens is denoted by ARE31. The length of the ½ entrance pupil diameter (HEP) outline curve of the image side of the third lens is denoted by ARE32. The thickness of the third lens on the optical axis is denoted by TP3.

The distance parallel to the optical axis from an inflection point on the object side of the third lens that is the first nearest to the optical axis to an intersection point where the object side of the third lens crosses the optical axis is denoted by SGI311. The distance parallel to the optical axis from an inflection point on the image side of the third lens that is the first nearest to the optical axis to an intersection point where the image side of the third lens crosses the optical axis is denoted by SGI321. The following conditions are satisfied:

$$SGI311=-0.3041 \text{ mm}, |SGI311|/(|SGI311|+TP3)=0.4445, SGI321=-0.1172 \text{ mm and } |SGI321|/(|SGI321|+TP3)=0.2357.$$

The perpendicular distance between the inflection point on the object side of the third lens that is the first nearest to the optical axis and the optical axis is denoted by HIF311. The distance perpendicular to the optical axis between the inflection point on the image side of the third lens that is the first nearest to the optical axis and the intersection point where the image side of the third lens crosses the optical axis is denoted by HIF321. The following conditions are satisfied: HIF311=1.5907 mm, HIF311/HOI=0.3181, HIF321=1.3380 mm and HIF321/HOI=0.2676.

The fourth lens 140 has positive refractive power and is made of plastic. An object side 142 of the fourth lens 140 is a convex surface and an image side 144 of the fourth lens 140 is a concave surface, and the object side 142 and the image side 144 of the fourth lens 140 are both aspheric. The object side 142 has two inflection points, and the image side 144 has one inflection point. The length of the maximum effective half diameter outline curve of the object side of the fourth lens is denoted by ARS41. The length of the maximum effective half diameter outline curve of the image side of the fourth lens is denoted by ARS42. The length of the ½ entrance pupil diameter (HEP) outline curve of the object side of the fourth lens is denoted by ARE41. The length of the ½ entrance pupil diameter (HEP) outline curve of the image side of the fourth lens is denoted by ARE42. The thickness of the fourth lens on the optical axis is denoted by TP4.

The horizontal distance parallel to the optical axis from an inflection point on the object side of the fourth lens that is the first nearest to the optical axis to the intersection point where the object side of the fourth lens crosses the optical axis is denoted by SGI411. The horizontal distance parallel to the optical axis from an inflection point on the image side of the fourth lens that is the first nearest to the optical axis to the intersection point where the image side of the fourth lens crosses the optical axis is denoted by SGI421. The following conditions are satisfied: SGI411=0.0070 mm, |SGI411|/(|SGI411|+TP4)=0.0056, SGI421=0.0006 mm and |SGI421|/(|SGI421|+TP4)=0.0005.

The horizontal distance parallel to the optical axis from an inflection point on the object side of the fourth lens that is the second nearest to the optical axis to the intersection point where the object side of the fourth lens crosses the optical axis is denoted by SGI412. The horizontal distance parallel to the optical axis from an inflection point on the image side of the fourth lens that is the second nearest to the optical axis to the intersection point where the image side of the fourth lens crosses the optical axis is denoted by SGI422. The following conditions are satisfied: SGI412=−0.2078 mm and |SGI412|/(|SGI412|+TP4)=0.1439.

The perpendicular distance between the inflection point on the object side of the fourth lens that is the first nearest to the optical axis and the optical axis is denoted by HIF411. The distance perpendicular to the optical axis between the inflection point on the image side of the fourth lens that is the first nearest to the optical axis and the intersection point where the image side of the fourth lens crosses the optical axis is denoted by HIF421. The following conditions are satisfied: HIF411=0.4706 mm, HIF411/HOI=0.0941, HIF421=0.1721 mm, and HIF421/HOI=0.0344.

The perpendicular distance between the inflection point on the object side of the fourth lens that is the second nearest to the optical axis and the optical axis is denoted by HIF412. The distance perpendicular to the optical axis between the inflection point on the image side of the fourth lens that is the second nearest to the optical axis and the intersection point where the image side of the fourth lens crosses the optical axis is denoted by HIF422. The following conditions are satisfied: HIF412=2.0421 mm and HIF412/HOI=0.4084.

The fifth lens 150 has positive refractive power and is made of plastic. An object side 152 of the fifth lens 150 is a convex surface and an image side 154 of the fifth lens 150 is a convex surface, and the object side 152 and the image side 154 are both aspheric. The object side 152 has two inflection points and the image side 154 has one inflection point. The length of the maximum effective half diameter outline curve of the object side of the fifth lens is denoted by ARS51. The length of the maximum effective half diameter outline curve of the image side of the fifth lens is denoted by ARS52. The length of the ½ entrance pupil diameter (HEP) outline curve of the object side of the fifth lens is denoted by ARE51. The length of the ½ entrance pupil diameter (HEP) outline curve of the image side of the fifth lens is denoted by ARE52. The thickness of the fifth lens on the optical axis is denoted by TP5.

The horizontal distance parallel to the optical axis from an inflection point on the object side of the fifth lens that is the first nearest to the optical axis to the intersection point where the object side of the fifth lens crosses the optical axis is denoted by SGI511. The horizontal distance parallel to the optical axis from an inflection point on the image side of the fifth lens that is the first nearest to the optical axis to the intersection point where the image side of the fifth lens crosses the optical axis is denoted by SGI521. The following conditions are satisfied: SGI511=0.00364 mm, |SGI511|/(|SGI511|+TP5)=0.00338, SGI521=−0.63365 mm, and |SGI521|/(|SGI521|+TP5)=0.37154.

The horizontal distance parallel to the optical axis from an inflection point on the object side of the fifth lens that is the second nearest to the optical axis to the intersection point where the object side of the fifth lens crosses the optical axis is denoted by SGI512. The horizontal distance parallel to the optical axis from an inflection point on the image side of the fifth lens that is second nearest to the optical axis to the intersection point where the image side of the fifth lens crosses the optical axis is expressed as SGI522. The following conditions are satisfied: SGI512=−0.32032 mm and |SGI512|/(|SGI512|+TP5)=0.23009.

The horizontal distance parallel to the optical axis from an inflection point on the object side of the fifth lens that is the third nearest to the optical axis to the intersection point where the object side of the fifth lens crosses the optical axis is denoted by SGI513. The horizontal distance parallel to the optical axis from an inflection point on the image side of the fifth lens that is the third nearest to the optical axis to the intersection point where the image side of the fifth lens crosses the optical axis is denoted by SGI523. The following conditions are satisfied: SGI513=0 mm, |SGI513|/(|SGI513|+TP5)=0, SGI523=0 mm and |SGI523|/(|SGI523|+TP5)=0.

The horizontal distance parallel to the optical axis from an inflection point on the object side of the fifth lens that is the fourth nearest to the optical axis to the intersection point where the object side of the fifth lens crosses the optical axis is denoted by SGI514. The horizontal distance parallel to the optical axis from an inflection point on the image side of the fifth lens that is the fourth nearest to the optical axis to the intersection point where the image side of the fifth lens crosses the optical axis is denoted by SGI524. The following conditions are satisfied: SGI514=0 mm, |SGI514|/(|SGI514|+TP5)=0, SGI524=0 mm, and |SGI524|/(|SGI524|+TP5)=0.

The perpendicular distance between the optical axis and the inflection point on the object side of the fifth lens that is the first nearest to the optical axis is denoted by HIF511. The perpendicular distance between the optical axis and the inflection point on the image side of the fifth lens that is the first nearest to the optical axis is denoted by HIF521. The following conditions are satisfied: HIF511=0.28212 mm, HIF511/HOI=0.05642, HIF521=2.13850 mm and HIF521/HOI=0.42770.

The perpendicular distance between the inflection point on the object side of the fifth lens that is the second nearest to the optical axis and the optical axis is denoted by HIF512. The perpendicular distance between the inflection point on the image side of the fifth lens that is the second nearest to the optical axis and the optical axis is denoted by HIF522. The following conditions are satisfied: HIF512=2.51384 mm and HIF512/HOI=0.50277.

The perpendicular distance between the inflection point on the object side of the fifth lens that is the third nearest to the optical axis and the optical axis is denoted by HIF513. The perpendicular distance between the inflection point on the image side of the fifth lens that is the third nearest to the optical axis and the optical axis is denoted by HIF523. The following conditions are satisfied: HIF513=0 mm, HIF513/HOI=0, HIF523=0 mm and HIF523/HOI=0.

The perpendicular distance between the inflection point on the object side of the fifth lens that is the fourth nearest to the optical axis and the optical axis is denoted by HIF514. The perpendicular distance between the inflection point on the image side of the fifth lens that is the fourth nearest to the optical axis and the optical axis is denoted by HIF524. The following conditions are satisfied: HIF514=0 mm, HIF514/HOI=0, HIF524=0 mm and HIF524/HOI=0.

The sixth lens 160 has negative refractive power and is made of plastic. An object side 162 of the sixth lens 160 is a concave surface and an image side 164 of the sixth lens 160 is a concave surface. The object side 162 has two inflection points and the image side 164 has one inflection point. Hereby, the angle of incidence from each field of view to the sixth lens can be adjusted effectively and the aberration of the optical image capturing system can be improved. The length of the maximum effective half diameter outline curve of the object side of the sixth lens is denoted by ARS61. The length of the maximum effective half diameter outline curve of the image side of the sixth lens is denoted by ARS62. The length of the ½ entrance pupil diameter (HEP) outline curve of the object side of the sixth lens is denoted by ARE61. The length of the ½ entrance pupil diameter (HEP) outline curve of the image side of the sixth lens is denoted by ARE62. The thickness of the sixth lens on the optical axis is denoted by TP6.

The horizontal distance parallel to the optical axis from an inflection point on the object side of the sixth lens that is the first nearest to the optical axis to the intersection point where the object side of the sixth lens crosses the optical axis is denoted by SGI611. The horizontal distance parallel to the optical axis from an inflection point on the image side of the sixth lens that is the first nearest to the optical axis to the intersection point where the image side of the sixth lens crosses the optical axis is denoted by SGI621. The following conditions are satisfied: SGI611=−0.38558 mm, |SGI611|/(|SGI611|+TP6)=0.27212, SGI621=0.12386 mm and |SGI621|/(|SGI621|+TP6)=0.10722.

The horizontal distance parallel to the optical axis from an inflection point on the object side of the sixth lens that is the second nearest to the optical axis to an intersection point where the object side of the sixth lens crosses the optical axis is denoted by SGI612. The horizontal distance parallel to the optical axis from an inflection point on the image side of the sixth lens that is the second nearest to the optical axis to the intersection point where the image side of the sixth lens crosses the optical axis is denoted by SGI622. The following conditions are satisfied: SGI612=−0.47400 mm, |SGI612|/(|SGI612|+TP6)=0.31488, SGI622=0 mm and |SGI622|/(|SGI622|+TP6)=0.

The horizontal distance parallel to the optical axis from an inflection point on the object side of the sixth lens that is the second nearest to the optical axis to an intersection point where the object side of the sixth lens crosses the optical axis is denoted by SGI612. The horizontal distance parallel to the optical axis from an inflection point on the image side of the sixth lens that is the second nearest to the optical axis to the intersection point where the image side of the sixth lens crosses the optical axis is denoted by SGI622. The following conditions are satisfied: SGI612=−0.47400 mm, |SGI612|/(|SGI612|+TP6)=0.31488, SGI622=0 mm, and |SGI622|/(|SGI622|+TP6)=0.

The perpendicular distance between the inflection point on the object side of the sixth lens that is the first nearest to the optical axis and the optical axis is denoted by HIF611. The perpendicular distance between the inflection point on the image side of the sixth lens that is the first nearest to the optical axis and the optical axis is denoted by HIF621. The following conditions are satisfied: HIF611=2.24283 mm, HIF611/HOI=0.44857, HIF621=1.07376 mm and HIF621/HOI=0.21475.

The perpendicular distance between the inflection point on the object side of the sixth lens that is the second nearest to the optical axis and the optical axis is denoted by HIF612. The perpendicular distance between the inflection point on the image side of the sixth lens that is the second nearest to the optical axis and the optical axis is denoted by HIF622. The following conditions are satisfied: HIF612=2.48895 mm and HIF612/HOI=0.49779.

The perpendicular distance between the inflection point on the object side of the sixth lens that is the third nearest to the optical axis and the optical axis is denoted by HIF613. The perpendicular distance between the inflection point on the image side of the sixth lens that is the third nearest to the optical axis and the optical axis is denoted by HIF623. The following conditions are satisfied: HIF613=0 mm, HIF613/HOI=0, HIF623=0 mm and HIF623/HOI=0.

The perpendicular distance between the inflection point on the object side of the sixth lens that is fourth nearest to the optical axis and the optical axis is denoted by HIF614. The perpendicular distance between the inflection point on the image side of the sixth lens that is the fourth nearest to the optical axis and the optical axis is denoted by HIF624. The following conditions are satisfied: HIF614=0 mm, HIF614/HOI=0, HIF624=0 mm and HIF624/HOI=0.

The IR-cut filter 180 is made of glass, and disposed between the sixth lens 160 and the image plane 190, and does not affect the focal length of the optical image capturing system.

In the optical image capturing system of the first embodiment, the focal length of the optical image capturing system is denoted by f, the entrance pupil diameter of the optical image capturing system is denoted by HEP, and a half maximum angle of view of the optical image capturing system is denoted by HAF. The detailed parameters are shown as below: f=4.075 mm, f/HEP=1.4, HAF=50.001° and tan(HAF)=1.1918.

In the optical image capturing system of the first embodiment, the focal length of the first lens 110 is denoted by f1 and the focal length of the sixth lens 160 is denoted by f6. The following conditions are satisfied: f1=−7.828 mm, |f/f1|=0.52060, f6=−4.886 mm and |f1|>|f6|.

In the optical image capturing system of the first embodiment, focal lengths of the second lens 120 to the fifth lens 150 are denoted by f2, f3, f4 and f5, respectively. The following conditions are satisfied: |f2|+|f3|+|f4|+|f5|=95.50815 mm, |f1|+|f6|=12.71352 mm and |f2|+|f3|+|f4|+|f5|>|f1|+|f6|.

The ratio of the focal length f of the optical image capturing system to the focal length fp of each of lens with positive refractive power is denoted by PPR. The ratio of the focal length f of the optical image capturing system to a focal length fn of each of lens with negative refractive power is denoted by NPR. In the optical image capturing system of the first embodiment, the sum of the PPR of all lenses with positive refractive power is ΣPPR=f/f2+f/f4+f/f5=1.63290. The sum of the NPR of all lenses with negative refractive powers is ΣNPR=|f/f1|+|f/f3|+|f/f6|=1.51305, ΣPPR/|ΣNPR|=1.07921. Simultaneously, the following conditions are also satisfied: |f/f2|=0.69101, |f/f3|=0.15834, |f/f4|=0.06883, |f/f5|=0.87305 and |f/f6|=0.83412.

In the optical image capturing system of the first embodiment, the distance from the object side 112 of the first lens 110 to the image side 164 of the sixth lens 160 is denoted by InTL. The distance from the object side 112 of the first lens to the image plane 190 is denoted by HOS. The distance from the aperture 100 to the image plane 180 is denoted by InS. A half diagonal length of the effective detection field of the image sensing device is denoted by HOI. The distance from the image side 164 of the sixth lens to the image plane is denoted by BFL. The following conditions are satisfied: InTL+BFL=HOS, HOS=19.54120 mm, HOI=5.0 mm, HOS/HOI=3.90824, HOS/f=4.7952, InS=11.685 mm, and InS/HOS=0.59794.

In the optical image capturing system of the first embodiment, a total thickness of all lenses with refractive power on the optical axis is denoted by ΣTP. The following conditions are satisfied: ΣTP=8.13899 mm and ΣTP/InTL=0.52477. Hereby, this configuration can keep the contrast ratio of the optical image capturing system and the yield rate about manufacturing lens at the same time, and provide the proper back focal length so as to accommodate other elements.

In the optical image capturing system of the first embodiment, the curvature radius of the object side 112 of the first lens is denoted by R1. The curvature radius of the image side 114 of the first lens is denoted by R2. The following condition is satisfied: |R1/R2|=8.99987. Hereby, the first lens has a suitable magnitude of positive refractive power, so as to prevent the longitudinal spherical aberration from increasing too fast.

In the optical image capturing system of the first embodiment, the curvature radius of the object side 162 of the sixth lens is denoted by R11. The curvature radius of the image side 164 of the sixth lens is denoted by R12. The following condition is satisfied: (R11−R12)/(R11+R12)=1.27780. Hereby, this configuration is beneficial for correcting the astigmatism generated by the optical image capturing system.

In the optical image capturing system of the first embodiment, the sum of focal lengths of all lenses with positive refractive power is denoted by ΣPP. The following conditions are satisfied: ΣPP=f2+f4+f5=69.770 mm and f5/(f2+f4+f5)=0.067. Hereby, this configuration is helpful to distribute the positive refractive power of a single lens to other lens with positive refractive powers in an appropriate way, so as to suppress the generation of noticeable aberrations in the propagating process of the incident light in the optical image capturing system.

In the optical image capturing system of the first embodiment, the sum of focal lengths of all lenses with negative refractive power is denoted by ΣNP. The following conditions are satisfied: ΣNP=f1+f3+f6=−38.451 mm and f6/(f1+f3+f6)=0.127. Hereby, this configuration is helpful to distribute the negative refractive power of the sixth lens to other lens with negative refractive powers in an appropriate way, so as to suppress the generation of noticeable aberrations in the propagating process of the incident light in the optical image capturing system.

In the optical image capturing system of the first embodiment, the distance on the optical axis between the first lens 110 and the second lens 120 is denoted by IN12. The following conditions are satisfied: IN12=6.418 mm and IN12/f=1.57491. Therefore, this configuration is helpful to improve the chromatic aberration of the lens in order to elevate the performance of the optical image capturing system of the first embodiment.

In the optical image capturing system of the first embodiment, a distance on the optical axis between the fifth lens 150 and the sixth lens 160 is denoted by IN56. The following conditions are satisfied: IN56=0.025 mm and IN56/f=0.00613. Therefore, this configuration is helpful to improve the chromatic aberration of the lens in order to elevate the performance of the optical image capturing system of the first embodiment.

In the optical image capturing system of the first embodiment, the thicknesses of the first lens and the second lens on the optical axis is denoted by TP1 and TP2, respectively. The following conditions are satisfied: TP1=1.934 mm, TP2=2.486 mm and (TP1+IN12)/TP2=3.36005. Therefore, this configuration is helpful to control the sensitivity generated by the optical image capturing system and elevate the performance of the optical image capturing system of the first embodiment.

In the optical image capturing system of the first embodiment, the thicknesses of the fifth lens and the sixth lens on the optical axis is denoted by TP5 and TP6, respectively, and the distance between the aforementioned two lenses on the optical axis is IN56. The following conditions are satisfied: TP5=1.072 mm, TP6=1.031 mm and (TP6+IN56)/TP5=0.98555. Therefore, this configuration is helpful to control the sensitivity generated by the optical image capturing system and reduce the total height of the optical image capturing system.

In the optical image capturing system of the first embodiment, the distance on the optical axis between the third lens and the fourth lens is denoted by IN34. The distance on the optical axis between the fourth lens and the fifth lens is denoted by IN45. The following conditions are satisfied: IN34=0.401 mm, IN45=0.025 mm, and TP4/(IN34+TP4+IN45)=0.74376. Therefore, this configuration is helpful to slightly correct the aberration of the propagating process of the incident light layer by layer and decrease the total height of the optical image capturing system.

In the optical image capturing system of the first embodiment, a horizontal distance parallel to the optical axis from an intersection point where the object side 152 of the fifth lens crosses the optical axis to a maximum effective half diameter position on the object side 152 of the fifth lens is denoted by InRS51. The horizontal distance parallel to the optical axis from an intersection point where the image side 154 of the fifth lens crosses the optical axis to a maximum effective half diameter position on the image side 154 of the fifth lens is denoted by InRS52. The thickness of the fifth lens on the optical axis is denoted by TP5. The following conditions are satisfied: InRS51=−0.34789 mm, InRS52=−0.88185 mm, |InRS51|/TP5=0.32458 and |InRS52|/TP5=0.82276. Hereby, this configuration is favorable for manufacturing and forming of lens and keeps the miniaturization of the optical image capturing system effectively.

In the optical image capturing system of the first embodiment, the perpendicular distance between a critical point on the object side of the fifth lens and the optical axis is denoted by HVT51. The perpendicular distance between a critical point on the image side of the fifth lens and the optical axis is denoted by HVT52. The following conditions are satisfied: HVT51=0.515349 mm and HVT52=0 mm.

In the optical image capturing system of the first embodiment, a horizontal distance in parallel with the optical axis from an intersection point where the object side of the sixth lens crosses the optical axis to a maximum effective half diameter position on the object side of the sixth lens is denoted by InRS61. A distance parallel to the optical axis from an intersection point where the image side of the sixth lens crosses the optical axis to a maximum effective half diameter position on the image side of the sixth lens is denoted by InRS62. The thickness of the sixth lens is TP6. The following conditions are satisfied: InRS61=−0.58390 mm, InRS62=0.41976 mm, |InRS61|/TP6=0.56616, and |InRS62|/TP6=0.40700. Hereby, this configuration is favorable for manufacturing and forming of lens and keeps the miniaturization of the optical image capturing system effectively.

In the optical image capturing system of the first embodiment, the perpendicular distance between a critical point on the object side of the sixth lens and the optical axis is denoted by HVT61. The perpendicular distance between a critical point on the image side of the sixth lens and the optical axis is denoted by HVT62. The following conditions are satisfied: HVT61=0 mm and HVT62=0 mm.

In the optical image capturing system of the first embodiment, the following condition is satisfied: HVT51/HOI=0.1031. Therefore, this configuration is helpful to correct the aberration of surrounding field of view of the optical image capturing system.

In the optical image capturing system of the first embodiment, the following condition is satisfied: HVT51/HOS=0.02634. Therefore, this configuration is helpful to correct the aberration of surrounding field of view of the optical image capturing system.

In the optical image capturing system of the first embodiment, the second lens, the third lens and the sixth lens have negative refractive power. The coefficient of dispersion of the second lens is denoted by NA2. The coefficient of dispersion of the third lens is denoted by NA3. The coefficient of dispersion of the sixth lens is denoted by NA6. The following condition is satisfied: NA6/NA2≤1. Therefore, this configuration is helpful to correct the chromatic aberration of the optical image capturing system.

In the optical image capturing system of the first embodiment, TV distortion and optical distortion for image formation in the optical image capturing system is denoted by TDT and ODT, respectively. The following conditions are satisfied: TDT=2.124% and ODT=5.076%.

In the optical image capturing system of the first embodiment, a lateral aberration of the longest operation wavelength of visible light of a positive tangential fan diagram passing through a margin of the aperture and incident on the image plane at 0.7 field of view is denoted by PLTA and its value is 0.006 mm. A lateral aberration of the shortest operation wavelength of visible light of the positive tangential fan diagram passing through the margin of the aperture and incident on the image plane at 0.7 field of view is denoted by PSTA and its value is 0.005 mm. A lateral aberration of the longest operation wavelength of visible light of the negative tangential fan diagram passing through the margin of the aperture and incident on the image plane at 0.7 field of view is denoted by NLTA and its value is 0.004 mm. A lateral aberration of the shortest operation wavelength of visible light of the negative tangential fan diagram passing through the margin of the aperture and incident on the image plane at 0.7 field of view is denoted by NSTA and its value is −0.007 mm. A lateral aberration of the longest operation wavelength of visible light of a sagittal fan diagram passing through the margin of the aperture and incident on the image plane at 0.7 field of view is denoted by SLTA and its value is −0.003 mm. A lateral aberration of the shortest operation wavelength of visible light of the sagittal fan diagram passing through the margin of the aperture and incident on the image plane at 0.7 field of view is denoted by SSTA and its value is 0.008 mm.

Please refer to table 1 and table 2.

TABLE 1

Lens Parameters for the First Embodiment
f(Focal length) = 4.075 mm; f/HEP = 1.4; HAF = 50.000 deg

| Surface | | Curvature Radius | Thickness (mm) | Material | Refractive index | Dispersion coefficient | Focal length |
|---|---|---|---|---|---|---|---|
| 0 | Object | Plano | Plano | | | | |
| 1 | Lens 1 | −40.99625704 | 1.934 | Plastic | 1.515 | 56.55 | −7.828 |
| 2 | | 4.555209289 | 5.923 | | | | |
| 3 | Aperture | Plano | 0.495 | | | | |
| 4 | Lens 2 | 5.333427366 | 2.486 | Plastic | 1.544 | 55.96 | 5.897 |
| 5 | | −6.781659971 | 0.502 | | | | |
| 6 | Lens 3 | −5.697794287 | 0.380 | Plastic | 1.642 | 22.46 | −25.738 |
| 7 | | −8.883957518 | 0.401 | | | | |
| 8 | Lens 4 | 13.19225664 | 1.236 | Plastic | 1.544 | 55.96 | 59.205 |
| 9 | | 21.55681832 | 0.025 | | | | |
| 10 | Lens 5 | 8.987806345 | 1.072 | Plastic | 1.515 | 56.55 | 4.668 |
| 11 | | −3.158875374 | 0.025 | | | | |
| 12 | Lens 6 | −29.46491425 | 1.031 | Plastic | 1.642 | 22.46 | −4.886 |
| 13 | | 3.593484273 | 2.412 | | | | |

TABLE 1-continued

Lens Parameters for the First Embodiment
f(Focal length) = 4.075 mm; f/HEP = 1.4; HAF = 50.000 deg

| Surface | | Curvature Radius | Thickness (mm) | Material | Refractive index | Dispersion coefficient | Focal length |
|---|---|---|---|---|---|---|---|
| 14 | IR-cut filter | Plano | 0.200 | | 1.517 | 64.13 | |
| 15 | | Plano | 1.420 | | | | |
| 16 | Image plane | Plano | | | | | |

Reference wavelength = 555 nm; shield position: the clear aperture of the first surface is 5.800 mm. The clear aperture of the third surface is 1.570 mm. The clear aperture of the fifth surface is 1.950 mm.

Table 2 is the aspheric coefficients of the first embodiment.

TABLE 2

| Aspheric Coefficients | | | | | | | |
|---|---|---|---|---|---|---|---|
| Surface | 1 | 2 | 4 | 5 | 6 | 7 | 8 |
| k | 4.310876E+01 | −4.707622E+00 | 2.616025E+00 | 2.445397E+00 | 5.645686E+00 | −2.117147E+01 | −5.287220E+00 |
| A4 | 7.054243E−03 | 1.714312E−02 | −8.377541E−03 | −1.789549E−02 | −3.379055E−03 | −1.370959E−02 | −2.937377E−02 |
| A6 | −5.233264E−04 | −1.502232E−04 | −1.838068E−03 | −3.657520E−03 | −1.225453E−03 | 6.250200E−03 | 2.743532E−03 |
| A8 | 3.077890E−05 | −1.359611E−04 | 1.233332E−03 | −1.131622E−03 | −5.979572E−03 | −5.854426E−03 | −2.457574E−03 |
| A10 | −1.260650E−06 | 2.680747E−05 | −2.390895E−03 | 1.390351E−03 | 4.556449E−03 | 4.049451E−03 | 1.874319E−03 |
| A12 | 3.319093E−08 | −2.017491E−06 | 1.998555E−03 | −4.152857E−04 | −1.177175E−03 | −1.314592E−03 | −6.013661E−04 |
| A14 | −5.051600E−10 | 6.604615E−08 | −9.734019E−04 | 5.487286E−05 | 1.370522E−04 | 2.143097E−04 | 8.792480E−05 |
| A16 | 3.380000E−12 | −1.301630E−09 | 2.478373E−04 | −2.919339E−06 | −5.974015E−06 | −1.399894E−05 | −4.770527E−06 |

| Surface | 9 | 10 | 11 | 12 | 13 |
|---|---|---|---|---|---|
| k | 6.200000E+01 | −2.114008E+01 | −7.699904E+00 | −6.155476E+01 | −3.120467E−01 |
| A4 | −1.359965E−01 | −1.263831E−01 | −1.927804E−02 | −2.492467E−02 | −3.521844E−02 |
| A6 | 6.628518E−02 | 6.965399E−02 | 2.478376E−03 | −1.835360E−03 | 5.629654E−03 |
| A8 | −2.129167E−02 | −2.116027E−02 | 1.438785E−03 | 3.201343E−03 | −5.466925E−04 |
| A10 | 4.396344E−03 | 3.819371E−03 | −7.013749E−04 | −8.990757E−04 | 2.231154E−05 |
| A12 | −5.542899E−04 | −4.040283E−04 | 1.253214E−04 | 1.245343E−04 | 5.548990E−07 |
| A14 | 3.768879E−05 | 2.280473E−05 | −9.943196E−06 | −8.788363E−06 | −9.396920E−08 |
| A16 | −1.052467E−06 | −5.165452E−07 | 2.898397E−07 | 2.494302E−07 | 2.728360E−09 |

The values related to arc lengths can be obtained according to table 1 and table 2.

| First embodiment (Reference wavelength =555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 1.455 | 1.455 | −0.00033 | 99.98% | 1.934 | 75.23% |
| 12 | 1.455 | 1.495 | 0.03957 | 102.72% | 1.934 | 77.29% |
| 21 | 1.455 | 1.465 | 0.00940 | 100.65% | 2.486 | 58.93% |
| 22 | 1.455 | 1.495 | 0.03950 | 102.71% | 2.486 | 60.14% |
| 31 | 1.455 | 1.486 | 0.03045 | 102.09% | 0.380 | 391.02% |
| 32 | 1.455 | 1.464 | 0.00830 | 100.57% | 0.380 | 385.19% |
| 41 | 1.455 | 1.458 | 0.00237 | 100.16% | 1.236 | 117.95% |
| 42 | 1.455 | 1.484 | 0.02825 | 101.94% | 1.236 | 120.04% |
| 51 | 1.455 | 1.462 | 0.00672 | 100.46% | 1.072 | 136.42% |
| 52 | 1.455 | 1.499 | 0.04335 | 102.98% | 1.072 | 139.83% |
| 61 | 1.455 | 1.465 | 0.00964 | 100.66% | 1.031 | 142.06% |
| 62 | 1.455 | 1.469 | 0.01374 | 100.94% | 1.031 | 142.45% |

| ARS | EHD | ARS value | ARS − EHD | (ARS/EHD) % | TP | ARS/TP (%) |
|---|---|---|---|---|---|---|
| 11 | 5.800 | 6.141 | 0.341 | 105.88% | 1.934 | 317.51% |
| 12 | 3.299 | 4.423 | 1.125 | 134.10% | 1.934 | 228.70% |
| 21 | 1.664 | 1.674 | 0.010 | 100.61% | 2.486 | 67.35% |
| 22 | 1.950 | 2.119 | 0.169 | 108.65% | 2.486 | 85.23% |
| 31 | 1.980 | 2.048 | 0.069 | 103.47% | 0.380 | 539.05% |
| 32 | 2.084 | 2.101 | 0.017 | 100.83% | 0.380 | 552.87% |
| 41 | 2.247 | 2.287 | 0.040 | 101.80% | 1.236 | 185.05% |
| 42 | 2.530 | 2.813 | 0.284 | 111.22% | 1.236 | 227.63% |
| 51 | 2.655 | 2.690 | 0.035 | 101.32% | 1.072 | 250.99% |
| 52 | 2.764 | 2.930 | 0.166 | 106.00% | 1.072 | 273.40% |
| 61 | 2.816 | 2.905 | 0.089 | 103.16% | 1.031 | 281.64% |
| 62 | 3.363 | 3.391 | 0.029 | 100.86% | 1.031 | 328.83% |

Table 1 is the detailed structure data to the first embodiment, wherein the unit of the curvature radius, the thickness, the distance, and the focal length is millimeters (mm). Surfaces 0-16 illustrate the surfaces from the object side to the image side. Table 2 is the aspheric coefficients of the first embodiment, wherein k is the conic coefficient in the aspheric surface formula. A1-A20 are aspheric surface coefficients from the first to the twentieth orders for each surface. In addition, the tables for each of the embodiments as follows correspond to the schematic views and the aberration graphs for each of the embodiments. The definitions of data in the tables are the same as those in table 1 and table 2 for the first embodiment. Therefore, similar description shall not be illustrated again. Furthermore, the definitions of element parameters in each of the embodiments are the same as those in the first embodiment.

Second Embodiment

Figure 2A:
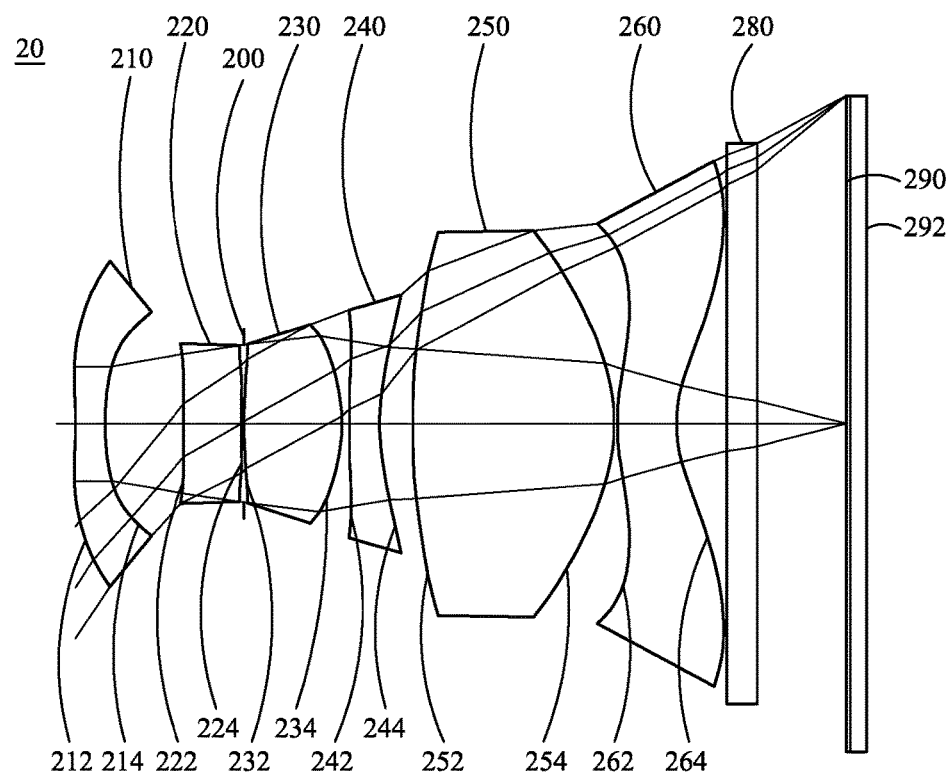
FIG. 2A is a schematic view of the optical image capturing system according to the second embodiment of the present invention.
Figure 2B:
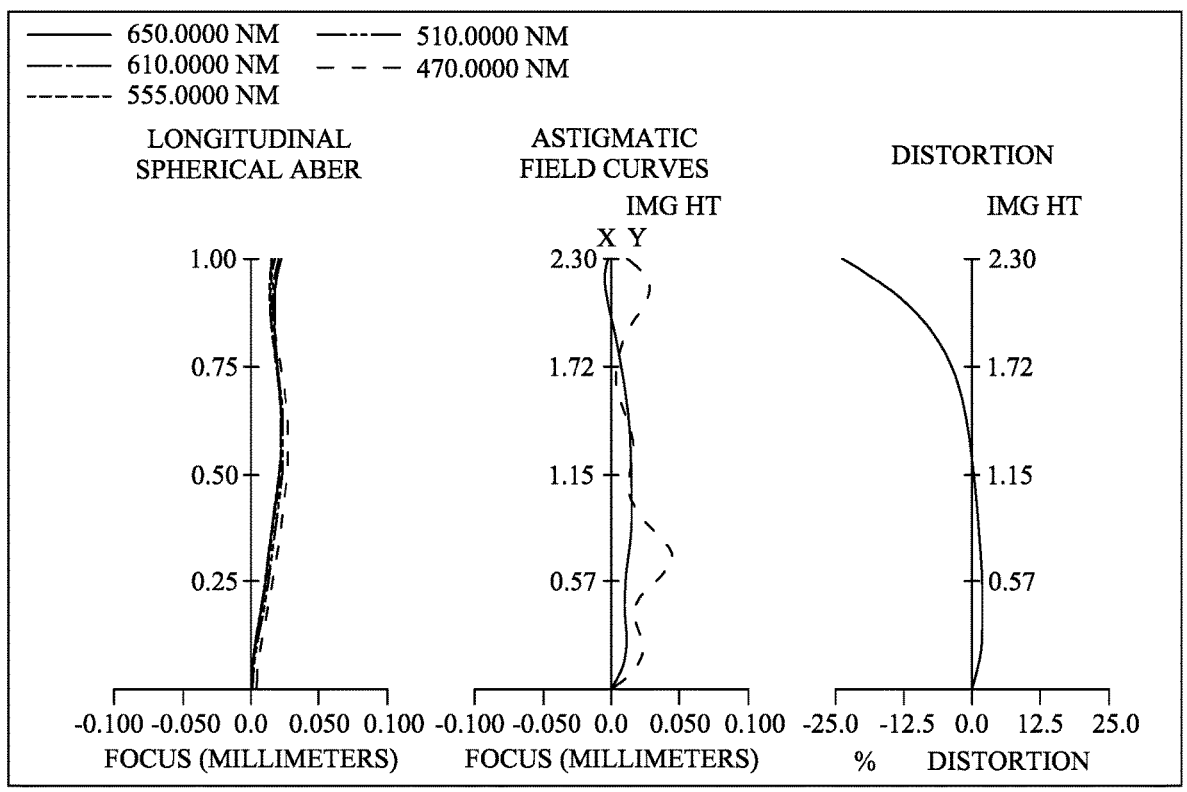
FIG. 2B is a curve diagram illustrating the spherical aberration, astigmatism and optical distortion of the optical image capturing system in order from left to right according to the second embodiment of the present invention.
Figure 2C:
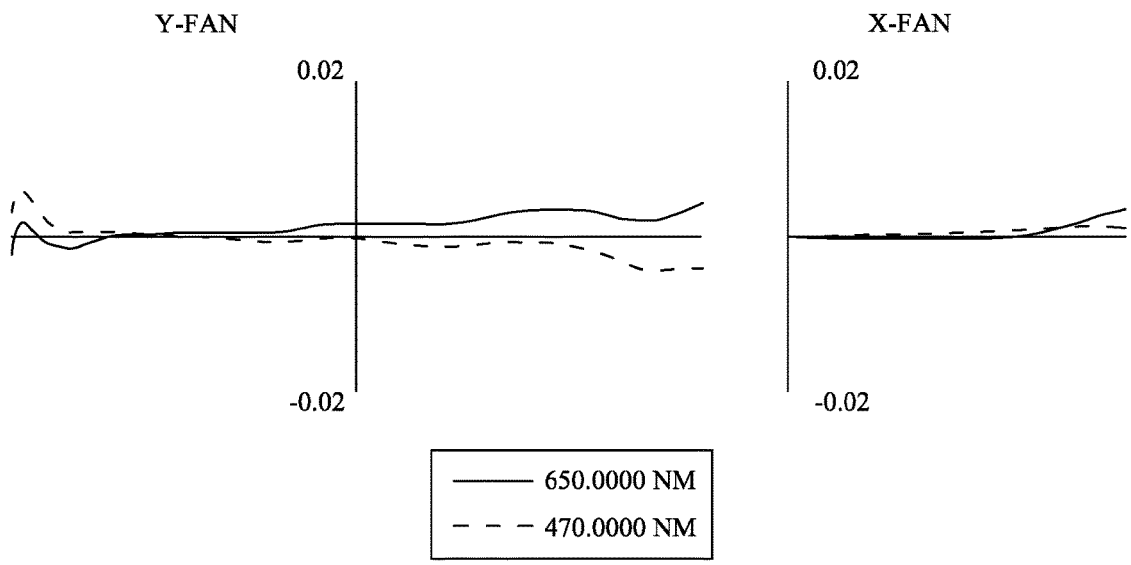
FIG. 2C shows the sagittal fan and the tangential fan of the optical image capturing system and the lateral aberration diagram of the longest operation wavelength and the shortest operation wavelength passing thorough the margin of the aperture at 0.7 field of view according to the second embodiment of the present invention.

Please refer to FIGS. 2A to 2C. FIG. 2A is a schematic view of the optical image capturing system according to the second embodiment of the present invention. FIG. 2B is a curve diagram illustrating the spherical aberration, astigmatism and optical distortion of the optical image capturing system in order from left to right according to the second embodiment of the present invention. FIG. 2C shows the sagittal fan and the tangential fan of the optical image capturing system and the lateral aberration diagram of the longest operation wavelength and the shortest operation wavelength passing thorough the margin of the aperture at 0.7 field of view according to the second embodiment of the present invention. As shown in FIG. 2A, an optical image capturing system includes, in the order from the object side to the image side, a first lens 210, a second lens 220, an aperture 200, a third lens 230, a fourth lens 240, a fifth lens 250, a sixth lens 260, an IR-cut filter 280, an image plane 290, and an image sensor element 292.

The first lens 210 has negative refractive power and is made of plastic. The object side 212 of the first lens 210 is a concave surface and the image side 214 of the first lens 210 is a concave surface, and the object side 212 and the image side 214 are aspheric. The object side 212 has one inflection point.

The second lens 220 has negative refractive power and is made of plastic. The object side 212 of the second lens 220 is a concave surface and the image side 224 of the second lens 220 is a convex surface, and the object side 222 and the image side 224 are aspheric. The image side 224 has one inflection point.

The third lens 230 has positive refractive power and is made of plastic. An object side 232 of the third lens 230 is a convex surface and an image side 234 of the third lens 230 is a convex surface, and the object side 232 and the image side 234 are both aspheric. The object side 232 has one inflection point.

The fourth lens 240 has negative refractive power and is made of plastic. An object side 242 of the fourth lens 240 is a convex surface and an image side 244 of the fourth lens 240 is a concave surface, and the object side 242 and the image side 244 of the fourth lens 240 are both aspheric. The object side 242 has one inflection point.

The fifth lens 250 has positive refractive power and is made of plastic. An object side 252 of the fifth lens 250 is a convex surface and an image side 254 of the fifth lens 250 is a convex surface, and the object side 252 and the image side 254 are both aspheric. The image side 254 has one inflection point.

The sixth lens 260 has negative refractive power and is made of plastic. An object side 262 of the sixth lens 260 is a convex surface and an image side 264 of the sixth lens 260 is a concave surface, and the object side 262 and the image side 264 are both aspheric. The object side 262 has one inflection point and the image side 264 has one inflection point. Hereby, this configuration is beneficial to shorten the back focal length of the optical image capturing system so as to keep the optical image capturing system minimized. Furthermore, the incident angle of the off-axis rays can be effectively reduced, thereby further correcting the off-axis aberration.

The IR-cut filter 280 is made of glass, and disposed between the sixth lens 260 and the image plane 290, and does not affect the focal length of the optical image capturing system.

Please refer to table 3 and table 4.

TABLE 3

Lens Parameters for the Second Embodiment
f(Focal length) = 1.54324 mm; f/HEP = 2.2; HAF(half angle of view) = 62.806 deg

| Surface | | Curvature Radius | Thickness (mm) | Material | Refractive index | Dispersion coefficient | Focal length |
|---|---|---|---|---|---|---|---|
| 0 | Object | 1E+18 | 1000 | | | | |
| 1 | Lens 1 | −3.182219556 | 0.200 | plastic | 1.535 | 56.27 | −2.76813 |
| 2 | | 2.84413532 | 0.524 | | | | |
| 3 | Lens 2 | −6.062738992 | 0.379 | plastic | 1.537 | 55.89 | −52.5065 |
| 4 | | −7.887246487 | 0.004 | | | | |
| 5 | Aperture | 1E+18 | 0.016 | plastic | | | |
| 6 | Lens 3 | 3.756891062 | 0.642 | | 1.535 | 56.27 | 1.60971 |
| 7 | | −1.054032384 | 0.050 | | | | |
| 8 | Lens 4 | 3.017914805 | 0.203 | plastic | 1.636 | 23.96 | −3.12175 |
| 9 | | 1.170886472 | 0.220 | | | | |
| 10 | Lens 5 | 3.734061423 | 1.335 | plastic | 1.535 | 56.27 | 1.64901 |
| 11 | | −1.014284574 | 0.020 | | | | |
| 12 | Lens 6 | 1.408129828 | 0.392 | plastic | 1.671 | 19.23 | −2.65703 |
| 13 | | 0.701203462 | 0.331 | | | | |
| 14 | IR-cut filter | 1E+18 | 0.210 | BK_7 | 1.517 | 64.13 | |
| 15 | | 1E+18 | 0.590 | | | | |
| 16 | Image plane | 1E+18 | 0.000 | | | | |

Reference wavelength = 555 nm; shield position: the clear aperture of the second surface is 0.678 mm. The clear aperture of the seventh surface is 0.605 mm. The clear aperture of the tenth surface is 1.156 mm.

Table 4 is the aspheric coefficients of the second embodiment.

TABLE 4

Aspheric Coefficients

| Surface | 1 | 2 | 3 | 4 | 6 | 7 | 8 |
|---|---|---|---|---|---|---|---|
| k | −3.543878E+02 | 9.056239E+00 | 7.276675E+01 | 2.237947E+02 | −4.166259E+02 | 6.516075E−01 | −1.619624E+01 |
| A4 | 6.292144E−01 | 1.866205E+00 | 8.003010E−02 | 3.666391E−01 | 1.123192E+00 | −1.373933E−01 | −1.024256E+00 |
| A6 | −4.237586E−01 | −1.013906E+01 | −2.367590E+00 | −1.226591E+01 | −2.005060E+01 | 3.306323E+00 | 7.100472E+00 |
| A8 | −1.159619E+00 | 8.388152E+01 | 3.269736E+01 | 2.269005E+02 | 2.579141E+02 | −2.178664E+01 | −4.029580E+01 |
| A10 | 4.698083E+00 | −5.093367E+02 | −2.827113E+02 | −2.663460E+03 | −2.374690E+03 | 6.143961E+01 | 1.545086E+02 |
| A12 | −7.921617E+00 | 2.061073E+03 | 1.515012E+03 | 2.071772E+04 | 1.477640E+04 | −1.724616E+02 | −4.042278E+02 |
| A14 | 7.622936E+00 | −5.367044E+03 | −5.043245E+03 | −1.059648E+05 | −6.043508E+04 | −5.116044E+02 | 7.166216E+02 |
| A16 | −4.320732E+00 | 8.667582E+03 | 1.014704E+04 | 3.444743E+05 | 1.553800E+05 | 1.524170E+03 | −8.251389E+02 |
| A18 | 1.327405E+00 | −7.915704E+03 | −1.128382E+04 | −6.465343E+05 | −2.275442E+05 | −1.956100E+03 | 5.556952E+02 |
| A20 | −1.665282E−01 | 3.111079E+03 | 5.333174E+03 | 5.355279E+05 | 1.449562E+05 | 9.831271E+02 | −1.653511E+02 |

| Surface | 9 | 10 | 11 | 12 | 13 |
|---|---|---|---|---|---|
| k | −2.400090E+00 | −7.499758E+01 | −2.942699E+00 | −2.475891E+01 | −3.137153E+00 |
| A4 | −1.007936E+00 | 8.943621E−02 | −8.165827E−02 | 2.867025E−01 | −2.693059E−01 |
| A6 | 4.761926E+00 | −2.043214E−01 | 3.812383E−01 | −1.773565E+00 | 2.210734E−01 |
| A8 | −1.771098E+01 | 6.575961E−01 | −1.425372E+00 | 4.001754E+00 | −1.448109E−01 |
| A10 | 4.716754E+01 | −1.515498E+00 | 3.015373E+00 | −5.918750E+00 | 7.006974E−02 |
| A12 | −8.702359E+01 | 2.051953E+00 | −3.816545E+00 | 5.876594E+00 | −2.416079E−02 |
| A14 | 1.091241E+02 | −1.593451E+00 | 2.975167E+00 | −3.848227E+00 | 5.323838E−03 |
| A16 | −8.897810E+01 | 6.881034E−01 | −1.415098E+00 | 1.574604E+00 | −6.208871E−04 |
| A18 | 4.252991E+01 | −1.447302E−01 | 3.792340E−01 | −3.619497E−01 | 1.837871E−05 |
| A20 | −9.023765E+00 | 9.330311E−03 | −4.380666E−02 | 3.560849E−02 | 1.848229E−06 |

In the second embodiment, the aspheric surface formula is presented in the same way in the first embodiment. In addition, the definitions of parameters in following tables are the same as those in the first embodiment. Therefore, similar description shall not be illustrated again.

The values stated as follows can be obtained according to table 3 and table 4.

Second embodiment (Reference wavelength = 555 nm)

| |f/f1| | |f/f2| | |f/f3| | |f/f4| | |f/f5| | |f/f6| |
|---|---|---|---|---|---|
| 0.55750 | 0.02939 | 0.95871 | 0.49435 | 0.93586 | 0.58081 |
| ΣPPR | ΣNPR | ΣPPR/|ΣNPR| | IN12/f | IN56/f | TP4/(IN34 + TP4 + IN45) |
| 2.03387 | 1.52275 | 1.33565 | 0.33966 | 0.01296 | 0.42876 |
| |f1/f2| | |f2/f3| | (TP1 + IN12)/TP2 | | (TP6 + IN56)/TP5 | |
| 0.05272 | 32.61861 | 1.91200 | | 0.30838 | |
| HOS | InTL | HOS/HOI | InS/HOS | ODT % | TDT % |
| 5.11511 | 3.98394 | 2.22396 | 0.78365 | −23.74680 | 23.10900 |
| HVT51 | HVT52 | HVT61 | HVT62 | HVT62/HOI | HVT62/HOS |
| 0 | 0 | 0.72045 | 1.24392 | 0.54083 | 0.24319 |
| TP2/TP3 | TP3/TP4 | InRS61 | InRS62 | |InRS61|/TP6 | |InRS62|/TP6 |
| 0.58965 | 3.16964 | −0.30367 | 0.09229 | 0.77536 | 0.23565 |
| TP1 | TP2 | TP3 | TP4 | TP5 | TP6 |
| 0.200 | 0.379 | 0.642 | 0.203 | 1.335 | 0.392 |
| IN12 | IN23 | IN34 | IN45 | IN56 | |
| 0.524 | 0.020 | 0.050 | 0.220 | 0.020 | |
| PSTA | PLTA | NSTA | NLTA | SSTA | SLTA |
| −0.004 mm | 0.004 mm | 0.003 mm | −0.002 mm | 0.001 mm | 0.004 mm |

The values related to arc lengths can be obtained according to table 3 and table 4.

Second embodiment (Reference wavelength = 555 nm)

| | ARE | ARE value | ARE − ½(HEP) | 2(ARE/HEP) % | TP | ARE/TP (%) |
|---|---|---|---|---|---|---|
| | ARE | ½(HEP) | | | | |
| 11 | 0.351 | 0.351 | 0.00007 | 100.02% | 0.200 | 175.54% |
| 12 | 0.351 | 0.355 | 0.00407 | 101.16% | 0.200 | 177.53% |
| 21 | 0.351 | 0.351 | 0.00024 | 100.07% | 0.379 | 92.74% |
| 22 | 0.351 | 0.351 | 0.00014 | 100.04% | 0.379 | 92.71% |
| 31 | 0.351 | 0.351 | 0.00037 | 100.11% | 0.642 | 54.70% |
| 32 | 0.351 | 0.358 | 0.00696 | 101.98% | 0.642 | 55.73% |
| 41 | 0.351 | 0.351 | 0.00020 | 100.06% | 0.203 | 173.30% |
| 42 | 0.351 | 0.354 | 0.00303 | 100.86% | 0.203 | 174.70% |
| 51 | 0.351 | 0.351 | 0.00045 | 100.13% | 1.335 | 26.33% |

-continued

Second embodiment (Reference wavelength = 555 nm)

| 52 | 0.351 | 0.357 | 0.00626 | 101.78% | 1.335 | 26.76% |
|---|---|---|---|---|---|---|
| 61 | 0.351 | 0.353 | 0.00226 | 100.64% | 0.392 | 90.20% |
| 62 | 0.351 | 0.361 | 0.00980 | 102.79% | 0.392 | 92.12% |

| ARS | EHD | ARS value | ARS − EHD | (ARS/EHD) % | TP | ARS/TP (%) |
|---|---|---|---|---|---|---|
| 11 | 1.076 | 1.149 | 0.07294 | 106.78% | 0.200 | 574.38% |
| 12 | 0.678 | 0.780 | 0.10244 | 115.12% | 0.200 | 390.00% |
| 21 | 0.545 | 0.545 | 0.00059 | 100.11% | 0.379 | 144.01% |
| 22 | 0.472 | 0.472 | 0.00021 | 100.04% | 0.379 | 124.71% |
| 31 | 0.482 | 0.483 | 0.00010 | 100.02% | 0.642 | 75.13% |
| 32 | 0.605 | 0.649 | 0.04429 | 107.32% | 0.642 | 101.06% |
| 41 | 0.726 | 0.726 | 0.00089 | 100.12% | 0.203 | 358.46% |
| 42 | 0.845 | 0.860 | 0.01547 | 101.83% | 0.203 | 424.44% |
| 51 | 1.156 | 1.171 | 0.01524 | 101.32% | 1.335 | 87.72% |
| 52 | 1.270 | 1.428 | 0.15856 | 112.49% | 1.335 | 106.99% |
| 61 | 1.345 | 1.499 | 0.15423 | 111.47% | 0.392 | 382.77% |
| 62 | 1.839 | 1.940 | 0.10114 | 105.50% | 0.392 | 495.30% |

The values stated as follows can be obtained according to table 3 and table 4.

Values Related to Inflection Point of Second Embodiment
(Primary Reference Wavelength = 555 nm)

| HIF111 | 0.1404 | HIF111/HOI | 0.0610 | SGI111 | −0.0025 | |SGI111|/(|SGI111|+TP1) | 0.0121 |
|---|---|---|---|---|---|---|---|
| HIF221 | 0.4214 | HIF221/HOI | 0.1832 | SGI221 | −0.0125 | |SGI221|/(|SGI221|+TP2) | 0.0320 |
| HIF311 | 0.3312 | HIF311/HOI | 0.1440 | SGI311 | 0.0132 | |SGI311|/(|SGI311|+TP3) | 0.0201 |
| HIF411 | 0.2250 | HIF411/HOI | 0.0978 | SGI411 | 0.0063 | |SGI411|/(|SGI411|+TP4) | 0.0301 |
| HIF521 | 1.1564 | HIF521/HOI | 0.5028 | SGI521 | −0.5156 | |SGI521|/(|SGI521|+TP5) | 0.2786 |
| HIF611 | 0.3902 | HIF611/HOI | 0.1697 | SGI611 | 0.0425 | |SGI611|/(|SGI611|+TP6) | 0.0978 |
| HIF621 | 0.4904 | HIF621/HOI | 0.2132 | SGI621 | 0.1282 | |SGI621|/(|SGI621|+TP6) | 0.2466 |

Third Embodiment

Figure 3A:
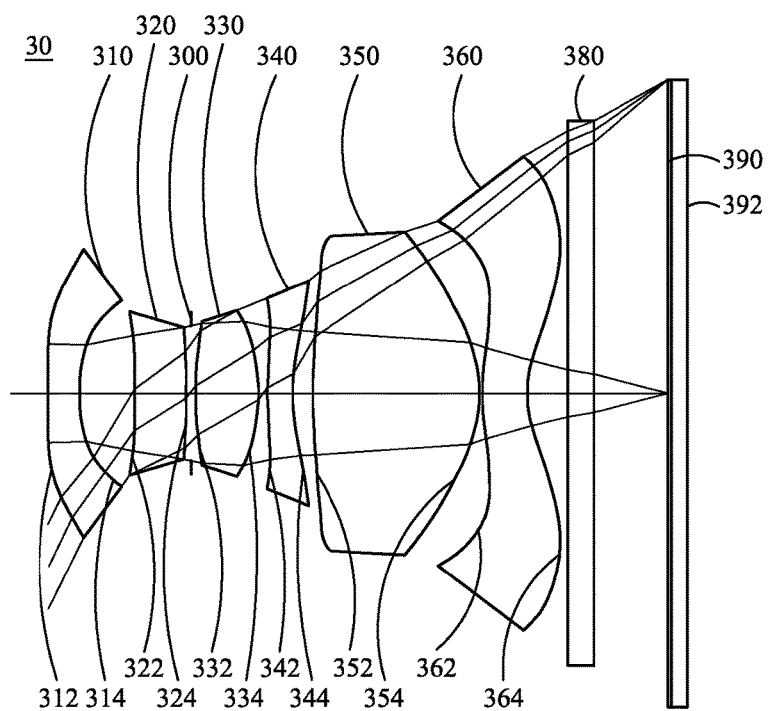
FIG. 3A is a schematic view of the optical image capturing system according to the third embodiment of the present invention.
Figure 3B:
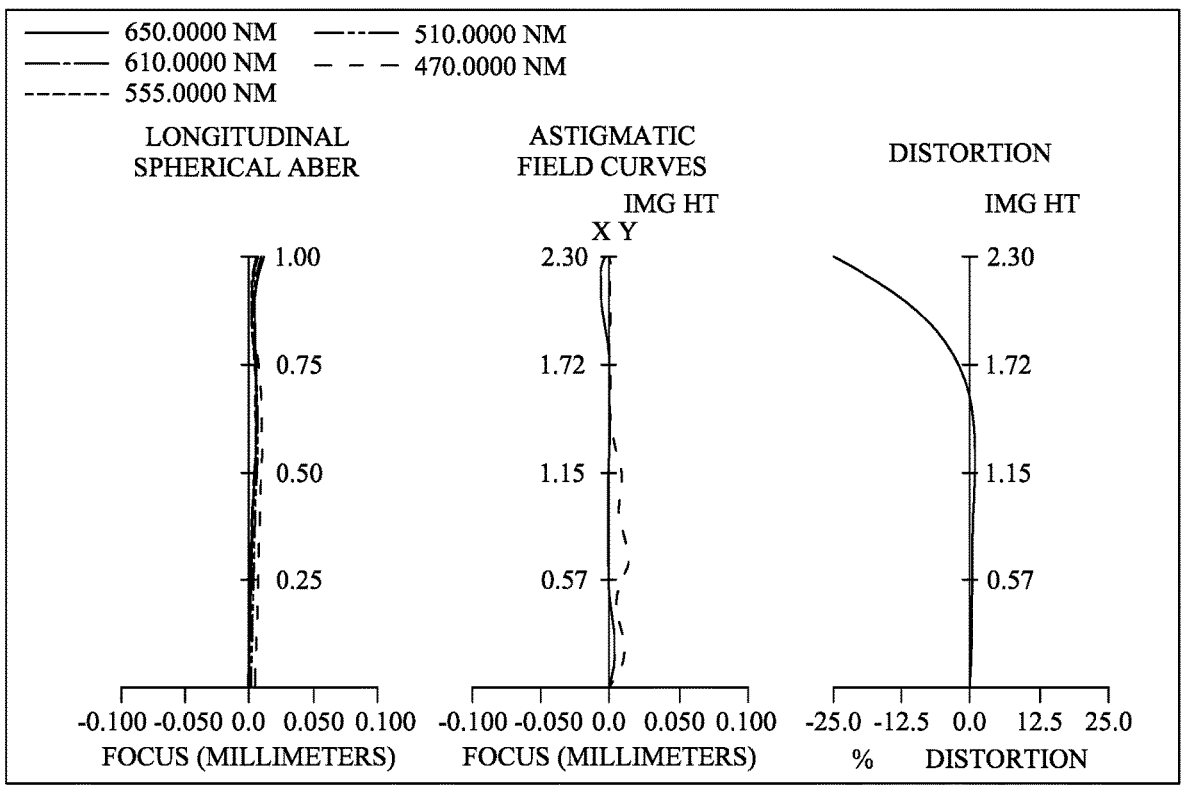
FIG. 3B is a curve diagram illustrating the spherical aberration, astigmatism and optical distortion of the optical image capturing system in order from left to right according to the third embodiment of the present invention.
Figure 3C:
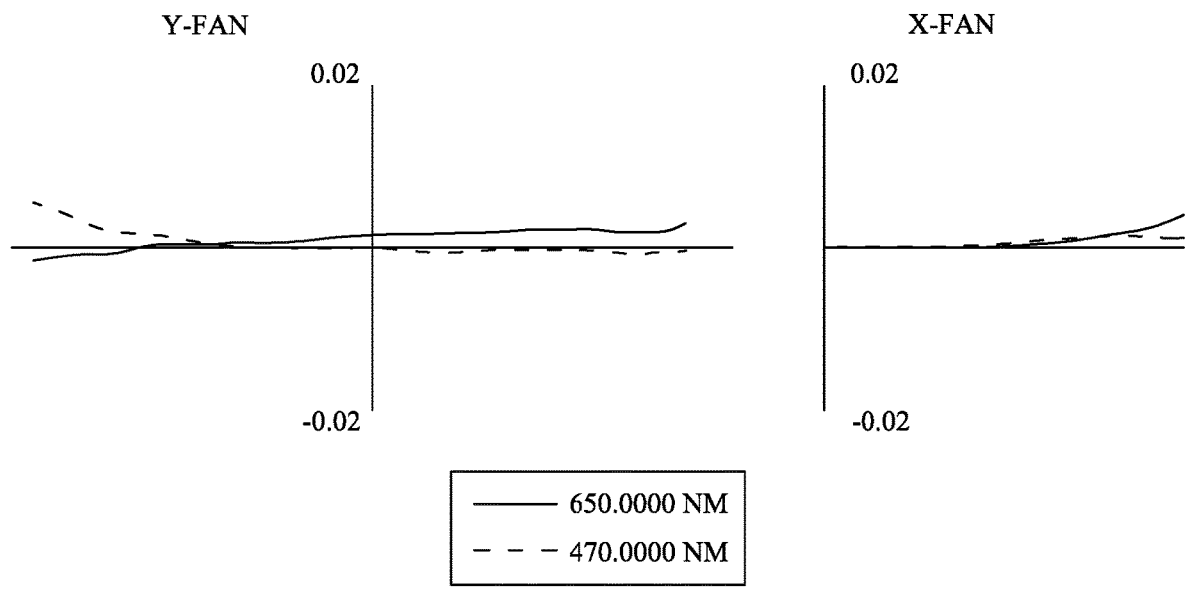
FIG. 3C shows the sagittal fan and the tangential fan of the optical image capturing system and the lateral aberration diagram of the longest operation wavelength and the shortest operation wavelength passing thorough the margin of the aperture at 0.7 field of view according to the third embodiment of the present invention.

Please refer to FIGS. 3A to 3C. FIG. 3A is a schematic view of the optical image capturing system according to the third embodiment of the present invention. FIG. 3B is a curve diagram illustrating the spherical aberration, astigmatism and optical distortion of the optical image capturing system in order from left to right according to the third embodiment of the present invention. FIG. 3C shows the sagittal fan and the tangential fan of the optical image capturing system and the lateral aberration diagram of the longest operation wavelength and the shortest operation wavelength passing thorough the margin of the aperture at 0.7 field of view according to the third embodiment of the present invention. As shown in FIG. 3A, an optical image capturing system includes, in the order from the object side to the image side, a first lens 310, a second lens 320, an aperture 300, a third lens 330, a fourth lens 340, a fifth lens 350, a sixth lens 360, an IR-cut filter 380, an image plane 390, and an image sensor element 392.

The first lens 310 has negative refractive power and is made of plastic. The object side 312 of the first lens 310 is a concave surface and the image side 314 of the first lens 310 is a concave surface. The object side 312 and the image side 314 are spherical. The object side 312 has two inflection points, and the image side 314 has one inflection point.

The second lens 320 has positive refractive power and is made of plastic. The object side 322 of the second lens 320 is a concave surface and the image side 324 of the second lens 320 is a convex surface, and the object side 322 and the image side 324 are aspheric. The image side 324 has one inflection point.

The third lens 330 has positive refractive power and is made of plastic. An object side 332 of the third lens is a convex surface and an image side 334 of the third lens 330 is a convex surface, and the object side 332 and the image side 334 are both aspheric. The object side 332 has one inflection point.

The fourth lens 340 has negative refractive power and is made of plastic. An object side 342 of the fourth lens 340 is a convex surface and an image side 344 of the fourth lens 340 is a concave surface, and the object side 342 and the image side 344 are both aspheric. The object side 342 has one inflection point, and the image side 344 has one inflection point.

The fifth lens 350 has positive refractive power and is made of plastic. An object side 352 of the fifth lens 350 is a convex surface and an image side 354 of the fifth lens is a convex surface, and the object side 352 and the image side 354 are both aspheric. The object side 352 has one inflection point and the image side 354 has one inflection point.

The sixth lens 360 has negative refractive power and is made of plastic. An object side 362 of the sixth lens 360 is a convex surface and an image side 364 of the sixth lens 360 is a concave surface, and the object side 362 and the image side 364 are both aspheric. The object side 362 has one inflection point and the image side 364 has one inflection point. Hereby, this configuration is beneficial to shorten the back focal length of the optical image capturing system so as to keep the optical image capturing system minimized. Furthermore, the incident angle of the off-axis rays can be effectively reduced, thereby further correcting the off-axis aberration.

The IR-cut filter 380 is made of plastic, and disposed between the sixth lens 360 and the image plane 390, and does not affect the focal length of the optical image capturing system.

Please refer to table 5 and table 6.

TABLE 5

Lens Parameters for the Third Embodiment
f(Focal length) = 1.5937 mm; f/HEP = 2.2; HAF(half angle of view) = 62.4997 deg

| Surface | | Curvature Radius | Thickness (mm) | Material | Refractive index | Dispersion coefficient | Focal length |
|---|---|---|---|---|---|---|---|
| 0 | Object | 1E+18 | 1000 | | | | |
| 1 | Lens 1 | −9.460947347 | 0.256 | plastic | 1.535 | 56.27 | −2.84016 |

TABLE 5-continued

Lens Parameters for the Third Embodiment
f(Focal length) = 1.5937 mm; f/HEP = 2.2; HAF(half angle of view) = 62.4997 deg

| Surface | | Curvature Radius | Thickness (mm) | Material | Refractive index | Dispersion coefficient | Focal length |
|---|---|---|---|---|---|---|---|
| 2 | | 1.832742586 | 0.440 | | | | |
| 3 | Lens 2 | −5.248971376 | 0.410 | plastic | 1.537 | 55.89 | 106.395 |
| 4 | | −4.939778029 | 0.034 | | | | |
| 5 | Aperture | 1E+18 | 0.042 | plastic | | | |
| 6 | Lens 3 | 2.984396445 | 0.499 | | 1.535 | 56.27 | 1.69687 |
| 7 | | −1.233034819 | 0.072 | | | | |
| 8 | Lens 4 | 2.429617808 | 0.200 | plastic | 1.636 | 23.96 | −3.77388 |
| 9 | | 1.172603197 | 0.168 | | | | |
| 10 | Lens 5 | 7.331133767 | 1.330 | plastic | 1.535 | 56.27 | 1.42298 |
| 11 | | −0.797908364 | 0.020 | | | | |
| 12 | Lens 6 | 1.561748492 | 0.359 | plastic | 1.671 | 19.23 | −1.96454 |
| 13 | | 0.651730181 | 0.321 | | | | |
| 14 | IR-cut filter | 1E+18 | 0.210 | BK_7 | 1.517 | 64.13 | |
| 15 | | 1E+18 | 0.590 | | | | |
| 16 | Image plane | 1E+18 | 0.000 | | | | |

Reference wavelength = 555 nm; shield position: the clear aperture of the second surface is 0.678 mm. The clear aperture of the seventh surface is 0.605 mm. The clear aperture of the tenth surface is 1.156 mm.

Table 6 is the aspheric coefficients of the third embodiment.

TABLE 6

Aspheric Coefficients

| Surface | 1 | 2 | 3 | 4 | 6 | 7 | 8 |
|---|---|---|---|---|---|---|---|
| k | −6.200000E+01 | −1.022251E+01 | 6.200000E+01 | 6.199886E+01 | −6.199999E+01 | 8.458503E−01 | −1.863158E+01 |
| A4 | 8.300492E−01 | 1.400417E+00 | 1.013178E−01 | 2.763527E−01 | 5.491182E−01 | −3.778267E−03 | −7.059574E−01 |
| A6 | −1.658737E+00 | −8.316331E−01 | −1.514262E+00 | −4.327017E+00 | −4.226268E+00 | 1.006278E+00 | 3.147541E+00 |
| A8 | 3.401432E+00 | −6.113665E+00 | 1.935905E+01 | 7.740950E+01 | 4.731367E+01 | −2.658335E+00 | −1.349392E+01 |
| A10 | −5.587479E+00 | 6.595230E+01 | −1.774195E+02 | −9.917211E+02 | −5.017684E+02 | −4.271537E+01 | 2.914738E+01 |
| A12 | 6.717101E+00 | −2.948267E+02 | 1.052413E+03 | 8.193315E+03 | 3.651503E+03 | 3.813846E+02 | −1.020669E+01 |
| A14 | −5.581943E+00 | 7.954988E+02 | −3.991036E+03 | −4.257450E+04 | −1.712412E+04 | −1.500269E+03 | −1.107172E+02 |
| A16 | 2.902047E+00 | −1.300422E+03 | 9.337024E+03 | 1.350028E+05 | 4.946835E+04 | 3.275877E+03 | 2.912314E+02 |
| A18 | −8.187291E−01 | 1.165308E+03 | −1.226118E+04 | −2.385647E+05 | −8.001011E+04 | −3.870460E+03 | −3.184266E+02 |
| A20 | 9.255951E−02 | −4.959016E+02 | 6.938412E+03 | 1.802756E+05 | 5.540981E+04 | 1.943416E+03 | 1.363925E+02 |

| Surface | 9 | 10 | 11 | 12 | 13 |
|---|---|---|---|---|---|
| k | −2.478752E+00 | −6.026640E+01 | −2.947870E+00 | −2.475891E+01 | −4.024069E+00 |
| A4 | −7.591444E−01 | 9.211055E−02 | 1.840783E−01 | 2.422190E−01 | −2.855723E−01 |
| A6 | 2.600984E+00 | −5.305800E−01 | −1.244945E+00 | −2.246850E+00 | 3.076793E−01 |
| A8 | −6.881352E+00 | 2.590347E+00 | 3.792184E+00 | 6.665474E+00 | −3.266633E−01 |
| A10 | 9.695439E+00 | −7.464579E+00 | −7.655678E+00 | −1.296402E+01 | 2.718440E−01 |
| A12 | 1.204067E+00 | 1.306839E+01 | 1.053032E+01 | 1.668231E+01 | −1.611945E−01 |
| A14 | −2.998998E+01 | −1.399027E+01 | −9.675003E+00 | −1.401629E+01 | 6.349690E−02 |
| A16 | 5.139047E+01 | 8.607237E+00 | 5.662774E+00 | 7.358224E+00 | −1.561103E−02 |
| A18 | −3.929865E+01 | −2.646375E+00 | −1.905074E+00 | −2.183519E+00 | 2.155645E−03 |
| A20 | 1.192208E+01 | 2.858106E−01 | 2.796816E−01 | 2.788503E−01 | −1.272246E−04 |

In the third embodiment, the aspheric surface formula is presented in the same way in the first embodiment. In addition, the definitions of parameters in following tables are the same as those in the first embodiment. Therefore, similar description shall not be illustrated again.

The values stated as follows can be obtained according to table 5 and table 6.

| Third embodiment (Reference wavelength = 555 nm) | | | | | |
|---|---|---|---|---|---|
| \|f/f1\| | \|f/f2\| | \|f/f3\| | \|f/f4\| | \|f/f5\| | \|f/f6\| |
| 0.56113 | 0.01498 | 0.93920 | 0.42230 | 1.11997 | 0.81123 |
| ΣPPR | ΣNPR | ΣPPR/\|ΣNPR\| | IN12/f | IN56/f | TP4/(IN34 + TP4 + IN45) |
| 1.36150 | 2.32654 | 0.58520 | 0.27582 | 0.01255 | 0.45453 |
| \|f1/f2\| | \|f2/f3\| | (TP1 + IN12)/TP2 | | (TP6 + IN56)/TP5 | |
| 0.02669 | 62.70074 | 1.69483 | | 0.28473 | |
| HOS | InTL | HOS/HOI | InS/HOS | ODT % | TDT % |
| 4.95000 | 3.82866 | 2.15217 | 0.76969 | −24.99920 | 25.74380 |
| HVT51 | HVT52 | HVT61 | HVT62 | HVT62/HOI | HVT62/HOS |
| 0 | 0 | 0.65063 | 1.10177 | 0.47903 | 0.22258 |
| TP2/TP3 | TP3/TP4 | InRS61 | InRS62 | \|InRS61\|/TP6 | \|InRS62\|/TP6 |
| 0.82305 | 2.49672 | −0.33885 | −0.02288 | 0.94432 | 0.06378 |
| TP1 | TP2 | TP3 | TP4 | TP5 | TP6 |
| 0.256 | 0.410 | 0.499 | 0.200 | 1.330 | 0.359 |
| IN12 | IN23 | IN34 | IN45 | IN56 | |
| 0.440 | 0.076 | 0.072 | 0.168 | 0.020 | |
| PSTA | PLTA | NSTA | NLTA | SSTA | SLTA |
| −0.00048 mm | 0.0029 mm | 0.005 mm | −0.002 mm | 0.001 mm | −0.004 mm |

The values related to arc lengths can be obtained according to table 5 and table 6.

| Third embodiment (Reference wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.363 | 0.362 | −0.00038 | 99.90% | 0.256 | 141.55% |
| 12 | 0.363 | 0.368 | 0.00583 | 101.61% | 0.256 | 143.98% |
| 21 | 0.363 | 0.362 | −0.00019 | 99.95% | 0.410 | 88.31% |
| 22 | 0.363 | 0.362 | −0.00022 | 99.94% | 0.410 | 88.30% |
| 31 | 0.363 | 0.363 | 0.00052 | 100.14% | 0.499 | 72.82% |
| 32 | 0.363 | 0.367 | 0.00494 | 101.36% | 0.499 | 73.71% |
| 41 | 0.363 | 0.362 | −0.00006 | 99.98% | 0.200 | 181.52% |
| 42 | 0.363 | 0.365 | 0.00296 | 100.82% | 0.200 | 183.04% |
| 51 | 0.363 | 0.362 | −0.00034 | 99.91% | 1.330 | 27.22% |
| 52 | 0.363 | 0.372 | 0.00901 | 102.48% | 1.330 | 27.92% |
| 61 | 0.363 | 0.364 | 0.00146 | 100.40% | 0.359 | 101.43% |
| 62 | 0.363 | 0.373 | 0.01009 | 102.78% | 0.359 | 103.84% |

| Third embodiment (Reference wavelength = 555 nm) | | | | | | |
|---|---|---|---|---|---|---|
| ARS | EHD | ARS value | ARS − EHD | (ARS/EHD) % | TP | ARS/TP (%) |
| 11 | 1.060 | 1.124 | 0.06426 | 106.06% | 0.256 | 439.40% |
| 12 | 0.678 | 0.792 | 0.11477 | 116.94% | 0.256 | 309.71% |
| 21 | 0.629 | 0.632 | 0.00331 | 100.53% | 0.410 | 154.06% |
| 22 | 0.517 | 0.517 | −0.00008 | 99.98% | 0.410 | 125.97% |
| 31 | 0.534 | 0.536 | 0.00208 | 100.39% | 0.499 | 107.49% |
| 32 | 0.605 | 0.636 | 0.03159 | 105.22% | 0.499 | 127.66% |
| 41 | 0.701 | 0.704 | 0.00286 | 100.41% | 0.200 | 352.64% |
| 42 | 0.827 | 0.840 | 0.01255 | 101.52% | 0.200 | 420.62% |
| 51 | 1.156 | 1.173 | 0.01715 | 101.48% | 1.330 | 88.16% |
| 52 | 1.198 | 1.366 | 0.16761 | 113.99% | 1.330 | 102.66% |
| 61 | 1.272 | 1.458 | 0.18621 | 114.64% | 0.359 | 406.35% |
| 62 | 1.777 | 1.913 | 0.13543 | 107.62% | 0.359 | 533.03% |

The values stated as follows can be obtained according to table 5 and table 6.

| Values Related to Inflection Point of third Embodiment (Primary Reference Wavelength = 555 nm) | | | | | | | |
|---|---|---|---|---|---|---|---|
| HIF111 | 0.1053 | HIF111/HOI | 0.0458 | SGI111 | −0.0005 | \|SGI111\|/(\|SGI111\|+TP1) | 0.0019 |
| HIF112 | 0.9596 | HIF112/HOI | 0.4172 | SGI112 | 0.2247 | \|SGI112\|/(\|SGI112\|+TP1) | 0.4677 |
| HIF121 | 0.6350 | HIF121/HOI | 0.2761 | SGI121 | 0.2791 | \|SGI121\|/(\|SGI121\|+TP1) | 0.5217 |
| HIF221 | 0.4771 | HIF221/HOI | 0.2074 | SGI221 | −0.0224 | \|SGI221\|/(\|SGI221\|+TP2) | 0.0517 |
| HIF311 | 0.4948 | HIF311/HOI | 0.2151 | SGI311 | 0.0427 | \|SGI311\|/(\|SGI311\|+TP3) | 0.0789 |
| HIF411 | 0.2551 | HIF411/HOI | 0.1109 | SGI411 | 0.010464 | \|SGI411\|/(\|SGI411\|+TP4) | 0.0498 |
| HIF421 | 0.4955 | HIF421/HOI | 0.2154 | SGI421 | 0.0742 | \|SGI421\|/(\|SGI421\|+TP4) | 0.2708 |
| HIF511 | 0.7508 | HIF511/HOI | 0.3264 | SGI511 | 0.044469 | \|SGI511\|/(\|SGI511\|+TP5) | 0.0323 |
| HIF521 | 1.1534 | HIF521/HOI | 0.5015 | SGI521 | −0.5684 | \|SGI521\|/(\|SGI521\|+TP5) | 0.2993 |
| HIF611 | 0.3555 | HIF611/HOI | 0.1546 | SGI611 | 0.0331 | \|SGI611\|/(\|SGI611\|+TP6) | 0.0845 |
| HIF621 | 0.4390 | HIF621/HOI | 0.1909 | SGI621 | 0.107637 | \|SGI621\|/(\|SGI621\|+TP6) | 0.2308 |

Fourth Embodiment

Figure 4A:
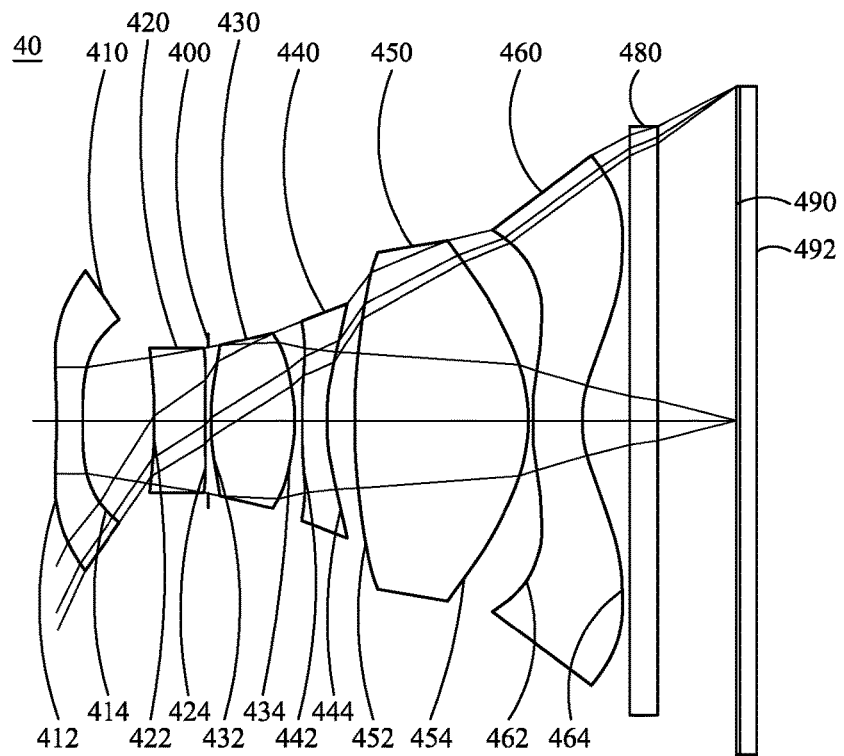
FIG. 4A is a schematic view of the optical image capturing system according to the fourth embodiment of the present invention.
Figure 4B:
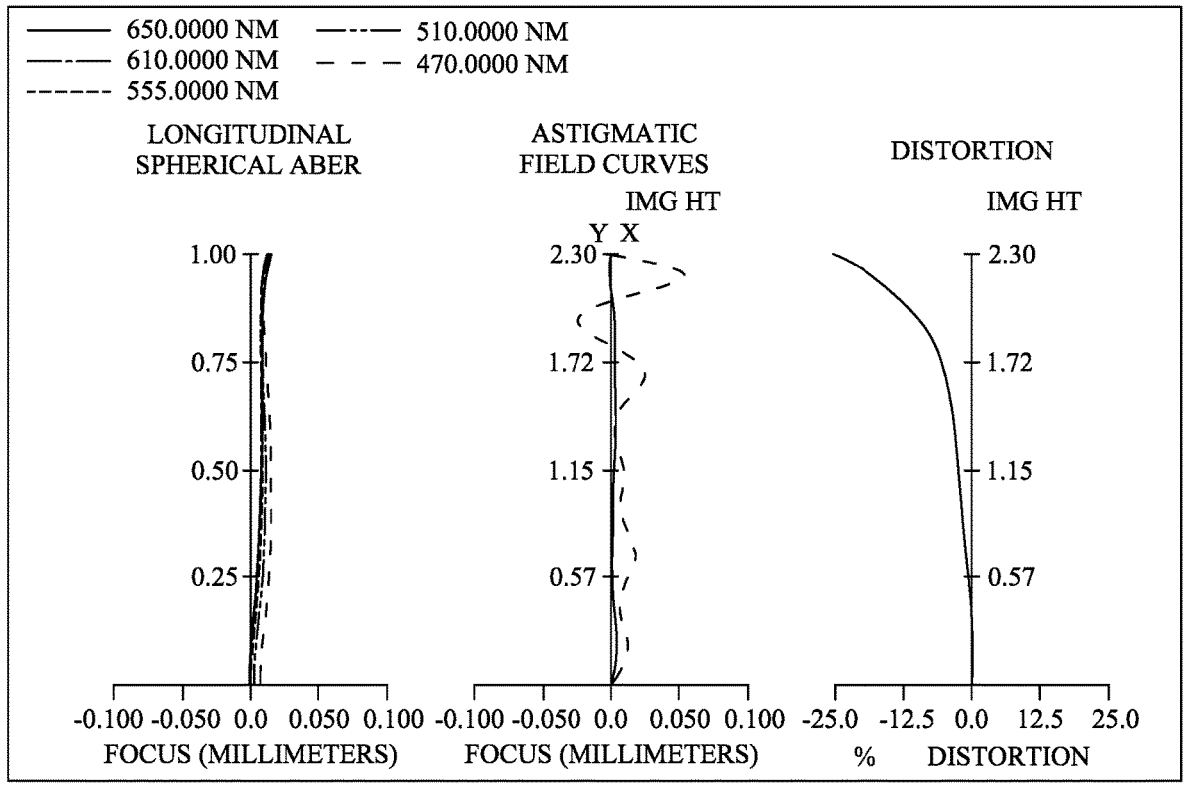
FIG. 4B is a curve diagram illustrating the spherical aberration, astigmatism and optical distortion of the optical image capturing system in order from left to right according to the fourth embodiment of the present invention.
Figure 4C:
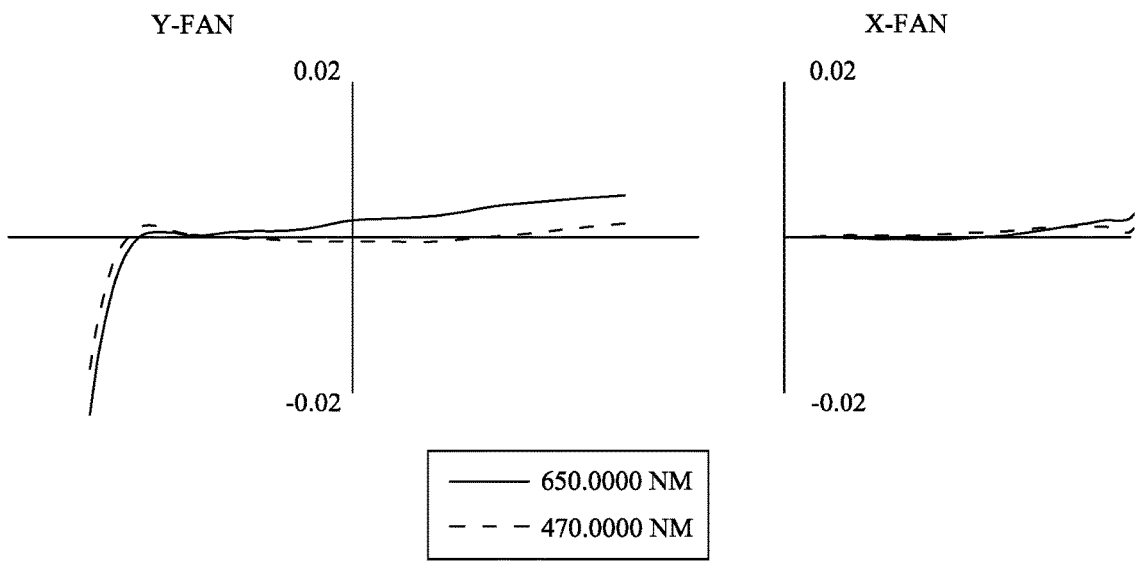
FIG. 4C shows the sagittal fan and the tangential fan of the optical image capturing system and the lateral aberration diagram of the longest operation wavelength and the shortest operation wavelength passing thorough the margin of the aperture at 0.7 field of view according to the fourth embodiment of the present invention.

Please refer to FIGS. 4A to 4C. FIG. 4A is a schematic view of the optical image capturing system according to the fourth embodiment of the present invention. FIG. 4B is a curve diagram illustrating the spherical aberration, astigmatism and optical distortion of the optical image capturing system in order from left to right according to the fourth embodiment of the present invention. FIG. 4C shows the sagittal fan and the tangential fan of the optical image capturing system and the lateral aberration diagram of the longest operation wavelength and the shortest operation wavelength passing thorough the margin of the aperture at 0.7 field of view according to the fourth embodiment of the present invention. As shown in FIG. 4A, an optical image capturing system includes, in the order from the object side to the image side, a first lens 410, a second lens 420, an aperture 400, a third lens 430, a fourth lens 440, a fifth lens 450, a sixth lens 460, an IR-cut filter 480, an image plane 490, and an image sensor element 492.

The first lens 410 has negative refractive power and is made of plastic. The object side 412 of the first lens 410 is a concave surface and the image side 414 of the first lens 410 is a concave surface, and the object side 412 and the image side 414 are aspheric. The object side 412 has one inflection point.

The second lens 420 has negative refractive power and is made of plastic. The object side 422 of the second lens 420 is a concave surface and the image side 424 of the second lens 420 is a convex surface, and the object side 422 and the image side 424 are aspheric.

The third lens 430 has positive refractive power and is made of plastic. An object side 432 of the third lens 430 is a convex surface and an image side 434 of the third lens 430 is a convex surface, and the object side 432 and the image side 434 are both aspheric. The object side 432 has one inflection point.

The fourth lens 440 has positive refractive power and is made of plastic. An object side 442 of the fourth lens 440 is a convex surface and an image side 444 of the fourth lens 440 is a concave surface, and the object side 442 and the image side 444 are both aspheric. The object side 442 has one inflection point, and the image side 444 has one inflection point.

The fifth lens 450 has positive refractive power and is made of plastic. An object side 452 of the fifth lens 450 is a convex surface and an image side 454 of the fifth lens 450 is a convex surface, and the object side 452 and the image side 454 are both aspheric. The image side 454 has one inflection point.

The sixth lens 460 has negative refractive power and is made of plastic. An object side 462 of the sixth lens 460 is a convex surface and an image side 464 of the sixth lens 460 is a concave surface, and the object side 462 and the image side 464 are both aspheric. The object side 462 has one inflection point and the image side 464 has one inflection point. Hereby, this configuration is beneficial to shorten the back focal length of the optical image capturing system so as to keep the optical image capturing system minimized. Furthermore, the incident angle of the off-axis rays can be effectively reduced, thereby further correcting the off-axis aberration.

The IR-cut filter 480 is made of glass, and disposed between the sixth lens 460 and the image plane 490, and does not affect the focal length of the optical image capturing system.

Please refer to table 7 and table 8.

TABLE 7

Lens Parameters for the Fourth Embodiment
f(Focal length) = 1.59249 mm; f/HEP = 2.2; HAF(half angle of view) = 62.500 deg

| Surface | | Curvature Radius | Thickness (mm) | Material | Refractive index | Dispersion coefficient | Focal length |
|---|---|---|---|---|---|---|---|
| 0 | Object | 1E+18 | 1000 | | | | |
| 1 | Lens 1 | −1.958269429 | 0.198 | plastic | 1.535 | 56.27 | −3.01213 |
| 2 | | 9.555412314 | 0.540 | | | | |
| 3 | Lens 2 | −4.907985628 | 0.385 | plastic | 1.537 | 55.89 | −12.0317 |
| 4 | | −20.82594801 | 0.027 | | | | |
| 5 | Aperture | 1E+18 | 0.020 | plastic | | | |
| 6 | Lens 3 | 2.174383064 | 0.627 | | 1.535 | 56.27 | 1.56394 |
| 7 | | −1.228084743 | 0.049 | | | | |
| 8 | Lens 4 | 2.349348148 | 0.188 | plastic | 1.636 | 23.96 | −3.37182 |
| 9 | | 1.089884268 | 0.215 | | | | |
| 10 | Lens 5 | 4.312082367 | 1.307 | plastic | 1.535 | 56.27 | 1.5211 |
| 11 | | −0.899704321 | 0.030 | | | | |
| 12 | Lens 6 | 1.613220134 | 0.375 | plastic | 1.671 | 19.23 | −2.15795 |
| 13 | | 0.694723851 | 0.354 | | | | |
| 14 | IR-cut filter | 1E+18 | 0.210 | BK_7 | 1.517 | 64.13 | |
| 15 | | 1E+18 | 0.590 | | | | |
| 16 | Image plane | 1E+18 | 0.000 | | | | |

Reference wavelength = 555 nm; shield position: the clear aperture of the second surface is 0.700 mm. The clear aperture of the seventh surface is 0.605 mm. The clear aperture of the tenth surface is 1.156 mm.

Table 8 is the aspheric coefficients of the fourth embodiment.

TABLE 8

Aspheric Coefficients

| Surface | 1 | 2 | 3 | 4 | 6 | 7 | 8 |
|---|---|---|---|---|---|---|---|
| k | −6.200000E+01 | 1.940223E+01 | 6.200000E+01 | 6.200000E+01 | −6.200000E+01 | 3.454078E−01 | −1.708031E+01 |
| A4 | 5.884707E−01 | 1.794346E+00 | 1.106229E−01 | 2.493023E−01 | 9.826277E−01 | −1.111595E−01 | −9.363456E−01 |
| A6 | −5.062128E−02 | −7.448448E+00 | −2.281256E+00 | −6.414338E+00 | −8.265054E+00 | 3.829752E+00 | 6.709112E+00 |
| A8 | −3.417925E+00 | 6.149401E+01 | 3.544275E+01 | 1.216455E+02 | 8.190370E+01 | −3.097075E+01 | −4.035354E+01 |
| A10 | 1.284894E+01 | −4.113442E+02 | −3.491680E+02 | −1.601216E+03 | −7.169353E+02 | 1.504672E+02 | 1.737191E+02 |
| A12 | −2.566770E+01 | 1.861433E+03 | 2.162312E+03 | 1.364577E+04 | 4.575859E+03 | −5.207755E+02 | −5.596436E+02 |
| A14 | 3.126874E+01 | −5.388422E+03 | −8.465374E+03 | −7.384055E+04 | −1.961577E+04 | 1.306671E+03 | 1.300154E+03 |
| A16 | −2.317150E+01 | 9.569788E+03 | 2.057035E+04 | 2.446981E+05 | 5.288421E+04 | −2.244174E+03 | −2.014310E+03 |
| A18 | 9.589559E+00 | −9.481365E+03 | −2.864410E+04 | −4.525504E+05 | −8.066399E+04 | 2.299144E+03 | 1.826049E+03 |
| A20 | −1.699915E+00 | 3.994204E+03 | 1.770426E+04 | 3.575349E+05 | 5.289916E+04 | −1.042790E+03 | −7.256358E+02 |

| Surface | 9 | 10 | 11 | 12 | 13 |
|---|---|---|---|---|---|
| k | −2.462341E+00 | −6.200000E+01 | −3.022250E+00 | −2.475891E+01 | −3.200065E+00 |
| A4 | −9.825284E−01 | 6.390940E−02 | 1.961377E−01 | 3.644310E−01 | −3.004835E−01 |
| A6 | 4.410851E+00 | −3.125865E−01 | −1.310356E+00 | −2.497764E+00 | 3.285511E−01 |
| A8 | −1.479783E+01 | 1.701708E+00 | 3.960210E+00 | 6.809221E+00 | −3.192756E−01 |
| A10 | 3.391364E+01 | −4.971603E+00 | −7.806381E+00 | −1.205255E+01 | 2.255595E−01 |
| A12 | −5.211851E+01 | 8.653400E+00 | 1.032823E+01 | 1.399910E+01 | −1.050557E−01 |
| A14 | 5.343078E+01 | −9.321819E+00 | −8.989336E+00 | −1.050552E+01 | 3.011691E−02 |
| A16 | −3.641843E+01 | 6.102600E+00 | 4.899939E+00 | 4.877105E+00 | −4.919066E−03 |
| A18 | 1.594642E+01 | −2.224016E+00 | −1.510571E+00 | −1.270621E+00 | 3.892720E−04 |
| A20 | −3.609781E+00 | 3.461640E−01 | 2.008013E−01 | 1.419812E−01 | −9.053765E−06 |

In the fourth embodiment, the aspheric surface formula is presented in the same way in the first embodiment. In addition, the definitions of parameters in following tables are the same as those in the first embodiment. Therefore, similar description shall not be illustrated again.

The values stated as follows can be obtained according to table 7 and table 8.

Fourth embodiment (Reference wavelength = 587.5 nm)

| |f/f1| | |f/f2| | |f/f3| | |f/f4| | |f/f5| | |f/f6| |
|---|---|---|---|---|---|
| 0.52869 | 0.13236 | 1.01826 | 0.47229 | 1.04693 | 0.73796 |
| ΣPPR | ΣNPR | ΣPPR/ΣNPR | IN12/f | IN56/f | TP4/(IN34 + TP4 + IN45) |
| 3.26966 | 0.66105 | 4.94616 | 0.33881 | 0.01886 | 0.41610 |
| |f1/f2| | |f2/f3| | (TP1 + IN12)/TP2 | | (TP6 + IN56)/TP5 | |
| 0.25035 | 7.69320 | 1.91447 | | 0.31005 | |
| HOS | InTL | HOS/HOI | InS/HOS | ODT % | TDT % |
| 5.11500 | 3.96149 | 2.22391 | 0.77519 | −24.99860 | 21.72840 |
| HVT51 | HVT52 | HVT61 | HVT62 | HVT62/HOI | HVT62/HOS |
| 0 | 0 | 0.70627 | 1.22840 | 0.53409 | 0.24016 |
| TP2/TP3 | TP3/TP4 | InRS61 | InRS62 | |InRS61|/TP6 | |InRS62|/TP6 |
| 0.61424 | 3.33449 | −0.31290 | 0.06280 | 0.83385 | 0.16736 |
| TP1 | TP2 | TP3 | TP4 | TP5 | TP6 |
| 0.198 | 0.385 | 0.627 | 0.188 | 1.307 | 0.375 |
| IN12 | IN23 | IN34 | IN45 | IN56 | |
| 0.540 | 0.047 | 0.049 | 0.215 | 0.030 | |
| PSTA | PLTA | NSTA | NLTA | SSTA | SLTA |
| 0.001 mm | 0.005 mm | −0.016 mm | −0.022 mm | 0.001 mm | 0.003 mm |

The values related to arc lengths can be obtained according to table 7 and table 8.

Fourth embodiment (Reference wavelength = 555 nm)

| | ARE | ARE − | 2(ARE/ | | ARE/ |
| ARE | ½(HEP) | value | ½(HEP) | HEP) % | TP | TP (%) |
|---|---|---|---|---|---|---|
| 11 | 0.362 | 0.362 | 0.00013 | 100.04% | 0.198 | 183.08% |
| 12 | 0.362 | 0.364 | 0.00206 | 100.57% | 0.198 | 184.06% |
| 21 | 0.362 | 0.362 | 0.00015 | 100.04% | 0.385 | 94.07% |
| 22 | 0.362 | 0.362 | −0.00022 | 99.94% | 0.385 | 93.98% |
| 31 | 0.362 | 0.364 | 0.00160 | 100.44% | 0.627 | 58.01% |
| 32 | 0.362 | 0.367 | 0.00497 | 101.37% | 0.627 | 58.55% |
| 41 | 0.362 | 0.362 | 0.00025 | 100.07% | 0.188 | 192.73% |
| 42 | 0.362 | 0.366 | 0.00361 | 101.00% | 0.188 | 194.52% |
| 51 | 0.362 | 0.362 | 0.00015 | 100.04% | 1.307 | 27.72% |
| 52 | 0.362 | 0.370 | 0.00749 | 102.07% | 1.307 | 28.28% |
| 61 | 0.362 | 0.364 | 0.00188 | 100.52% | 0.375 | 97.03% |

-continued

Fourth embodiment (Reference wavelength = 555 nm)

| | | | | | | |
|---|---|---|---|---|---|---|
| 62 | 0.362 | 0.372 | 0.01026 | 102.83% | 0.375 | 99.26% |

| ARS | EHD | ARS value | ARS − EHD | (ARS/EHD) % | TP | ARS/TP (%) |
|---|---|---|---|---|---|---|
| 11 | 1.038 | 1.091 | 0.05284 | 105.09% | 0.198 | 551.19% |
| 12 | 0.700 | 0.790 | 0.08981 | 112.83% | 0.198 | 399.05% |
| 21 | 0.584 | 0.586 | 0.00250 | 100.43% | 0.385 | 152.17% |
| 22 | 0.511 | 0.511 | −0.00024 | 99.95% | 0.385 | 132.67% |
| 31 | 0.537 | 0.543 | 0.00546 | 101.02% | 0.627 | 86.51% |
| 32 | 0.605 | 0.631 | 0.02612 | 104.32% | 0.627 | 100.61% |
| 41 | 0.690 | 0.692 | 0.00207 | 100.30% | 0.188 | 368.12% |
| 42 | 0.815 | 0.832 | 0.01619 | 101.99% | 0.188 | 442.19% |
| 51 | 1.156 | 1.172 | 0.01618 | 101.40% | 1.307 | 89.65% |
| 52 | 1.241 | 1.406 | 0.16507 | 113.30% | 1.307 | 107.54% |
| 61 | 1.319 | 1.477 | 0.15777 | 111.96% | 0.375 | 393.55% |
| 62 | 1.823 | 1.932 | 0.10927 | 105.99% | 0.375 | 514.91% |

The values stated as follows can be obtained according to table 7 and table 8.

Values Related to Inflection Point of Fourth Embodiment
(Primary Reference Wavelength = 555 nm)

| | | | | | | | |
|---|---|---|---|---|---|---|---|
| HIF111 | 0.1932 | HIF111/HOI | 0.0840 | SGI111 | −0.0076 | |SGI111|/(|SGI111|+TP1) | 0.0371 |
| HIF311 | 0.5114 | HIF311/HOI | 0.2223 | SGI311 | 0.0618 | |SGI311|/(|SGI311|+TP3) | 0.0897 |
| HIF411 | 0.2792 | HIF411/HOI | 0.1214 | SGI411 | 0.012132 | |SGI411|/(|SGI411|+TP4) | 0.0606 |
| HIF421 | 0.5940 | HIF421/HOI | 0.2582 | SGI421 | 0.1032 | |SGI421|/(|SGI421|+TP4) | 0.3542 |
| HIF521 | 1.1563 | HIF521/HOI | 0.5028 | SGI521 | −0.5410 | |SGI521|/(|SGI521|+TP5) | 0.2927 |
| HIF611 | 0.3868 | HIF611/HOI | 0.1682 | SGI611 | 0.038974 | |SGI611|/(|SGI611|+TP6) | 0.0941 |
| HIF621 | 0.4850 | HIF621/HOI | 0.2109 | SGI621 | 0.125601 | |SGI621|/(|SGI621|+TP6) | 0.2508 |

Fifth Embodiment

Figure 5B:
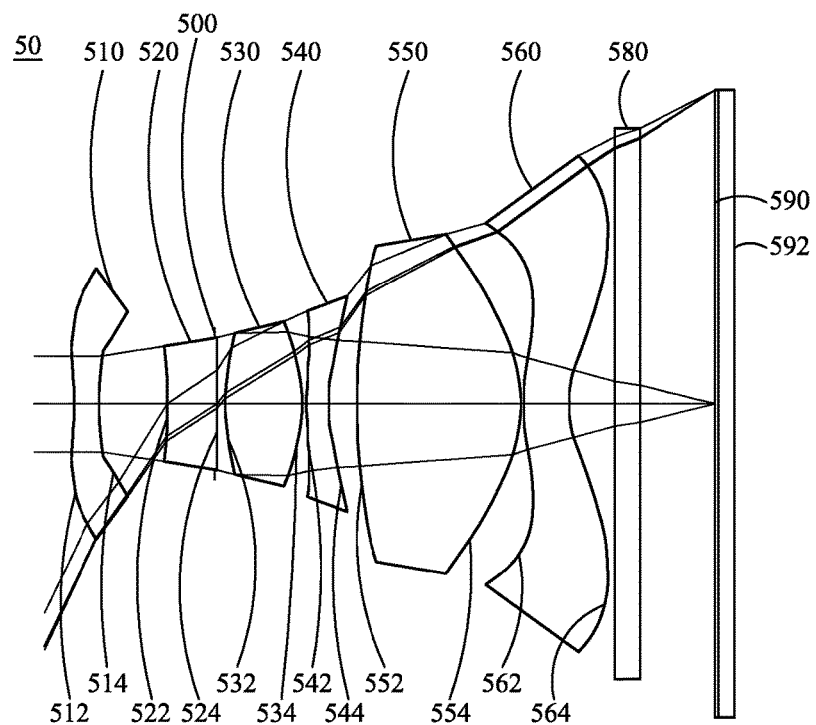
FIG. 5B is a curve diagram illustrating the spherical aberration, astigmatism and optical distortion of the optical image capturing system in order from left to right according to the fifth embodiment of the present invention.
Figure 5B:
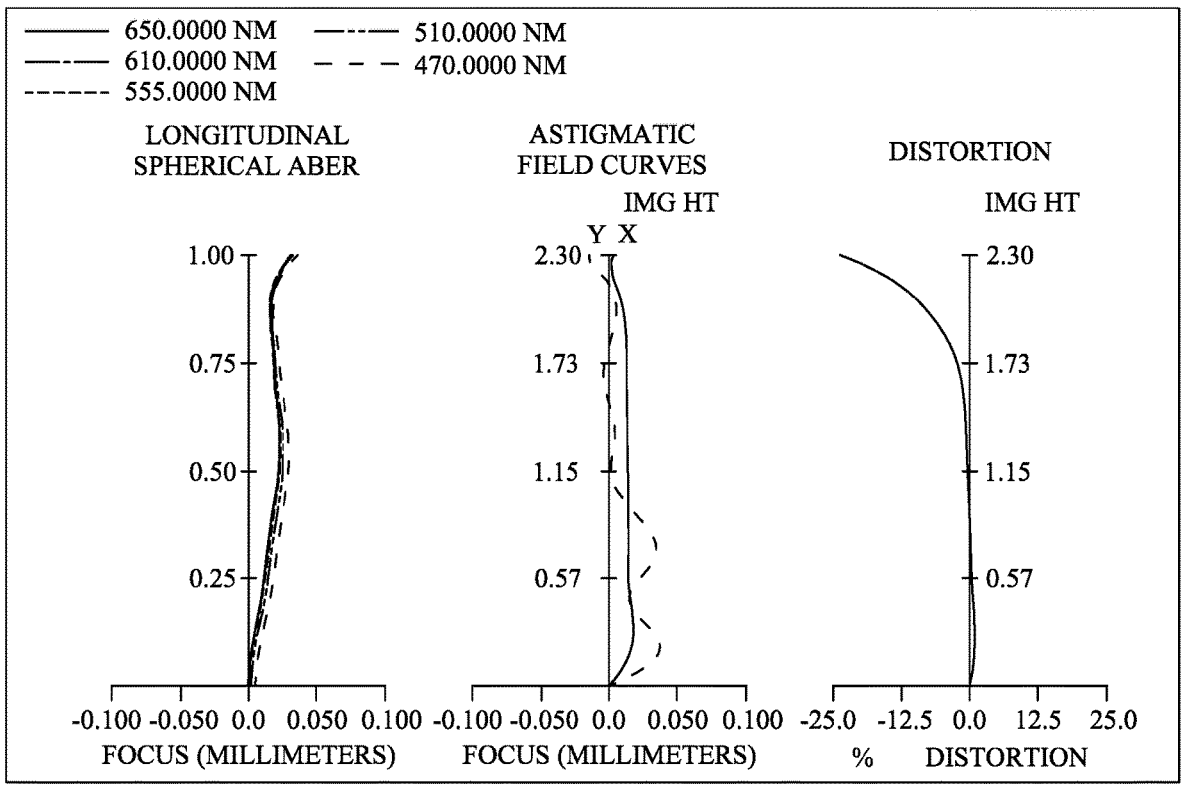
Figure 5C:
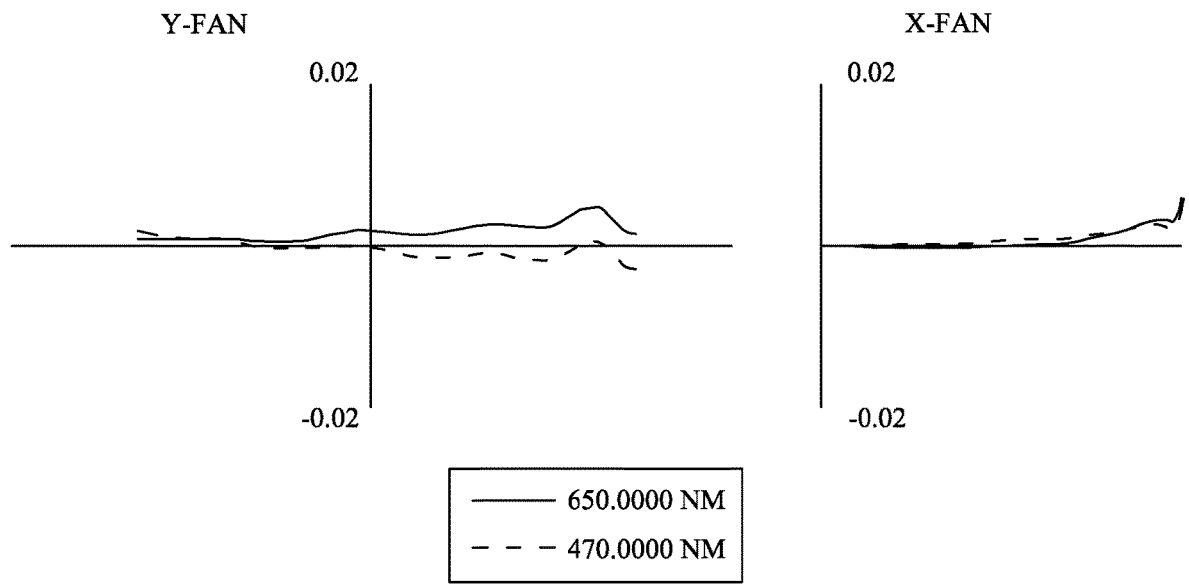
FIG. 5C shows the sagittal fan and the tangential fan of the optical image capturing system and the lateral aberration diagram of the longest operation wavelength and the shortest operation wavelength passing thorough the margin of the aperture at 0.7 field of view according to the fifth embodiment of the present invention.

Please refer to FIGS. 5A to 5C. FIG. 5A is a schematic view of the optical image capturing system according to the fifth embodiment of the present invention. FIG. 5B is a curve diagram illustrating the spherical aberration, astigmatism and optical distortion of the optical image capturing system in order from left to right according to the fifth embodiment of the present invention. FIG. 5C shows the sagittal fan and the tangential fan of the optical image capturing system and the lateral aberration diagram of the longest operation wavelength and the shortest operation wavelength passing thorough the margin of the aperture at 0.7 field of view according to the fifth embodiment of the present invention. As shown in FIG. 5A, an optical image capturing system includes, in the order from the object side to the image side, a first lens 510, a second lens 520, an aperture 500, a third lens 530, a fourth lens 540, a fifth lens 550, a sixth lens 560, an IR-cut filter 580, an image plane 590, and an image sensor element 592.

The first lens 510 has negative refractive power and is made of plastic. The object side 512 of the first lens 510 is a concave surface and the image side 514 of the first lens 510 is a concave surface, and the object side 512 and the image side 514 are aspheric. The object side 512 has one inflection point.

The second lens 520 has negative refractive power and is made of plastic. The object side 522 of the second lens 520 is a concave surface and the image side 524 of the second lens 520 is a concave surface, and the object side 522 and the image side 524 are aspheric. The image side 524 has two inflection points.

The third lens 530 has positive refractive power and is made of plastic. An object side 532 of the third lens 530 is a convex surface and an image side 534 of the third lens 530 is a convex surface, and the object side 532 and the image side 534 are both aspheric.

The fourth lens 540 has negative refractive power and is made of plastic. An object side 542 of the fourth lens 540 is a convex surface and an image side 544 of the fourth lens 540 is a concave surface, and the object side 542 and the image side 544 are both aspheric. The object side 542 has one inflection point and the image side 544 has one inflection point.

The fifth lens 550 has positive refractive power and is made of plastic. An object side 552 of the fifth lens 550 is a convex surface and an image side 554 of the fifth lens 550 is a convex surface, and the object side 552 and the image side 554 are both aspheric. The image side 554 has one inflection point.

The sixth lens 560 has negative refractive power and is made of plastic. An object side 562 of the sixth lens 560 is a convex surface and an image side 564 of the sixth lens is a concave surface, and the object side 562 and the image side 564 are both aspheric. The object side 562 has one inflection point and the image side 564 has one inflection point.

The IR-cut filter 580 is made of glass, and disposed between the sixth lens 560 and the image plane 590, and does not affect the focal length of the optical image capturing system.

Please refer to table 9 and table 10.

TABLE 9

Lens Parameters for the Fifth Embodiment
f(Focal length) = 1.56201 mm; f/HEP = 2.2; HAF(half angle of view) = 62.500 deg

| Surface | | Curvature Radius | Thickness (mm) | Material | Refractive index | Dispersion coefficient | Focal length |
|---|---|---|---|---|---|---|---|
| 0 | Object | 1E+18 | 1000 | | | | |
| 1 | Lens 1 | −1.897883059 | 0.202 | plastic | 1.535 | 56.27 | −3.09477 |
| 2 | | 13.72387162 | 0.548 | | | | |
| 3 | Lens 2 | −5.118448198 | 0.395 | plastic | 1.537 | 55.89 | −7.71441 |
| 4 | | 22.59176387 | 0.051 | | | | |

TABLE 9-continued

Lens Parameters for the Fifth Embodiment
f(Focal length) = 1.56201 mm; f/HEP = 2.2; HAF(half angle of view) = 62.500 deg

| Surface | | Curvature Radius | Thickness (mm) | Material | Refractive index | Dispersion coefficient | Focal length |
|---|---|---|---|---|---|---|---|
| 5 | Aperture | 1E+18 | 0.020 | plastic | | | |
| 6 | Lens 3 | 1.700995466 | 0.608 | | 1.535 | 56.27 | 1.47791 |
| 7 | | −1.29912695 | 0.039 | | | | |
| 8 | Lens 4 | 2.368648384 | 0.175 | plastic | 1.636 | 23.96 | −3.31552 |
| 9 | | 1.087143703 | 0.224 | | | | |
| 10 | Lens 5 | 4.281688601 | 1.317 | plastic | 1.535 | 56.27 | 1.57696 |
| 11 | | −0.940828398 | 0.020 | | | | |
| 12 | Lens 6 | 1.448917646 | 0.366 | plastic | 1.671 | 19.23 | −2.41888 |
| 13 | | 0.690441527 | 0.360 | | | | |
| 14 | IR-cut filter | 1E+18 | 0.210 | BK_7 | 1.517 | 64.13 | |
| 15 | | 1E+18 | 0.590 | | | | |
| 16 | linage plane | 1E+18 | 0.000 | | | | |

Reference wavelength = 555 nm; shield position: the clear aperture of the second surface is 0.678 mm. The clear aperture of the seventh surface is 0.605 mm. The clear aperture of the tenth surface is 1.156 mm.

Table 10 is the aspheric coefficients of the fifth embodiment.

TABLE 10

Aspheric Coefficients

| Surface | 1 | 2 | 3 | 4 | 6 | 7 | 8 |
|---|---|---|---|---|---|---|---|
| k | −6.200000E+01 | 1.940223E+01 | 6.200000E+01 | 6.200000E+01 | −6.200000E+01 | 3.357805E−01 | −1.672995E+01 |
| A4 | 5.855805E−01 | 1.919094E+00 | 7.752891E−02 | −7.161533E−02 | 1.482215E+00 | −1.567500E−01 | −1.027614E+00 |
| A6 | −2.689365E−01 | −9.865474E+00 | −2.381466E+00 | −8.325114E+00 | −1.801050E+01 | 3.839314E+00 | 7.176522E+00 |
| A8 | −1.436782E+00 | 8.278437E+01 | 3.323886E+01 | 1.975034E+02 | 1.946265E+02 | −2.534356E+01 | −3.953673E+01 |
| A10 | 4.964621E+00 | −5.086296E+02 | −2.846152E+02 | −2.554228E+03 | −1.474419E+03 | 8.142378E+01 | 1.442643E+02 |
| A12 | −8.020498E+00 | 2.062034E+03 | 1.516113E+03 | 2.053710E+04 | 7.194859E+03 | −8.647038E+01 | −3.473508E+02 |
| A14 | 7.622936E+00 | −5.367044E+03 | −5.043245E+03 | −1.059648E+05 | −2.138261E+04 | −2.795300E+02 | 5.303647E+02 |
| A16 | −4.320732E+00 | 8.667582E+03 | 1.014704E+04 | 3.444743E+05 | 3.506426E+04 | 1.164699E+03 | −4.689435E+02 |
| A18 | 1.327405E+00 | −7.915704E+03 | −1.128382E+04 | −6.465343E+05 | −2.428676E+04 | −1.726404E+03 | 1.821744E+02 |
| A20 | −1.665282E−01 | 3.111079E+03 | 5.333174E+03 | 5.355279E+05 | 0.000000E+00 | 9.831271E+02 | 0.000000E+00 |

| Surface | 9 | 10 | 11 | 12 | 13 |
|---|---|---|---|---|---|
| k | −2.424506E+00 | −6.200000E+01 | −2.957446E+00 | −2.475891E+01 | −3.123715E+00 |
| A4 | −1.029859E+00 | 4.689097E−02 | −5.034341E−02 | 2.869927E−01 | −2.879080E−01 |
| A6 | 4.782652E+00 | −1.328800E−01 | 2.574690E−01 | −1.800684E+00 | 2.459992E−01 |
| A8 | −1.718016E+01 | 6.353527E−01 | −1.257991E+00 | 4.048054E+00 | −1.591354E−01 |
| A10 | 4.398714E+01 | −1.538518E+00 | 2.921515E+00 | −5.944164E+00 | 7.384348E−02 |
| A12 | −7.587439E+01 | 2.064677E+00 | −3.797760E+00 | 5.880209E+00 | −2.455428E−02 |
| A14 | 8.341015E+01 | −1.593451E+00 | 2.975167E+00 | −3.848227E+00 | 5.323838E−03 |
| A16 | −5.288818E+01 | 6.881034E−01 | −1.415098E+00 | 1.574604E+00 | −6.208871E−04 |
| A18 | 1.475492E+01 | −1.447302E−01 | 3.792340E−01 | −3.619497E−01 | 1.837871E−05 |
| A20 | 0.000000E+00 | 9.330311E−03 | −4.380666E−02 | 3.560849E−02 | 1.848229E−06 |

In the fifth embodiment, the aspheric surface formula is presented in the same way in the first embodiment. In addition, the definitions of parameters in following tables are the same as those in the first embodiment. Therefore, similar description shall not be illustrated again.

The values stated as follows can be obtained according to table 9 and table 10.

| Fifth embodiment (Reference wavelength = 555 nm) | | | | | |
|---|---|---|---|---|---|
| \|f/f1\| | \|f/f2\| | \|f/f3\| | \|f/f4\| | \|f/f5\| | \|f/f6\| |
| 0.50473 | 0.20248 | 1.05690 | 0.47112 | 0.99052 | 0.64576 |
| ΣPPR | ΣNPR | ΣPPR/\|ΣNPR\| | IN12/f | IN56/f | TP4/(IN34 + TP4 + IN45) |
| 2.17378 | 1.69772 | 1.28041 | 0.35113 | 0.01280 | 0.40028 |
| \|f1/f2\| | \|f2/f3\| | (TP1 + IN12)/TP2 | | (TP6 + IN56)/TP5 | |
| 0.40117 | 5.21981 | 1.89999 | | 0.29303 | |
| HOS | InTL | HOS/HOI | InS/HOS | ODT % | TDT % |
| 5.12360 | 3.96402 | 2.22765 | 0.77740 | −23.70130 | 23.02870 |
| HVT51 | HVT52 | HVT61 | HVT62 | HVT62/HOI | HVT62/HOS |
| 0 | 0 | 0.71382 | 1.23755 | 0.53807 | 0.24154 |
| TP2/TP3 | TP3/TP4 | InRS61 | InRS62 | \|InRS61\|/TP6 | \|InRS62\|/TP6 |
| 0.64921 | 3.46669 | −0.30033 | 0.07332 | 0.82095 | 0.20043 |
| TP1 | TP2 | TP3 | TP4 | TP5 | TP6 |
| 0.202 | 0.395 | 0.608 | 0.175 | 1.317 | 0.366 |
| IN12 | IN23 | IN34 | IN45 | IN56 | |
| 0.548 | 0.071 | 0.039 | 0.224 | 0.020 | |
| PSTA | PLTA | NSTA | NLTA | SSTA | SLTA |
| −0.003 mm | 0.001 mm | 0.002 mm | 0.001 mm | 0.006 mm | 0.006 mm |

The values related to arc lengths can be obtained according to table 9 and table 10.

| Fifth embodiment (Reference wavelength = 555 nm) | | | | | | |
|---|---|---|---|---|---|---|
| ARE | ½(HEP) | ARE value | ARE − ½(HEP) | 2(ARE/ HEP) % | TP | ARE/ TP (%) |
| 11 | 0.355 | 0.355 | 0.00012 | 100.03% | 0.202 | 176.36% |
| 12 | 0.355 | 0.357 | 0.00157 | 100.44% | 0.202 | 177.08% |
| 21 | 0.355 | 0.355 | 0.00009 | 100.02% | 0.395 | 90.02% |
| 22 | 0.355 | 0.355 | −0.00027 | 99.92% | 0.395 | 89.93% |
| 31 | 0.355 | 0.357 | 0.00200 | 100.56% | 0.608 | 58.76% |
| 32 | 0.355 | 0.359 | 0.00414 | 101.16% | 0.608 | 59.11% |
| 41 | 0.355 | 0.355 | 0.00015 | 100.04% | 0.175 | 202.65% |
| 42 | 0.355 | 0.359 | 0.00337 | 100.95% | 0.175 | 204.48% |
| 51 | 0.355 | 0.355 | 0.00009 | 100.03% | 1.317 | 26.99% |
| 52 | 0.355 | 0.362 | 0.00699 | 101.97% | 1.317 | 27.51% |
| 61 | 0.355 | 0.357 | 0.00197 | 100.55% | 0.366 | 97.65% |
| 62 | 0.355 | 0.365 | 0.00997 | 102.81% | 0.366 | 99.84% |
| ARS | EHD | ARS value | ARS − EHD | (ARS/ EHD) % | TP | ARS/ TP (%) |
| 11 | 0.998 | 1.042 | 0.04371 | 104.38% | 0.202 | 516.99% |
| 12 | 0.678 | 0.747 | 0.06980 | 110.30% | 0.202 | 370.86% |
| 21 | 0.545 | 0.547 | 0.00204 | 100.37% | 0.395 | 138.66% |
| 22 | 0.485 | 0.484 | −0.00077 | 99.84% | 0.395 | 122.63% |
| 31 | 0.546 | 0.552 | 0.00652 | 101.19% | 0.608 | 90.83% |
| 32 | 0.605 | 0.627 | 0.02203 | 103.64% | 0.608 | 103.10% |
| 41 | 0.684 | 0.686 | 0.00111 | 100.16% | 0.175 | 390.86% |
| 42 | 0.796 | 0.812 | 0.01624 | 102.04% | 0.175 | 463.03% |
| 51 | 1.156 | 1.172 | 0.01582 | 101.37% | 1.317 | 88.98% |
| 52 | 1.245 | 1.407 | 0.16176 | 112.99% | 1.317 | 106.84% |
| 61 | 1.322 | 1.477 | 0.15468 | 111.70% | 0.366 | 403.69% |
| 62 | 1.820 | 1.931 | 0.11030 | 106.06% | 0.366 | 527.74% |

The values stated as follows can be obtained according to table 9 and table 10.

| Values Related to Inflection Point of fifth Embodiment (Primary Reference Wavelength = 555 nm) | | | | | | | |
|---|---|---|---|---|---|---|---|
| HIF111 | 0.1945 | HIF111/HOI | 0.0846 | SGI111 | −0.00792 | \|SGI111\|/(\|SGI111\|+TP1) | 0.0378 |
| HIF221 | 0.1259 | HIF221/HOI | 0.0547 | SGI221 | 0.0003 | \|SGI221\|/(\|SGI221\|+TP2) | 0.0008 |
| HIF222 | 0.4823 | HIF222/HOI | 0.2097 | SGI222 | −0.0041 | \|SGI222\|/(\|SGI222\|+TP2) | 0.0103 |
| HIF411 | 0.2647 | HIF411/HOI | 0.1151 | SGI411 | 0.0108 | \|SGI411\|/(\|SGI411\|+TP4) | 0.0580 |
| HIF421 | 0.7058 | HIF421/HOI | 0.3069 | SGI421 | 0.1321 | \|SGI421\|/(\|SGI421\|+TP4) | 0.4297 |
| HIF521 | 1.1629 | HIF521/HOI | 0.5056 | SGI521 | −0.5368 | \|SGI521\|/(\|SGI521\|+TP5) | 0.2896 |
| HIF611 | 0.3882 | HIF611/HOI | 0.1688 | SGI611 | 0.0414 | \|SGI611\|/(\|SGI611\|+TP6) | 0.1016 |
| HIF621 | 0.4820 | HIF621/HOI | 0.2096 | SGI621 | 0.1258 | \|SGI621\|/(\|SGI621\|+TP6) | 0.2559 |

Sixth Embodiment

Figure 6A:
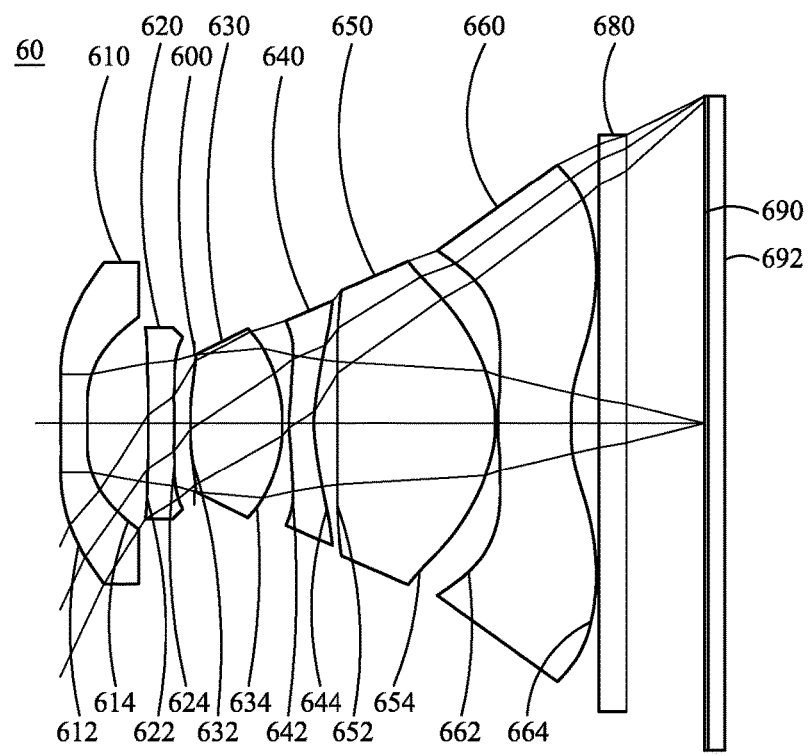
FIG. 6A is a schematic view of the optical image capturing system according to the sixth embodiment of the present invention.
Figure 6B:
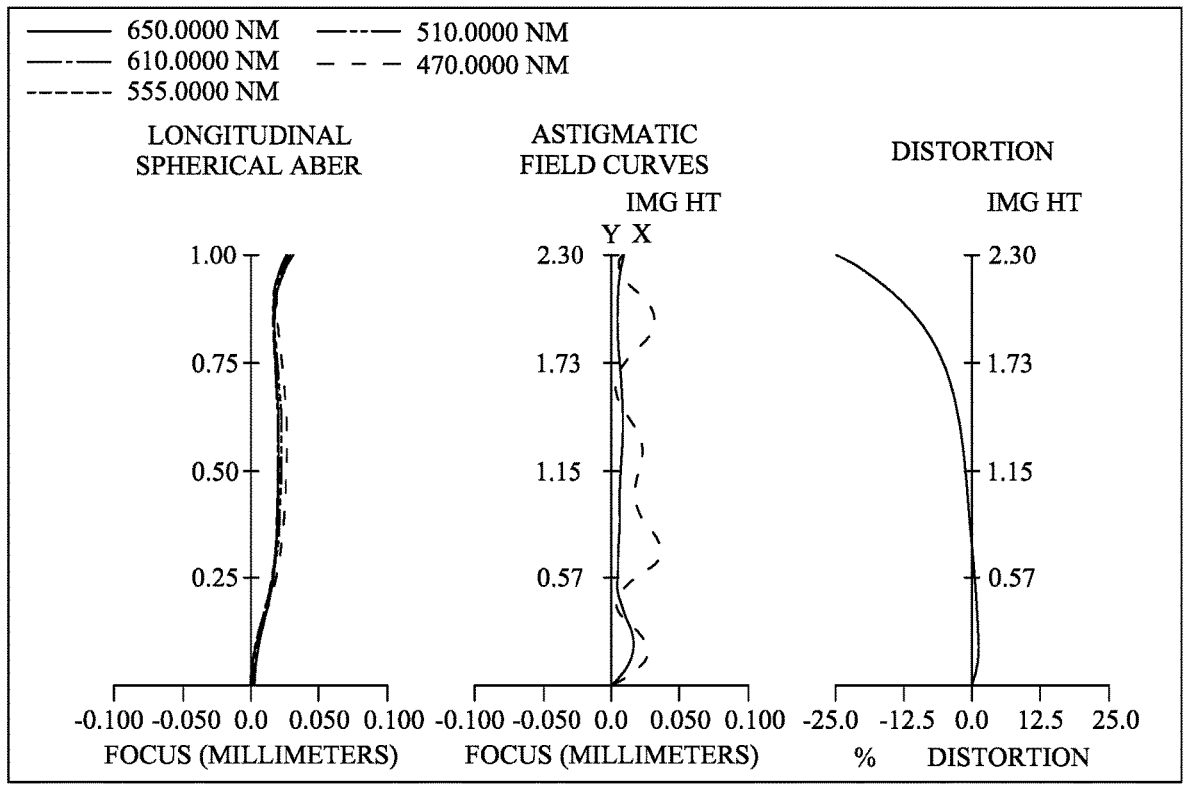
FIG. 6B is a curve diagram illustrating the spherical aberration, astigmatism and optical distortion of the optical image capturing system in order from left to right according to the sixth embodiment of the present invention.
Figure 6C:
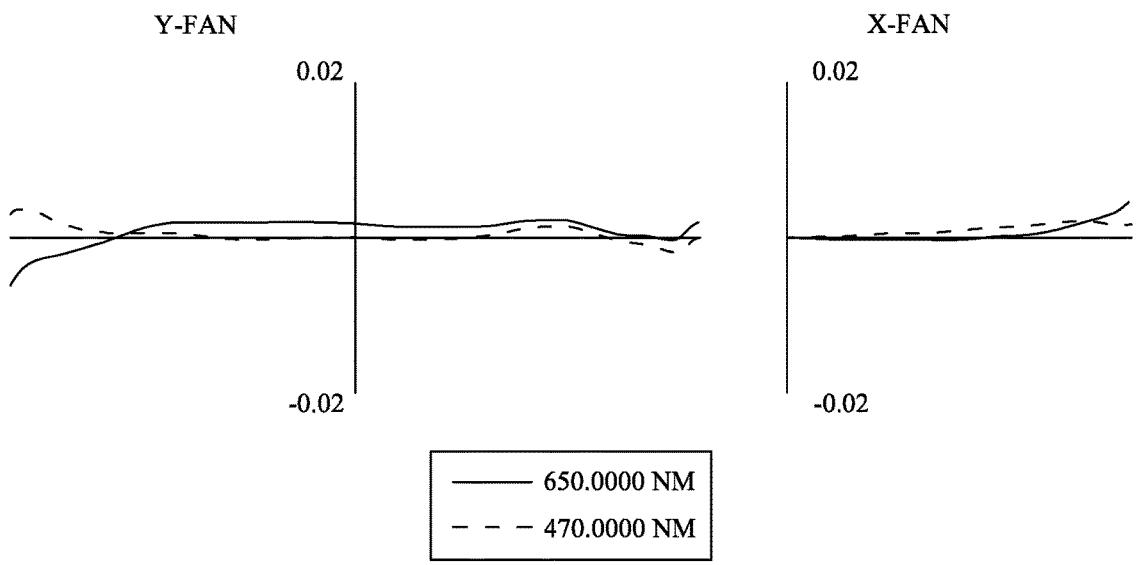
FIG. 6C shows the sagittal fan and the tangential fan of the optical image capturing system and the lateral aberration diagram of the longest operation wavelength and the shortest operation wavelength passing thorough the margin of the aperture at 0.7 field of view according to the sixth embodiment of the present invention.

Please refer to FIGS. 6A to 6C. FIG. 6A is a schematic view of the optical image capturing system according to the sixth embodiment of the present invention. FIG. 6B is a curve diagram illustrating the spherical aberration, astigmatism and optical distortion of the optical image capturing system in order from left to right according to the sixth embodiment of the present invention. FIG. 6C shows the sagittal fan and the tangential fan of the optical image capturing system and the lateral aberration diagram of the longest operation wavelength and the shortest operation wavelength passing thorough the margin of the aperture at 0.7 field of view according to the sixth embodiment of the present invention. As shown in FIG. 6A, an optical image capturing system includes, in the order from the object side to the image side, a first lens 610, a second lens 620, an aperture 600, a third lens 630, a fourth lens 640, a fifth lens 650, a sixth lens 660, an IR-cut filter 680, an image plane 690, and an image sensor element 692.

The first lens 610 has negative refractive power and is made of plastic. The object side 612 of the first lens 610 is a concave surface and the image side 614 of the first lens 610 is a concave surface, and the object side 612 and the image side 614 are aspheric. The object side 612 has one inflection point, and the image side 614 has one inflection point.

The second lens 620 has negative refractive power and is made of plastic. The object side 622 of the second lens 620 is a concave surface and the image side 624 of the second lens 620 is a convex surface, and the object side 622 and the image side 624 are aspheric. The object side 622 has two inflection points, and the image side 624 has one inflection point.

The third lens 630 has positive refractive power and is made of plastic. An object side 632 of the third lens 630 is a convex surface and an image side 634 of the third lens 630 is a convex surface, and the object side 632 and the image side 634 are both aspheric.

The fourth lens 640 has negative refractive power and is made of plastic. An object side 642 of the fourth lens 640 is a convex surface and an image side 644 of the fourth lens 640 is a concave surface, and the object side 642 and the image side 644 are both aspheric. The object side 642 has one inflection point, and the image side 644 has one inflection point.

The fifth lens 650 has positive refractive power and is made of plastic. An object side 652 of the fifth lens 650 is a concave surface and an image side 654 of the fifth lens 650 is a convex surface, and the object side 652 and the image side 654 are both aspheric. The object side 652 has two inflection points and the image side 654 has one inflection point.

The sixth lens 660 has negative refractive power and is made of plastic. An object side 662 of the sixth lens 660 is a convex surface and an image side 664 of the sixth lens 660 is a concave surface, and the object side 662 and the image side 664 are both aspheric. The object side 662 has two inflection points and the image side 664 has one inflection point. Hereby, this configuration is beneficial to shorten the back focal length of the optical image capturing system so as to keep the optical image capturing system minimized. Furthermore, the incident angle of the off-axis rays can be effectively reduced, thereby further correcting the off-axis aberration.

The IR-cut filter 680 is made of glass, and disposed between the sixth lens 660 and the image plane 690, and does not affect the focal length of the optical image capturing system.

Please refer to table 11 and table 12.

TABLE 11

Lens Parameters for the Sixth Embodiment
f(Focal length) = 1.56572 mm; f/HEP = 2.2; HAF(half angle of view) = 62.830 deg

| Surface | | Curvature Radius | Thickness (mm) | Material | Refractive index | Dispersion coefficient | Focal length |
|---|---|---|---|---|---|---|---|
| 0 | Object | 1E+18 | 1000 | | | | |
| 1 | Lens 1 | −4.23110507 | 0.200 | plastic | 1.535 | 56.27 | −2.73374 |
| 2 | | 2.280738711 | 0.471 | | | | |
| 3 | Lens 2 | −7.498762508 | 0.200 | plastic | 1.535 | 56.27 | −44.4374 |
| 4 | | −11.04312002 | 0.154 | | | | |
| 5 | Aperture | 1E+18 | −0.028 | plastic | | | |
| 6 | Lens 3 | 3.360199752 | 0.704 | | 1.535 | 56.27 | 1.60872 |
| 7 | | −1.075987492 | 0.051 | | | | |
| 8 | Lens 4 | 1.834674021 | 0.190 | plastic | 1.636 | 22.47 | −5.53766 |
| 9 | | 1.160234487 | 0.179 | | | | |
| 10 | Lens 5 | −41.41053395 | 1.214 | plastic | 1.535 | 56.27 | 1.66963 |
| 11 | | −0.885496343 | 0.020 | | | | |
| 12 | Lens 6 | 3.063356273 | 0.553 | plastic | 1.671 | 19.23 | −2.19418 |
| 13 | | 0.927953311 | 0.221 | | | | |
| 14 | IR-cut filter | 1E+18 | 0.210 | BK_7 | 1.517 | 64.13 | |
| 15 | | 1E+18 | 0.598 | | | | |
| 16 | Image plane | 1E+18 | 0.000 | | | | |

Reference wavelength = 555 nm; shield position: the clear aperture of the second surface is 0.751 mm. The clear aperture of the seventh surface is 0.671 mm. The clear aperture of the tenth surface is 0.938 mm.

Table 12 is the aspheric coefficients of the sixth embodiment.

TABLE 12

| Aspheric Coefficients | | | | | | | |
|---|---|---|---|---|---|---|---|
| Surface | 1 | 2 | 3 | 4 | 6 | 7 | 8 |
| k | −3.528147E+02 | 7.289069E+00 | −6.293835E+00 | 3.293826E+02 | −3.849860E+01 | 7.176094E−01 | −2.520848E+01 |
| A4 | 7.071994E−01 | 1.368177E+00 | 2.947601E−01 | 7.901890E−01 | 4.160574E−01 | −6.128824E−01 | −9.316880E−01 |
| A6 | −9.853085E−01 | 3−.109418E+00 | −5.766901E−01 | −3.326872E+00 | 2.170922E+00 | 7.934560E+00 | 6.625259E+00 |
| A8 | 8.775497E−01 | 1.481303E+01 | −3.614184E+00 | 4.590533E+01 | −7.096897E+01 | −.833916E+01 | −4.111297E+01 |
| A10 | 1.430867E−01 | −7.873445E+01 | 5.863839E+01 | −5.210397E+02 | 9.176330E+02 | 2.948474E+02 | 1.734532E+02 |
| A12 | −1.432562E+00 | 3.372976E+02 | −4.307108E+02 | 3.795686E+03 | −7.158031E+03 | −1.044398E+03 | −5.083568E+02 |
| A14 | 1.670268E+00 | −9.565528E+02 | 1.732778E+03 | −1.740217E+04 | 3.460481E+04 | 2.529718E+03 | 9.841456E+02 |
| A16 | −9.199754E−01 | 1.683551E+03 | −3.948056E+03 | 4.893260E+04 | −1.011602E+05 | −3.957874E+03 | −1.166988E+03 |
| A18 | 2.401816E−01 | −1.698812E+03 | 4.811755E+03 | −7.692705E+04 | 1.635758E+05 | 3.580466E+03 | 7.346129E+02 |
| A20 | −2.03613 1E−02 | 7.410884E+02 | −2.439704E+03 | 5.214729E+04 | −1.122385E+05 | −1.416867E+03 | −1.724149E+02 |

| Surface | 9 | 10 | 11 | 12 | 13 |
|---|---|---|---|---|---|
| k | −2.644352E+00 | 5.000000E+02 | −1.896850E+00 | −2.093570E+02 | −4.861488E+00 |
| A4 | −7.767334E−01 | 1.277054E−01 | −1.416306E−01 | 6.647560E−02 | −2.328880E−01 |
| A6 | 2.694729E+00 | −5.620559E−01 | 1.489258E+00 | −9.942612E−01 | 1.686533E−01 |
| A8 | −7.821686E+00 | 1.715689E+00 | −8.385094E+00 | 1.004874E+00 | −8.017526E−02 |

TABLE 12-continued

| Aspheric Coefficients | | | | | |
|---|---|---|---|---|---|
| A10 | 1.714647E+01 | −2.010159E+00 | 2.452909E+01 | 1.650715E+00 | 9.502055E−03 |
| A12 | −2.979682E+01 | −2.688657E+00 | −4.314464E+01 | −6.327261E+00 | 1.297153E−02 |
| A14 | 4.137845E+01 | 1.237367E+01 | 4.714661E+01 | 8.438391E+00 | −8.737720E−03 |
| A16 | −4.062759E+01 | −1.669093E+01 | −3.133945E+01 | −5.891701E+00 | 2.541225E−03 |
| A18 | 2.309578E+01 | 1.020561E+01 | 1.159519E+01 | 2.138455E+00 | −3.703499E−04 |
| A20 | −5.463827E+00 | −2.411501E+00 | −1.825130E+00 | −3.170301E−01 | 2.211992E−05 |

In the sixth embodiment, the aspheric surface formula is presented in the same way in the first embodiment. In addition, the definitions of parameters in following tables are the same as those in the first embodiment. Therefore, similar description shall not be illustrated again.

The values stated as follows can be obtained according to table 11 and table 12.

| Sixth embodiment (Reference wavelength = 555 nm) | | | | | |
|---|---|---|---|---|---|
| |f/f1| | |f/f2| | |f/f3| | |f/f4| | |f/f5| | |f/f6| |
| 0.57274 | 0.03523 | 0.97327 | 0.28274 | 0.93776 | 0.71358 |
| ΣPPR | ΣNPR | ΣPPR/|ΣNPR| | IN12/f | IN56/f | TP4/(IN34 + TP4 + IN45) |
| 2.83953 | 0.60797 | 4.67049 | 0.30053 | 0.01277 | 0.45353 |
| |f1/f2| | |f2/f3| | (TP1 + IN12)/TP2 | | (TP6 + IN56)/TP5 | |
| 0.06152 | 27.62283 | 3.35271 | | 0.47195 | |
| HOS | InTL | HOS/HOI | InS/HOS | ODT % | TDT % |
| 4.93747 | 3.90816 | 2.14673 | 0.79240 | −24.94460 | 22.77420 |
| HVT51 | HVT52 | HVT61 | HVT62 | HVT62/HOI | HVT62/HOS |
| 0.273574 | 0 | 0.46963 | 1.08937 | 0.47364 | 0.22063 |
| TP2/TP3 | TP3/TP4 | InRS61 | InRS62 | |InRS61|/TP6 | |InRS62|/TP6 |
| 0.28407 | 3.69683 | −0.46158 | −0.09929 | 0.83461 | 0.17954 |
| TP1 | TP2 | TP3 | TP4 | TP5 | TP6 |
| 0.200 | 0.200 | 0.704 | 0.190 | 1.214 | 0.553 |
| IN12 | IN23 | IN34 | IN45 | IN56 | |
| 0.471 | 0.126 | 0.051 | 0.179 | 0.020 | |
| PSTA | PLTA | NSTA | NLTA | SSTA | SLTA |
| 0.0001 mm | 0.002 mm | 0.003 mm | −0.006 mm | 0.001 mm | 0.004 mm |

The values related to arc lengths can be obtained according to table 11 and table 12.

| Sixth embodiment (Reference wavelength = 555 nm) | | | | | | | Sixth embodiment (Reference wavelength = 555 nm) | | | | | |
|---|---|---|---|---|---|---|---|---|---|---|---|---|
| ARE | ½(HEP) | ARE value | ARE − ½(HEP) | 2(ARE/HEP) % | TP | ARE/TP (%) | ARS | EHD | ARS value | ARS − EHD | (ARS/EHD)% | TP | ARS/TP (%) |
| 11 | 0.356 | 0.356 | −0.00001 | 100.00% | 0.200 | 178.04% | 11 | 1.144 | 1.236 | 0.09139 | 107.99% | 0.200 | 617.83% |
| 12 | 0.356 | 0.361 | 0.00484 | 101.36% | 0.200 | 180.46% | 12 | 0.751 | 0.900 | 0.14934 | 119.89% | 0.200 | 450.05% |
| 21 | 0.356 | 0.356 | −0.00004 | 99.99% | 0.200 | 178.02% | 21 | 0.679 | 0.680 | 0.00043 | 100.06% | 0.200 | 339.76% |
| 22 | 0.356 | 0.356 | 0.00001 | 100.00% | 0.200 | 178.04% | 22 | 0.552 | 0.554 | 0.00255 | 100.46% | 0.200 | 277.04% |
| 31 | 0.356 | 0.357 | 0.00098 | 100.28% | 0.704 | 50.72% | 31 | 0.504 | 0.507 | 0.00323 | 100.64% | 0.704 | 72.06% |
| 32 | 0.356 | 0.364 | 0.00769 | 102.16% | 0.704 | 51.67% | 32 | 0.671 | 0.741 | 0.06977 | 110.39% | 0.704 | 105.25% |
| 41 | 0.356 | 0.357 | 0.00063 | 100.18% | 0.190 | 187.30% | 41 | 0.730 | 0.739 | 0.00918 | 101.26% | 0.190 | 388.21% |
| 42 | 0.356 | 0.359 | 0.00328 | 100.92% | 0.190 | 188.69% | 42 | 0.870 | 0.882 | 0.01278 | 101.47% | 0.190 | 463.29% |
| 51 | 0.356 | 0.356 | −0.00008 | 99.98% | 1.214 | 29.32% | 51 | 0.938 | 0.939 | 0.00147 | 100.16% | 1.214 | 77.35% |
| 52 | 0.356 | 0.365 | 0.00878 | 102.47% | 1.214 | 30.05% | 52 | 1.158 | 1.380 | 0.22266 | 119.23% | 1.214 | 113.67% |
| 61 | 0.356 | 0.356 | 0.00021 | 100.06% | 0.553 | 64.42% | 61 | 1.250 | 1.465 | 0.21477 | 117.18% | 0.553 | 264.85% |
| 62 | 0.356 | 0.362 | 0.00560 | 101.57% | 0.553 | 65.40% | 62 | 1.877 | 2.007 | 0.13025 | 106.94% | 0.553 | 362.89% |

The values stated as follows can be obtained according to table 11 and table 12.

Values Related to Inflection Point of sixth Embodiment
(Primary Reference Wavelength = 555 nm)

| | | | | | | | |
|---|---|---|---|---|---|---|---|
| HIF111 | 0.1364 | HIF111/HOI | 0.0593 | SGI111 | −0.0018 | \|SGI111\|/(\|SGI111\|+TP1) | 0.0089 |
| HIF121 | 0.6842 | HIF121/HOI | 0.2975 | SGI121 | 0.3190 | \|SGI121\|/(\|SGI121\|+TP1) | 0.6147 |
| HIF211 | 0.2299 | HIF211/HOI | 0.1000 | SGI211 | −0.0028 | \|SGI211\|/(\|SGI211\|+TP2) | 0.0138 |
| HIF212 | 0.3852 | HIF212/HOI | 0.1675 | SGI212 | −0.0054 | \|SGI212\|/(\|SGI212\|+TP2) | 0.0264 |
| HIF221 | 0.1047 | HIF221/HOI | 0.0455 | SGI221 | −0.0004 | \|SGI221\|/(\|SGI221\|+TP2) | 0.0020 |
| HIF411 | 0.2551 | HIF411/HOI | 0.1109 | SGI411 | 0.0134 | \|SGI411\|/(\|SGI411\|+TP4) | 0.0655 |
| HIF421 | 0.4917 | HIF421/HOI | 0.2138 | SGI421 | 0.0732 | \|SGI421\|/(\|SGI421\|+TP4) | 0.2777 |
| HIF511 | 0.1404 | HIF511/HOI | 0.0610 | SGI511 | −0.0002 | \|SGI511\|/(\|SGI511\|+TP5) | 0.0002 |
| HIF512 | 0.9262 | HIF512/HOI | 0.4027 | SGI512 | 0.0342 | \|SGI512\|/(\|SGI512\|+TP5) | 0.0274 |
| HIF521 | 1.0214 | HIF521/HOI | 0.4441 | SGI521 | −0.5576 | \|SGI521\|/(\|SGI521\|+TP5) | 0.3147 |
| HIF611 | 0.2706 | HIF611/HOI | 0.1177 | SGI611 | 0.0091 | \|SGI611\|/(\|SGI611\|+TP6) | 0.0162 |
| HIF612 | 1.1634 | HIF612/HOI | 0.5058 | SGI612 | −0.3871 | \|SGI612\|/(\|SGI612\|+TP6) | 0.4117 |
| HIF621 | 0.4562 | HIF621/HOI | 0.1983 | SGI621 | 0.0851 | \|SGI621\|/(\|SGI621\|+TP6) | 0.1334 |

The above description is merely illustrative rather than restrictive. Any equivalent modification or alteration without departing from the spirit and scope of the present invention should be included in the appended claims.

What is claimed is:

1. An optical image capturing system, from an object side to an image side, comprising:
    a first lens with negative refractive power, with an object-side surface being concave and an image-side surface being concave;
    a second lens with negative refractive power, with an object-side surface being concave;
    a third lens with positive refractive power;
    a fourth lens with positive refractive power;
    a fifth lens with positive refractive power;
    a sixth lens with negative refractive power; and
    an image plane;
    wherein the optical image capturing system comprises six lenses made of plastic, focal lengths of the first lens through the sixth lens are f1, f2, f3, f4, f5 and f6, respectively, and a focal length of the optical image capturing system is f, an entrance pupil diameter of the optical image capturing system is denoted by HEP, a distance on the optical axis from an object side of the first lens to the image plane is denoted by HOS, a half maximum angle of view of the optical image capturing system is denoted by HAF, with a starting point on any surface of any one of the six lenses at the optical axis and a coordinate point on the same surface of a vertical height of ½ HEP measured from the optical axis, a length of an outline curve along the surface from the starting point to the coordinate point is denoted by ARE, and the following conditions are satisfied:

$1.0 \leq f/HEP \leq 3.0$; $50 \text{ deg} < HAF \leq 70 \text{ deg}$; $0.5 \leq HOS/f \leq 5$; and $0.92 \leq (ARE/HEP) \leq 2.0$.

2. The optical image capturing system according to claim 1, wherein a maximum height for image formation on the image plane perpendicular to an optical axis in the optical image capturing system is HOI, the following condition is satisfied:

$0.5 \leq HOS/HOI \leq 3$.

3. The optical image capturing system according to claim 1, further comprising an aperture, wherein the aperture is in front of an image side of the third lens.

4. The optical image capturing system according to claim 1, wherein an object-side surface of the sixth lens on the optical axis is a convex surface.

5. The optical image capturing system according to claim 1, wherein an object-side surface of the fifth lens on the optical axis is a convex surface, and an image-side surface of the fifth lens on the optical axis is a convex surface.

6. The optical image capturing system according to claim 1, wherein TV distortion for image formation in the optical image capturing system is denoted by TDT, a maximum height for image formation on the image plane perpendicular to the optical axis in the optical image capturing system is HOI, a lateral aberration of the longest operation wavelength of visible light of a positive tangential fan of the optical image capturing system passing through the margin of the entrance pupil and incident on the first image plane by 0.7 HOI is denoted by PLTA, a lateral aberration of the shortest operation wavelength of visible light of the positive tangential fan of the optical image capturing system passing through the margin of the entrance pupil and incident on the first image plane by 0.7 HOI is denoted by PSTA, a lateral aberration of the longest operation wavelength of visible light of a negative tangential fan of the optical image capturing system passing through the margin of the entrance pupil and incident on the first image plane by 0.7 HOI is denoted by NLTA, a lateral aberration of the shortest operation wavelength of visible light of a negative tangential fan of the optical image capturing system passing through the margin of the entrance pupil and incident on the first image plane by 0.7 HOI is denoted by NSTA, a lateral aberration of the longest operation wavelength of visible light of a sagittal fan of the optical image capturing system passing through the margin of the entrance pupil and incident on the first image plane by 0.7 HOI is denoted by SLTA, a lateral aberration of the shortest operation wavelength of visible light of the sagittal fan of the optical image capturing system passing through the margin of the entrance pupil and incident on the first image plane by 0.7 HOI is denoted by SSTA, and the following conditions are satisfied:

$PLTA \leq 100$ micrometers; $PSTA \leq 100$ micrometers; $NLTA \leq 100$ micrometers;

$NSTA \leq 100$ micrometers; $SLTA \leq 100$ micrometers; and $SSTA \leq 100$ micrometers;

$|TDT| < 250\%$.

7. The optical image capturing system according to claim 1, wherein the ARE on an object-side surface of the sixth lens is denoted by ARE61, and the ARE on an image-side surface of the sixth lens is denoted by ARE62, and a thickness of the sixth lens on the optical axis is denoted by TP6, and the following conditions are satisfied:

$0.05 \leq ARE61/TP6 \leq 35$; and $0.05 \leq ARE62/TP6 \leq 35$.

8. An optical image capturing system, from an object side to an image side, comprising:

a first lens with negative refractive power, with an object-side surface being concave and an image-side surface being concave;
a second lens with negative refractive power, with an object-side surface being concave;
a third lens with positive refractive power;
a fourth lens with negative refractive power;
a fifth lens with positive refractive power;
a sixth lens with negative refractive power; and
an image plane;
wherein focal lengths of the first lens through the sixth lens are f1, f2, f3, f4, f5 and f6, respectively, and a focal length of the optical image capturing system is f, an entrance pupil diameter of the optical image capturing system is denoted by HEP, a distance on the optical axis from an object side of the first lens to the image plane is denoted by HOS, a half maximum angle of view of the optical image capturing system is denoted by HAF, with a starting point on any surface of any one of the six lenses at the optical axis and a coordinate point on the same surface of a vertical height of ½ HEP measured from the optical axis, a length of an outline curve along the surface from the starting point to the coordinate point is denoted by ARE, and the following conditions are satisfied:

$1.0 \leq f/HEP \leq 3.0$; 50 deg$<HAF \leq 70$ deg; $0.5 \leq HOS/f \leq 5$; and $0.9 \leq 2(ARE/HEP) \leq 2.0$.

9. The optical image capturing system according to claim 8, wherein a distance between the fourth lens and the fifth lens on the optical axis is denoted by IN45, a distance between the fifth lens and the sixth lens on the optical axis is denoted by IN56, and the following condition is satisfied:

$IN45 > IN56$.

10. The optical image capturing system according to claim 8, wherein a distance between the second lens and the third lens on the optical axis is denoted by IN23, a distance between the fifth lens and the sixth lens on the optical axis is denoted by IN56, and the following condition is satisfied:

$IN23 \square IN56$.

11. The optical image capturing system according to claim 8, wherein a thickness of the third lens on the optical axis is denoted by TP3, a thickness of the fifth lens on the optical axis is denoted by TP5, and the following condition is satisfied:

$TP5 > TP3$.

12. The optical image capturing system according to claim 8, wherein a thickness of the second lens on the optical axis is denoted by TP2, a thickness of the third lens on the optical axis is denoted by TP3, and the following condition is satisfied:

$TP3 > TP2$.

13. The optical image capturing system according to claim 8, wherein the object-side surface of the first lens has at least one inflection point.

14. The optical image capturing system according to claim 8, wherein an effective maximum radius of any surface of any one lens among the six lenses is denoted by EHD, a maximum effective half diameter position of any surface of any one lens among the six lenses is a position on the surface of a vertical height of EHD measured from the optical axis, and with the maximum effective half diameter position of the surface along the outline of the surface defined as a first final point, a length of outline curve from the starting point to the first final point is denoted by ARS, and the following condition is satisfied:

$0.9 \leq ARS/EHD \leq 2.0$.

15. The optical image capturing system according to claim 8, further comprising an aperture, wherein a distance from the aperture to the image plane on the optical axis is denoted by InS, and the following condition is satisfied:

$0.1 \leq InS/HOS \leq 1.1$.

16. The optical image capturing system according to claim 8, wherein a maximum height for image formation on the image plane perpendicular to the optical axis in the optical image capturing system is HOI, a lateral aberration of the longest operation wavelength of visible light of a positive tangential fan of the optical image capturing system passing through the margin of the entrance pupil and incident on the first image plane by 0.7 HOI is denoted by PLTA, a lateral aberration of the shortest operation wavelength of visible light of the positive tangential fan of the optical image capturing system passing through the margin of the entrance pupil and incident on the first image plane by 0.7 HOI is denoted by PSTA, a lateral aberration of the longest operation wavelength of visible light of a negative tangential fan of the optical image capturing system passing through the margin of the entrance pupil and incident on the first image plane by 0.7 HOI is denoted by NLTA, a lateral aberration of the shortest operation wavelength of visible light of a negative tangential fan of the optical image capturing system passing through the margin of the entrance pupil and incident on the first image plane by 0.7 HOI is denoted by NSTA, a lateral aberration of the longest operation wavelength of visible light of a sagittal fan of the optical image capturing system passing through the margin of the entrance pupil and incident on the first image plane by 0.7 HOI is denoted by SLTA, a lateral aberration of the shortest operation wavelength of visible light of the sagittal fan of the optical image capturing system passing through the margin of the entrance pupil and incident on the first image plane by 0.7 HOI is denoted by SSTA, and the following conditions are satisfied:

$PLTA \leq 80$ micrometers; $PSTA \leq 80$ micrometers; $NLTA \leq 80$ micrometers; $NSTA \leq 80$ micrometers; $SLTA \leq 80$ micrometers; and $SSTA \leq 80$ micrometers; and $HOI > 1.0$ mm.

17. The optical image capturing system according to claim 8, wherein a distance between the fifth lens and the sixth lens on the optical axis is denoted by IN56, a thickness of the fifth lens on the optical axis is denoted by TP5, a thickness of the sixth lens on the optical axis is denoted by TP6, and the following condition is satisfied:

$0.1 \leq (TP6+IN56)/TP5 \leq 50$.

18. An optical image capturing system, from an object side to an image side, comprising:
a first lens with negative refractive power, with an object-side surface being concave and an image-side surface being concave;
a second lens with positive refractive power, with an object-side surface being concave;
a third lens with positive refractive power;
a fourth lens with negative refractive power;
a fifth lens with positive refractive power;
a sixth lens with negative refractive power; and
an image plane;
wherein the optical image capturing system comprises six lenses and made of plastic, a maximum height for image formation on the image plane perpendicular to an optical axis in the optical image capturing system is HOI, focal lengths of the first lens through the sixth lens are f1, f2, f3, f4, f5 and f6, respectively, and a focal length of the optical image capturing system is f, an entrance pupil diameter of the optical image capturing system is denoted by HEP, a half maximum angle of view of the optical image capturing system is denoted by HAF, a distance on the optical axis from an object side of the first lens to the image plane is denoted by HOS, with a starting point on any surface of any one of the six lenses at the optical axis and a coordinate point on the same surface of a vertical height of ½ HEP measured from the optical axis, a length of an outline curve along the surface from the starting point to the coordinate point is denoted by ARE, and the following conditions are satisfied:

$1.0 \leq f/HEP \leq 3$; $50 \deg < HAF \leq 70 \deg$; $0.5 \leq HOS/f \leq 5$; $0.5 \leq HOS/HOI \leq 3$; and $0.92 \leq (ARE/HEP) \leq 2.0$.

19. The optical image capturing system according to claim 18, wherein a lateral aberration of the longest operation wavelength of visible light of a positive tangential fan of the optical image capturing system passing through the margin of the entrance pupil and incident on the first image plane by 0.7 HOI is denoted by PLTA, a lateral aberration of the shortest operation wavelength of visible light of the positive tangential fan of the optical image capturing system passing through the margin of the entrance pupil and incident on the first image plane by 0.7 HOI is denoted by PSTA, a lateral aberration of the longest operation wavelength of visible light of a negative tangential fan of the optical image capturing system passing through the margin of the entrance pupil and incident on the first image plane by 0.7 HOI is denoted by NLTA, a lateral aberration of the shortest operation wavelength of visible light of a negative tangential fan of the optical image capturing system passing through the margin of the entrance pupil and incident on the first image plane by 0.7 HOI is denoted by NSTA, a lateral aberration of the longest operation wavelength of visible light of a sagittal fan of the optical image capturing system passing through the margin of the entrance pupil and incident on the first image plane by 0.7 HOI is denoted by SLTA, a lateral aberration of the shortest operation wavelength of visible light of the sagittal fan of the optical image capturing system passing through the margin of the entrance pupil and incident on the first image plane by 0.7 HOI is denoted by SSTA, and the following conditions are satisfied:

$PLTA \leq 80$ micrometers; $PSTA \leq 80$ micrometers; $NLTA \leq 80$ micrometers; $NSTA \leq 80$ micrometers; $SLTA \leq 80$ micrometers; and $SSTA \leq 80$ micrometers; and $HOI > 1.0$ mm.

20. The optical image capturing system according to claim 18, wherein a thickness of the third lens on the optical axis is denoted by TP3, a thickness of the fifth lens on the optical axis is denoted by TP5, and the following condition is satisfied:

$TP5 > TP3$.

21. The optical image capturing system according to claim 18, wherein an object-side surface of the sixth lens on the optical axis is a convex surface.

22. The optical image capturing system according to claim 18, wherein a distance between the fourth lens and the fifth lens on the optical axis is denoted by IN45, a distance between the fifth lens and the sixth lens on the optical axis is denoted by IN56, and the following condition is satisfied:

$IN45 > IN56$.

23. The optical image capturing system according to claim 18, further comprising an aperture, an image sensing device and a driving module, wherein the image sensing device is disposed on the image plane, a distance on the optical axis from the aperture to the image plane is denoted by InS, and the driving module couples with the lenses to displace the six lenses, and the following condition is satisfied:

$0.2 \leq InS/HOS \leq 1.1$.

* * * * *